United States Patent
Toyoda et al.

(10) Patent No.: US 9,618,867 B2
(45) Date of Patent: Apr. 11, 2017

(54) PIGMENT DISPERSION AND TONER

(71) Applicant: CANON KABUSHIKI KAISHA, Tokyo (JP)

(72) Inventors: Takayuki Toyoda, Yokohama (JP); Yasuaki Murai, Kawasaki (JP); Waka Hasegawa, Tokyo (JP); Masanori Seki, Yokohama (JP); Chiaki Nishiura, Pittsburgh, PA (US); Yuki Tsujii, Tokyo (JP); Ayano Mashida, Kawasaki (JP); Masashi Hirose, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/044,745

(22) Filed: Feb. 16, 2016

(65) Prior Publication Data
US 2016/0246200 A1    Aug. 25, 2016

(30) Foreign Application Priority Data

Feb. 20, 2015  (JP) ................ 2015-031590

(51) Int. Cl.
*G03G 9/09* (2006.01)
*C08K 5/3417* (2006.01)
(Continued)

(52) U.S. Cl.
CPC ............ *G03G 9/0918* (2013.01); *C08K 3/04* (2013.01); *C08K 5/23* (2013.01); *C08K 5/30* (2013.01);
(Continued)

(58) Field of Classification Search
CPC .......... C08K 5/23; C08K 5/30; C08K 5/3447; C08K 5/3437; C08K 5/3445; C08K 5/3462;
(Continued)

(56) References Cited

U.S. PATENT DOCUMENTS 7,250,479 B2  7/2007 Le et al.
7,348,367 B2  3/2008 Thetford et al.
(Continued)

FOREIGN PATENT DOCUMENTS

JP  3-113462 A  5/1991
JP  6-148927 A  5/1994
(Continued)

OTHER PUBLICATIONS

Datta E. Ponde et al., "Selective Catalytic Transesterification, Transthiolesterification, and Protection of Carbonyl Compounds over Natural Kaolinitic Clay," 63(4) J. Org. Chem. 1058-1063 (1998).
(Continued)

*Primary Examiner* — Peter Vajda
(74) *Attorney, Agent, or Firm* — Fitzpatrick, Cella, Harper & Scinto

(57) ABSTRACT

A pigment dispersion containing a pigment, a non-water-soluble solvent, a compound in which an specific azo skeleton structure is bonded to a specific polymer having a monomer unit given, and a polymer compound having a monomer unit that contains a structure selected from the partial structures given by the specific formulas (3) and (4).

11 Claims, 9 Drawing Sheets

(51) Int. Cl.

| | | |
|---|---|---|
| C08K 5/30 | (2006.01) | |
| C08K 5/3447 | (2006.01) | |
| C08K 5/3437 | (2006.01) | |
| C08K 5/3445 | (2006.01) | |
| C08K 3/04 | (2006.01) | |
| C08K 5/3462 | (2006.01) | |
| C08K 5/23 | (2006.01) | |
| G03G 9/08 | (2006.01) | |

(52) U.S. Cl.
CPC .......... *C08K 5/3417* (2013.01); *C08K 5/3437* (2013.01); *C08K 5/3445* (2013.01); *C08K 5/3447* (2013.01); *C08K 5/3462* (2013.01); *G03G 9/0806* (2013.01); *G03G 9/091* (2013.01); *G03G 9/092* (2013.01); *G03G 9/0904* (2013.01)

(58) Field of Classification Search
CPC ...... C08K 3/04; G03G 9/0806; G03G 9/0904; G03G 9/092; G03G 9/091
See application file for complete search history.

(56) References Cited

U.S. PATENT DOCUMENTS

| | | | |
|---|---|---|---|
| 7,504,488 B2 | 3/2009 | Toyoda et al. | |
| 7,662,986 B2 | 2/2010 | Le et al. | |
| 7,666,962 B2 | 2/2010 | Le et al. | |
| 7,714,075 B1 | 5/2010 | Le et al. | |
| 8,377,616 B2 | 2/2013 | Tani et al. | |
| 8,628,899 B2 | 1/2014 | Kawamura et al. | |
| 8,815,484 B2 | 8/2014 | Tanaka et al. | |
| 8,815,485 B2 | 8/2014 | Tanaka et al. | |
| 8,916,319 B2 | 12/2014 | Ikeda et al. | |
| 8,940,467 B2 | 1/2015 | Hashimoto et al. | |
| 8,962,726 B2 | 2/2015 | Tanaka et al. | |
| 9,097,999 B2 | 8/2015 | Murai et al. | |
| 9,229,345 B2 | 1/2016 | Ikeda et al. | |
| 2012/0094226 A1* | 4/2012 | Tani ................. | C09B 29/337 430/108.23 |
| 2014/0356779 A1 | 12/2014 | Hasegawa et al. | |
| 2014/0377697 A1 | 12/2014 | Nishiura et al. | |
| 2015/0004538 A1 | 1/2015 | Kawamura et al. | |
| 2015/0004539 A1 | 1/2015 | Watanabe et al. | |
| 2015/0274853 A1 | 10/2015 | Nishiura et al. | |
| 2015/0277254 A1 | 10/2015 | Mukumoto et al. | |

FOREIGN PATENT DOCUMENTS

| | | |
|---|---|---|
| JP | 2000-515181 A | 11/2000 |
| JP | 2003-531001 A | 10/2003 |
| JP | 3721617 B2 | 11/2005 |
| JP | 2006-030760 A | 2/2006 |
| JP | 4254292 B2 | 4/2009 |
| JP | 2012-067285 A | 4/2012 |
| JP | 2013-182057 A | 9/2013 |
| JP | 2013-182058 A | 9/2013 |
| JP | 2014-231602 A | 12/2014 |
| WO | 98/01478 A1 | 1/1998 |
| WO | 99/05099 A1 | 2/1999 |
| WO | 01/80987 A2 | 11/2001 |
| WO | 2009/060886 A1 | 5/2009 |
| WO | 2014/178435 A1 | 11/2014 |
| WO | 2015/030223 A1 | 3/2015 |

OTHER PUBLICATIONS

Kiran Kumar Solingapuram Sai et al., "Knorr Cyclizations and Distonic Superelectrophiles," 72(25) J. Org. Chem. 9761-9764 (2007).
Experimental Chemistry, Series 2, Maruzen Co., Ltd., vol. 17-2, pp. 162-179 (1956).
Krzysztof Matyjaszewski et al., "Atom Transfer Radical Polymerization," 101(9) Chem. Rev. 2921-2990 (Sep. 2001).
Craig J. Hawker et al., "New Polymer Synthesis by Nitroxide Mediated Living Radical Polymerizations," 101(12) Chem. Rev. 3661-3688 (Oct. 2001).
Masami Kamigaito et al., "Metail-Catalyzed Living Radical Polymerization," 101(12) Chem. Rev. 3689-3745 (Dec. 2001).
Atsushi Goto et al., "Mechanism-Based Invention of High-Speed Living Radical Polymerization Using Organotellurium Compounds and Azo-Initiators," 125 J. Am. Chem. Soc. 8720-8721 (Jun. 2003).
Melvin S. Newman et al., "N-Methylpyrrolidone as Solvent for Reaction of Aryl Halides with Cuprous Cyanide," 26(7) J. Org. Chem. 2525-2528 (Jul. 1961).
Norman O .V. Sonntag, "The Reactions of Aliphatic Acid Chlorides," 52(2) Chem. Rev. 237-416 (1953).
New Experimental Chemistry, Maruzen Co., Ltd., Series 3, vol. 14-2, pp. 1111-1119 (1977).
New Experimental Chemistry, Maruzen Co., Ltd., Series 3, vol. 14-3, pp. 1787-1788 (1978).
New Experimental Chemistry, Maruzen Co., Ltd., Series 3, vol. 14-3, pp. 1803-1804 (1978).
J. Brandrup et al. (eds.), Polymer Handbook, Third Edition, John Wiley & Sons, pp. 209-262 (1989).
Tsujii et al., U.S. Appl. No. 14/912,383, filed Feb. 16, 2016.
Yoshida et al., U.S. Appl. No. 15/045,589, filed Feb. 17, 2016.

* cited by examiner

PIGMENT DISPERSION AND TONER

BACKGROUND OF THE INVENTION

Field of the Invention

The present invention relates to a pigment dispersion and to a toner that contains this pigment dispersion.

Description of the Related Art

Pigments, which generally have small particle diameters, tend to present strong cohesive forces among the pigment particles and as a consequence their dispersion in mediums such as organic solvents and molten resins can easily become unsatisfactory. The tinting strength of a pigment ends up declining when the pigment exhibits an unsatisfactory dispersibility.

The pigment particles must be highly dispersed in order to obtain a high clarity in the case of offset inks, gravure inks, paints and coatings, inkjet inks, inks for color filters, and so forth. Similarly, a high pigment dispersibility is also required for toners in order to obtain a high clarity. The use of a pigment in combination with a dispersing agent for dispersing the pigment has therefore been proposed in order to increase pigment dispersibility. In particular, various dispersing agents have been proposed for the individual colored toners, e.g., yellow, magenta, cyan, and black, in order to increase pigment dispersibility in a toner particle.

Specifically, the use of an azo skeleton structure-containing compound as a dispersing agent in order to improve the dispersibility of the azo pigments in yellow toners is disclosed in Japanese Patent Application Laid-open No. 2012-067285. The use of a special polyester-type dispersing agent in order to improve the dispersibility of the magenta pigments in magenta toners is disclosed in Japanese Patent Application Laid-open No. 2006-030760. The use as a dispersing agent of a polymer that contains sodium styrenesulfonate as a monomer unit in order to improve the dispersibility of the phthalocyanine pigments in cyan toners is disclosed in Japanese Patent Application Laid-open No. H03-113462. The use as a dispersing agent of a copolymer comprising a styrenic monomer and an acrylate ester (or methacrylate ester) monomer in order to improve the dispersibility of the carbon black in black toners is disclosed in Japanese Patent Application Laid-open No. H06-148927.

SUMMARY OF THE INVENTION

However, as a result of investigations by the present inventors, it was found that, for the methods described in Japanese Patent Application Laid-open Nos. 2006-030760, H03-113462, and H06-148927, the addition of a large amount of dispersing agent is required in order to obtain a certain level of pigment dispersibility, and that the addition of excess dispersing agent raises concerns with regard to an effect on the required properties. On the other hand, with respect to the method described in Japanese Patent Application Laid-open No. 2012-067285 using an azo skeleton structure-containing compound, there is still room for improvement because a pigment dispersing agent with a higher dispersing effect at a lower amount of addition is required in order to provide additional enhancements in the image quality of the output image.

Accordingly, an object of the present invention is to provide a pigment dispersion that can improve the dispersibility of pigments with various different colors, e.g., yellow, magenta, cyan, and black, and thereby exhibits an excellent tinting strength. An additional object of the present invention is to provide a toner that has this pigment dispersion.

A first aspect of the present invention is a pigment dispersion that contains a pigment; a non-water-soluble solvent; a compound having a partial structure represented by formula (1) and a polymer having a monomer unit represented by formula (2); and a polymer compound having a monomer unit that contains at least one structure selected from the group consisting of the partial structures represented by formulas (3) and (4)

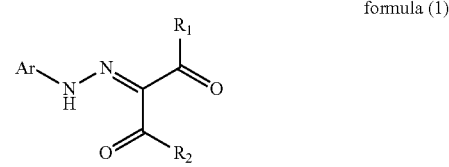

formula (1)

in formula (1), $R_1$ and $R_2$ each independently represent a substituted or unsubstituted alkyl group, a substituted or unsubstituted phenyl group, an $OR_5$ group, or an $NR_6R_7$ group;

$R_5$ to $R_7$ each independently represent a hydrogen atom, a substituted or unsubstituted alkyl group, a substituted or unsubstituted phenyl group, or an aralkyl group; and Ar represents a substituted or unsubstituted aryl group;

wherein at least one of $R_1$, $R_2$, and Ar has a substituent that has a site bonded to the polymer,

formula (2)

in formula (2), $R_3$ represents a hydrogen atom or an alkyl group and $R_4$ represents a substituted or unsubstituted phenyl group, a carboxy group, a substituted or unsubstituted alkoxycarbonyl group, or a substituted or unsubstituted carboxamide group,

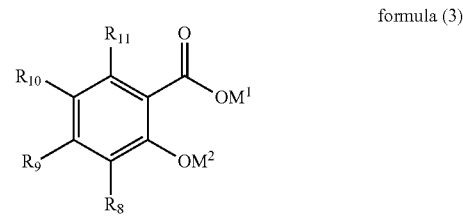

formula (3)

in formula (3), $R_8$ to $R_{11}$ each independently represent a hydrogen atom, a halogen atom, a hydroxyl group, a carboxy group, a sulfo group, a $C_{1-18}$ alkyl group, a $C_{1-18}$ alkoxy group, or an organic group as required to form a ring with an adjacent position, wherein at least one of $R_8$ to $R_{11}$ has a substituent that has a site bonded to a main chain or a side chain in the aforementioned polymer compound, and $M^1$ and $M^2$ each independently represent a hydrogen atom, a metal atom, or $NH_4$,

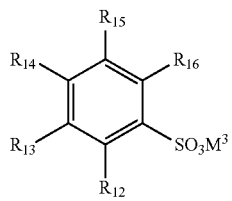

formula (4)

in formula (4), $R_{12}$ to $R_{16}$ each independently represent a hydrogen atom, a halogen atom, a hydroxyl group, an alkyl group, or an alkoxy group, wherein at least one of $R_{12}$ to $R_{16}$ has a substituent that has a site bonded to a main chain or a side chain in the aforementioned polymer compound, and $M^3$ represents a hydrogen atom, a metal atom, or $NH_4$.

A second aspect of the present invention relates to a toner that has a toner particle containing a binder resin and a colorant, wherein the colorant is the aforementioned pigment dispersion.

Further features of the present invention will become apparent from the following description of exemplary embodiments (with reference to the attached drawings).

DESCRIPTION OF THE EMBODIMENTS

Figure 1:
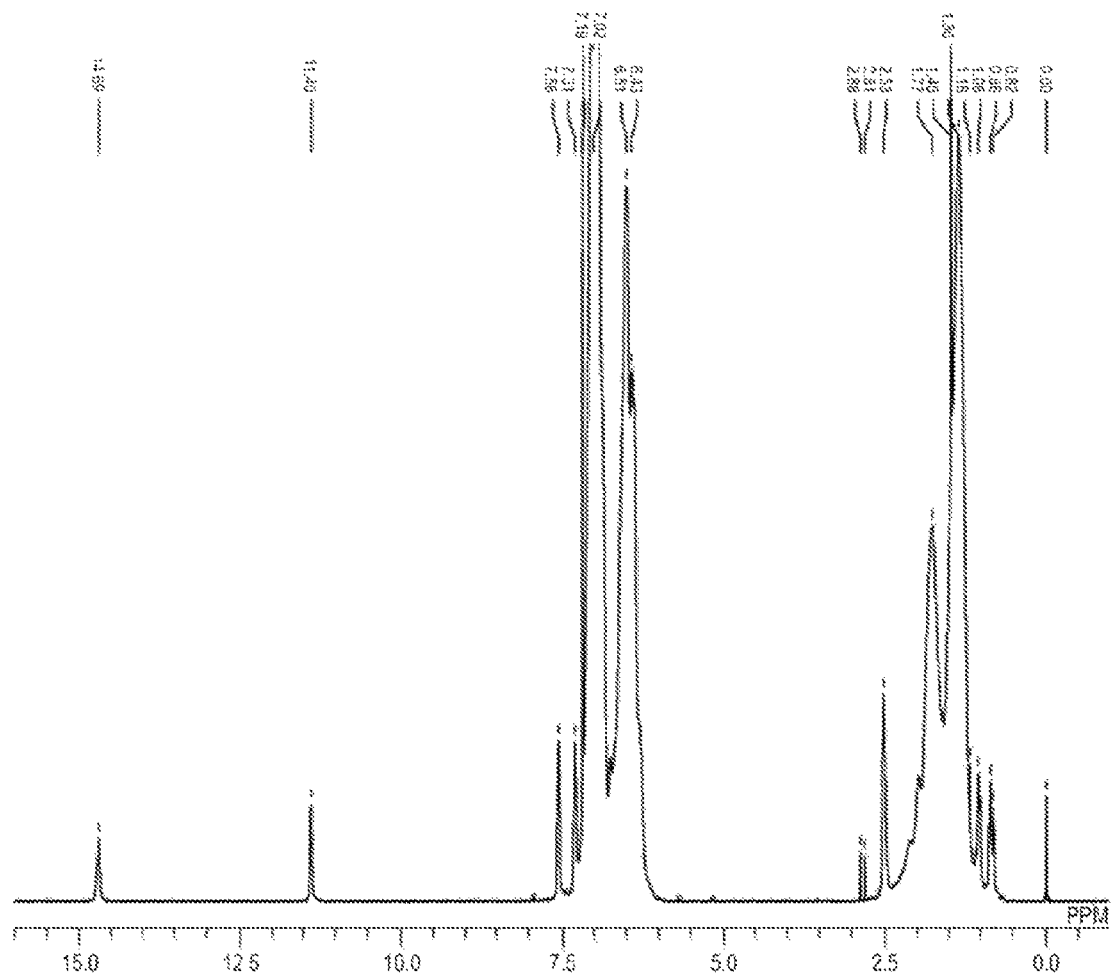
FIG. 1 is a $^1$H-NMR spectrum of compound (A-1)

The present invention is particularly described herebelow using preferred exemplary embodiments.

The pigment dispersion of the present invention characteristically contains a pigment; a non-water-soluble solvent; a compound having a partial structure represented by formula (1) and having a polymer having a monomer unit represented by formula (2); and a polymer compound having a monomer unit that contains at least one structure selected from the group consisting of the partial structures represented by formulas (3) and (4)

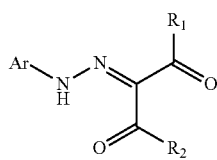

formula (1)

in formula (1), $R_1$ and $R_2$ each independently represent a substituted or unsubstituted alkyl group, a substituted or unsubstituted phenyl group, an $OR_5$ group, or an $NR_6R_7$ group;

$R_5$ to $R_7$ each independently represent a hydrogen atom, a substituted or unsubstituted alkyl group, a substituted or unsubstituted phenyl group, or an aralkyl group; and Ar represents a substituted or unsubstituted aryl group;

wherein at least one of $R_1$, $R_2$, and Ar has a substituent that has a site bonded to the polymer,

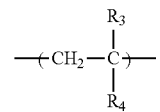

formula (2)

in formula (2), $R_3$ represents a hydrogen atom or an alkyl group and $R_4$ represents a substituted or unsubstituted phenyl group, a carboxy group, a substituted or unsubstituted alkoxycarbonyl group, or a substituted or unsubstituted carboxamide group,

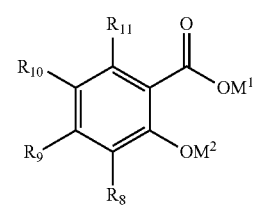

formula (3)

in formula (3), $R_8$ to $R_{11}$ each independently represent a hydrogen atom, a halogen atom, a hydroxyl group, a carboxy group, a sulfo group, a $C_{1-18}$ alkyl group, a $C_{1-18}$ alkoxy group, or an organic group as required to form a ring with an adjacent position (preferably a hydrogen atom, a $C_{1-4}$ alkyl group, or a $C_{1-4}$ alkoxyl group), wherein at least one of $R_8$ to $R_{11}$ has a substituent that has a site bonded to a main chain or a side chain in the aforementioned polymer compound, and $M^1$ and $M^2$ each independently represent a hydrogen atom, a metal atom, or $NH_4$,

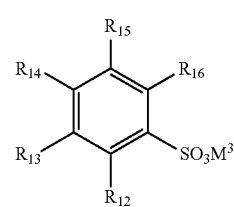

formula (4)

in formula (4), $R_{12}$ to $R_{16}$ each independently represent a hydrogen atom, a halogen atom, a hydroxyl group, an alkyl group, or an alkoxy group (preferably a hydrogen atom, a $C_{1-4}$ alkyl group, or a $C_{1-4}$ alkoxyl group), wherein at least one of $R_{12}$ to $R_{16}$ has a substituent that has a site bonded to a main chain or a side chain in the aforementioned polymer compound, and $M^3$ represents a hydrogen atom, a metal atom, or $NH_4$.

In the following, the partial structure represented by formula (1) is also referred to as the "azo skeleton structure". In addition, "azo skeleton structure-containing compound" is also used to refer to the compound in which a partial structure represented by formula (1) is connected to a polymer having a monomer unit represented by formula (2). A partial structure represented by formula (3) or (4) is also referred to as an "acidic group structure". In addition, "acidic group structure-containing compound" is also used to refer to the polymer compound having a monomer unit that contains a structure selected from the partial structures represented by formulas (3) and (4).

In the present invention, the azo skeleton structure-containing compound is used in the presence of the acidic group structure-containing compound. By doing this, the acidic group structure-containing compound can act as a dispersion assistant for the azo skeleton structure-containing compound and a pigment dispersion and a toner can then be obtained that have an excellent pigment dispersibility at a lower amount of addition than is the case for the use of the azo skeleton structure-containing compound by itself.

<The Azo Skeleton Structure-Containing Compound>

The azo skeleton structure-containing compound is described in the following.

<The Azo Skeleton Structure>

The azo skeleton structure is described in detail first.

The alkyl group encompassed by $R_1$ and $R_2$ in formula (1) and the alkyl group encompassed by $R_5$ to $R_7$ in the $OR_5$ group and $NR_6R_7$ group can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

The aralkyl group encompassed by the $R_5$ to $R_7$ in the $OR_5$ group and $NR_6R_7$ group in formula (1) can be exemplified by the benzyl group and phenethyl group.

The substituent on the substituted alkyl group and substituted phenyl group encompassed by $R_1$, $R_2$, and $R_5$ to $R_7$ in formula (1) can be exemplified by the following groups: halogen atom, alkyl group, alkoxy group, trifluoromethyl group, hydroxyl group, amino group, nitro group, cyano group, carboxy group, alkoxycarbonyl group, carboxamide group, sulfo group, sulfoamide group, urea group, and thiourea group.

$R_1$ in formula (1) is preferably the methyl group from the standpoint of the affinity with the pigment.

Viewed from the standpoint of the affinity with the pigment, $R_2$ in formula (1) is preferably an $NR_6R_7$ group with $R_6$ being the hydrogen atom and $R_7$ being the phenyl group.

Ar in formula (1) represents an aryl group and can be exemplified by the phenyl group and naphthyl group.

The substituent on the substituted aryl group in formula (1) can be exemplified by the following groups: halogen atom, alkyl group, alkoxy group, trifluoromethyl group, hydroxyl group, amino group, nitro group, cyano group, carboxy group, alkoxycarbonyl group, carboxamide group, sulfo group, sulfoamide group, urea group, and thiourea group. In addition, at least one of $R_1$, $R_2$, and Ar has a substituent that has a site bonded to the polymer.

Viewed from the standpoint of the affinity with the pigment, among the preceding $R_2$ in formula (1) is preferably an $NR_6R_7$ group with $R_6$ being the hydrogen atom and $R_7$ being the phenyl group. That is, the azo skeleton structure given by formula (1) is preferably an azo skeleton structure as given by the following formula (5).

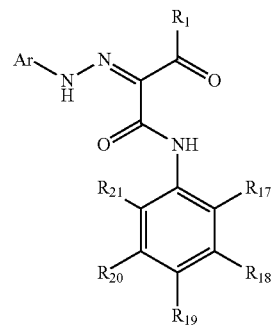

formula (5)

In formula (5), $R_1$ has the same definition as for formula (1) and represents a substituted or unsubstituted alkyl group, a substituted or unsubstituted phenyl group, an $OR_5$ group, or an $NR_6R_7$ group. Ar represents a substituted or unsubstituted aryl group. $R_{17}$ to $R_{21}$ each independently represent a hydrogen atom, a halogen atom, an alkyl group, an alkoxy group, a hydroxyl group, a carboxy group, a $COOR_{22}$ group, or a $CONR_{23}R_{24}$ group, $SO_2NR_{25}R_{26}$, a group represented by the following formula (6-1), a group represented by the following formula (6-2), or a substituent having a site bonded to the polymer having a monomer unit with formula (2). $R_{22}$ to $R_{26}$ each independently represent a hydrogen atom, an alkyl group, a phenyl group, or an aralkyl group. At least one of Ar, $R_1$, and $R_{17}$ to $R_{21}$ has a substituent that has a site bonded to the polymer.

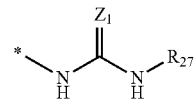

(6-1)

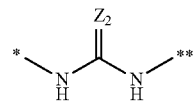

(6-2)

In formula (6-1), $R_{27}$ represents a hydrogen atom, a substituted or unsubstituted alkyl group, an aralkyl group, a substituted or unsubstituted alkyloxycarbonyl group, or a substituted or unsubstituted aralkyloxycarbonyl group.

$Z_1$ represents an oxygen atom, a sulfur atom, or an $NR_{28}$ group.

$R_{28}$ is a hydrogen atom, a substituted or unsubstituted alkyl group, a substituted or unsubstituted alkyloxycarbonyl group, or a substituted or unsubstituted aralkyloxycarbonyl group. "*" represents a site bonded to the $R_{17}$-to-$R_{21}$-bearing aromatic ring of formula (5).

In formula (6-2), the "*" and "**" represent a site bonded to the $R_{17}$-to-$R_{21}$-bearing aromatic ring of formula (5);

the group represented by formula (6-2) forms a 5-membered heterocycle through the bonding to the $R_{17}$-to-$R_{21}$-bearing aromatic ring in formula (5); and $Z_2$ represents an oxygen atom, a sulfur atom, or an $NR_{28}$ group.

The halogen atom encompassed by the $R_{17}$ to $R_{21}$ in formula (5) can be exemplified by the fluorine atom, chlorine atom, bromine atom, and iodine atom.

The alkyl group encompassed by the $R_{17}$ to $R_{21}$ in formula (5) and the alkyl group encompassed by the $R_{22}$ to $R_{26}$ can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

The alkoxy group encompassed by the $R_{17}$ to $R_{21}$ in formula (5) can be exemplified by the methoxy group, ethoxy group, n-propoxy group, n-butoxy group, isopropoxy group, isobutoxy group, sec-butoxy group, and tert-butoxy group.

The aralkyl group encompassed by the $R_{22}$ to $R_{26}$ in formula (5) can be exemplified by the benzyl group and phenethyl group.

With regard to the $R_{17}$ to $R_{21}$ in formula (5), among the preceding, desirably at least one of $R_{17}$ to $R_{21}$ is a linking group from the standpoint of the affinity with the pigment. Moreover, considered from the standpoint of the ease of production, more preferably at least one of $R_{17}$ to $R_{21}$ is a linking group and the $R_{17}$ to $R_{21}$ not participating in a linking group are all the hydrogen atom. The Ar in formula (5) is, among the preceding, preferably the phenyl group from the standpoint of the affinity with the pigment and ease of production. That is, the azo skeleton structure represented by formula (5) is preferably an azo skeleton structure as represented by the following formula (7).

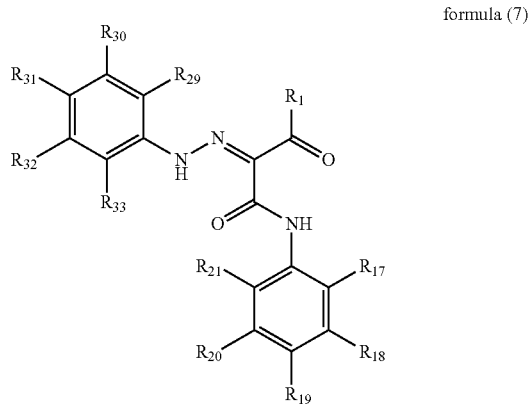

formula (7)

In formula (7), $R_1$ has the same definition as for formula (1) and represents a substituted or unsubstituted alkyl group, a substituted or unsubstituted phenyl group, an $OR_5$ group, or an $NR_6R_7$ group. $R_{17}$ to $R_{21}$ and $R_{29}$ to $R_{33}$ each independently represent a hydrogen atom, a halogen atom, an alkyl group, an alkoxy group, a hydroxyl group, a carboxy group, a $COOR_{22}$ group, or a $CONR_{23}R_{24}$ group, $SO_2NR_{25}R_{26}$, a group represented by formula (6-3), a group represented by formula (6-4), or a substituent having a site bonded to the polymer having a monomer unit with formula (2). $R_{22}$ to $R_{26}$ each independently represent a hydrogen atom, an alkyl group, a phenyl group, or an aralkyl group. At least one of $R_{17}$ to $R_{21}$ and $R_{29}$ to $R_{33}$ is a substituent that has a site bonded to the polymer.

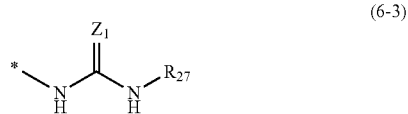

(6-3)

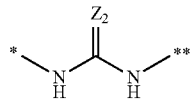

(6-4)

In formula (6-3), $R_{27}$ represents a hydrogen atom, a substituted or unsubstituted alkyl group, an aralkyl group, a substituted or unsubstituted alkyloxycarbonyl group, or a substituted or unsubstituted aralkyloxycarbonyl group.

$Z_1$ represents an oxygen atom, a sulfur atom, or an $NR_{28}$ group.

$R_{28}$ is a hydrogen atom, a substituted or unsubstituted alkyl group, a substituted or unsubstituted alkyloxycarbonyl group, or a substituted or unsubstituted aralkyloxycarbonyl group. "*" represents a site bonded to the $R_{17}$-to-$R_{21}$-bearing aromatic ring or the $R_{29}$-to-$R_{33}$-bearing aromatic ring of formula (7).

In formula (6-4), "*" and "**" each represent a site bonded to the $R_{17}$-to-$R_{21}$-bearing aromatic ring or the $R_{29}$-to-$R_{33}$-bearing aromatic ring of formula (7).

The group represented by formula (6-4) forms a 5-membered heterocycle through the bonding to the $R_{17}$-to-$R_{21}$-bearing aromatic ring or the $R_{29}$-to-$R_{33}$-bearing aromatic ring in formula (7).

$Z_2$ represents an oxygen atom, a sulfur atom, or an $NR_{28}$ group.

The halogen atom encompassed by the $R_{17}$ to $R_{21}$ and the $R_{29}$ to $R_{33}$ in formula (7) can be exemplified by the fluorine atom, chlorine atom, bromine atom, and iodine atom.

The alkyl group encompassed by the $R_{17}$ to $R_{21}$, $R_{22}$ to $R_{26}$ and the $R_{29}$ to $R_{33}$ in formula (7) can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

The alkoxy group encompassed by the $R_{17}$ to $R_{21}$ and the $R_{29}$ to $R_{33}$ in formula (7) can be exemplified by the methoxy group, ethoxy group, n-propoxy group, n-butoxy group, isopropoxy group, isobutoxy group, sec-butoxy group, and tert-butoxy group.

The aralkyl group encompassed by the $R_{22}$ to $R_{26}$ in formula (7) can be exemplified by the benzyl group and phenethyl group.

The alkyl groups encompassed by the $R_{27}$ and $R_{28}$ in formulas (6-1) to (6-4) can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

The aralkyl group encompassed by the $R_{27}$ in formulas (6-1) to (6-4) can be exemplified by the benzyl group and phenethyl group.

The alkyloxycarbonyl group encompassed by the $R_{27}$ and $R_{28}$ in formulas (6-1) to (6-4) can be exemplified by the methoxycarbonyl group, ethoxycarbonyl group, n-propoxycarbonyl group, isopropoxycarbonyl group, n-butoxycarbonyl group, isobutoxycarbonyl group, sec-butoxycarbonyl group, tert-butoxycarbonyl group, n-pentyloxycarbonyl group, and n-hexyloxycarbonyl group.

The aralkyloxycarbonyl group encompassed by the $R_{27}$ and $R_{28}$ in formulas (6-1) to (6-4) can be exemplified by the benzyloxycarbonyl group and phenethyloxycarbonyl group.

The groups represented by formulas (6-2) and (6-4) form a 5-membered heterocycle through the bonding to the $R_{17}$-to-$R_{21}$-bearing aromatic ring or the $R_{29}$-to-$R_{33}$-bearing aromatic ring. The 5-membered heterocycle formed here can be exemplified by the 2-imidazolone ring when $Z_2$ in formulas (6-2) and (6-4) is an oxygen atom; by the 2-imidazolidinethione ring when $Z_2$ in formulas (6-2) and (6-4) is a sulfur atom; and by the 2-iminoimidazolidine ring when $Z_2$ in formulas (6-2) and (6-4) is the NH group.

The substituent on the substituted alkyl group, the substituent on the substituted alkyloxycarbonyl group, and the substituent on the substituted aralkyloxycarbonyl group encompassed by the $R_{27}$ in formulas (6-1) to (6-4) can be exemplified by the following groups: halogen atom, nitro group, amino group, hydroxyl group, cyano group, and trifluoromethyl group.

Among the preceding, the $R_{27}$ in formulas (6-1) to (6-4) is preferably a hydrogen atom, methyl group, or ethyl group from the standpoint of the affinity for the pigment.

The substituent on the substituted alkyl group, the substituent on the substituted alkyloxycarbonyl group, and the substituent on the substituted aralkyloxycarbonyl group encompassed by the $R_{28}$ in formulas (6-1) to (6-4) can be exemplified by the following groups: halogen atom, nitro group, amino group, hydroxyl group, cyano group, and trifluoromethyl group.

Among the preceding, the $R_{28}$ in formulas (6-1) to (6-4) is preferably a hydrogen atom, tert-butoxycarbonyl group, or benzyloxycarbonyl group from the standpoint of the ease of production.

The $Z_1$ and $Z_2$ in formulas (6-1) to (6-4) is preferably an oxygen atom from the standpoint of the affinity with the pigment and the ease of production.

With regard to the $R_{17}$ to $R_{21}$ and the $R_{29}$ to $R_{33}$ in formula (7), among the preceding possibilities, preferably at least one of $R_{17}$ to $R_{21}$ is a linking group from the standpoint of the affinity with the pigment. Moreover, considered from the standpoint of the ease of production, more preferably at least one of $R_{17}$ to $R_{21}$ is a linking group and the $R_{17}$ to $R_{21}$ not participating in a linking group are all the hydrogen atom.

Viewed in terms of the affinity with the acidic group structure-containing compound, at least one of $R_{17}$ to $R_{21}$ and $R_{29}$ to $R_{33}$ is preferably a $COOR_{22}$ group, a $CONR_{23}R_{24}$ group, $SO_2NR_{25}R_{26}$, or a group represented by formula (6-3) or a group represented by formula (6-4). Moreover, $R_{22}$ to $R_{26}$ are preferably the methyl group or ethyl group.

The number of substitutions of the polymer that is bonded to the partial structure with formula (1), (5), or (7) is not particularly limited, but substitution at one or two locations is preferred in terms of the ease of production.

The linking group can be exemplified by a linking group (substituent) having the alkoxycarbonyl group, a linking group having the sulfocarbonyl group, and a linking group having the carboxamide group. A linking group having the alkoxycarbonyl group or carboxamide group is preferred from the standpoint of the ease of production.

There are no particular limitations on the substituent on the partial structures with formulas (1), (5), and (7) for forming the linking group. This substituent can be exemplified by a hydroxyl group-containing substituent, a sulfo group-containing substituent, an amino group-containing substituent, and a carboxy group-containing substituent.

The hydroxyl group-containing substituent can be exemplified by the hydroxyl group; hydroxyalkyl groups such as the hydroxymethyl group, hydroxyethyl group, and hydroxypropyl group; and the group represented by —$R_{36}$—O—$R_{37}$—OH ($R_{36}$ and $R_{37}$ each independently represent a $C_{1-4}$ alkylene group).

The sulfo group-containing substituent can be exemplified by the sulfo group and by sulfoalkyl groups such as the sulfomethyl group, sulfoethyl group, and sulfopropyl group.

The amino group-containing substituent can be exemplified by the amino group and by aminoalkyl groups such as the aminomethyl group, aminoethyl group, and aminopropyl group.

The carboxy group-containing substituent can be exemplified by the carboxy group and by carboxyalkyl groups such as the carboxymethyl group, carboxyethyl group, and carboxypropyl group.

Viewed in terms of the affinity for the pigment and the ease of production, the linking group for linking the polymer segment with the partial structure with formula (1), (5), or (7) preferably has an ester bond (—COO—) or a carboxamide bond (—CONH—). When the azo skeleton structure given by formula (1), (5), or (7) is bonded to the polymer through a functional group, e.g., an ester bond (—COO—) and so forth, deriving from the polymer, the bonding segment that includes this functional group is referred to as the linking group.

The linking group can be specifically exemplified by the following $L_2$ to $L_{10}$.

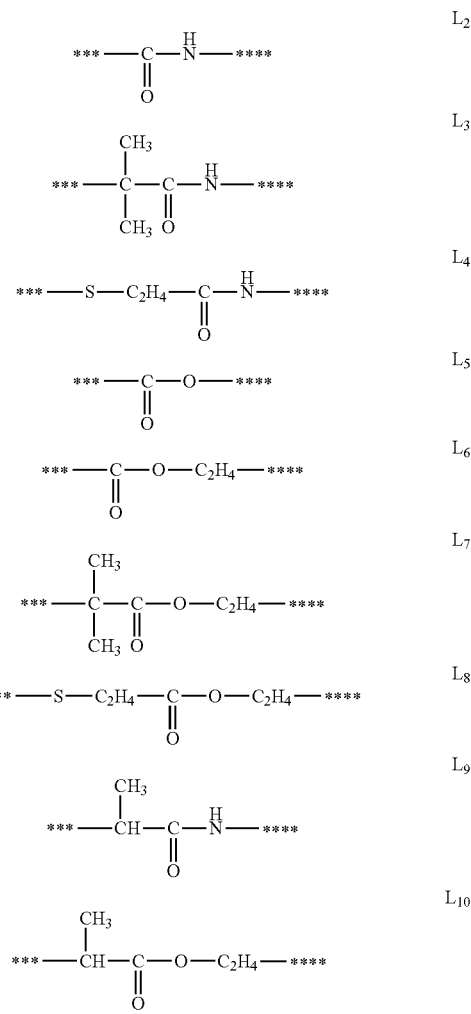

In $L_2$ to $L_{10}$, "*" represents a site bonded to a carbon atom in the polymer segment having a monomer unit represented by formula (2). Also, "**" in $L_2$ to $L_{10}$ represents a site bonded to the $R_1$, $R_2$, or Ar in the partial structure represented by formula (1).

<The Polymer in the Azo Skeleton Structure-Containing Compound>

The polymer (also referred to below as the polymer segment) in the azo skeleton structure-containing compound is described in the following.

The alkyl group encompassed by $R_3$ in formula (2) is not particularly limited and can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

Among the preceding, the $R_3$ in formula (2) is preferably a hydrogen atom or the methyl group viewed from the standpoint of the polymerizability of the polymerizable monomer that forms the monomer unit.

The alkoxycarbonyl group encompassed by $R_4$ in formula (2) is not particularly limited and can be exemplified by straight-chain and branched alkoxycarbonyl groups such as the methoxycarbonyl group, ethoxycarbonyl group, n-propoxycarbonyl group, isopropoxycarbonyl group, n-butoxycarbonyl group, isobutoxycarbonyl group, sec-butoxycarbonyl group, tert-butoxycarbonyl group, octoxycarbonyl group, nonoxycarbonyl group, decoxycarbonyl group, undecoxycarbonyl group, dodecoxycarbonyl group, hexadecoxycarbonyl group, octadecoxycarbonyl group, eicosoxycarbonyl group, docosoxycarbonyl group, 2-ethylhexoxycarbonyl group, phenoxycarbonyl group, benzoxycarbonyl group, and 2-hydroxyethoxycarbonyl group.

The carboxamide group encompassed by $R_4$ in formula (2) is not particularly limited and can be exemplified by straight-chain and branched amide groups such as the N-methylamide group, N,N-dimethylamide group, N-ethylamide group, N,N-diethylamide group, N-isopropylamide group, N,N-diisopropylamide group, N-n-butylamide group, N,N-di-n-butylamide group, N-isobutylamide group, N,N-diisobutylamide group, N-sec-butylamide group, N,N-di-sec-butylamide group, N-tert-butylamide group, N-octylamide group, N,N-dioctylamide group, N-nonylamide group, N,N-dinonylamide group, N-decylamide group, N,N-didecylamide group, N-undecylamide group, N,N-diundecylamide group, N-dodecylamide group, N,N-didodecylamide group, N-hexadecylamide group, N-octadecylamide group, N-phenylamide group, N-(2-ethylhexyl)amide group, and N,N-di(2-ethylhexyl)amide group.

The substituent on the substituted phenyl group, the substituent on the substituted alkoxycarbonyl group, and the substituent on the substituted carboxamide group for the $R_4$ in formula (2) can be exemplified by the following groups: alkoxy groups such as the methoxy group and ethoxy group; amino groups such as the N-methylamino group and N,N-dimethylamino group; acyl groups such as the acetyl group; and halogen atoms such as the fluorine atom and chlorine atom.

Among the preceding, the $R_4$ in formula (2) is preferably the phenyl group or an alkoxycarbonyl group from the standpoint of the compatibility and dispersibility in the medium of the azo skeleton structure-containing compound.

The affinity of the polymer segment with the dispersion medium can be controlled by changing the proportion of the monomer unit represented by formula (2). When the dispersion medium is a nonpolar solvent such as styrene, monomer unit in which the $R_4$ in formula (2) is the phenyl group is preferably present in a large proportion from the standpoint of the affinity with the dispersion medium. When the dispersion medium is a solvent having some degree of polarity, such as an acrylate ester, monomer unit in which $R_4$ in formula (2) is a carboxyl group, alkoxycarbonyl group, or carboxamide group is preferably present in a large proportion from the standpoint of the affinity with the dispersion medium.

Considering the ease of production, preferably the polymer contains monomer unit in which $R_4$ is the carboxyl group and the at least one of $R_1$, $R_2$, and Ar in formula (1) and the carboxyl group in the polymer form an alkoxycarbonyl group (bond) or a carboxamide group (bond).

The following methods can be used to introduce the carboxyl group in terminal position on the polymer segment for the azo skeleton structure-containing compound: atom transfer radical polymerization (ATRP) as described below, methods using a carboxyl group-bearing polymerization initiator, and methods using a carboxyl group-bearing mercaptan-type chain transfer agent.

The molecular weight of the polymer segment is preferably a number-average molecular weight of at least 500 from the standpoint of enhancing the pigment dispersibility. A number-average molecular weight for the polymer segment of not more than 200,000 is preferred from the standpoint of the affinity with the non-water-soluble solvent. 2,000 to 50,000 is more preferred.

In addition, as disclosed in Japanese Translation of PCT Application No. 2003-531001, a method is known for introducing a branched aliphatic chain in terminal position in a polyoxyalkylenecarbonyl-type dispersing agent. For the polymer segment in the azo skeleton structure-containing compound, a branched aliphatic chain can also be introduced in terminal position when a telechelic polymer segment is synthesized by a method such as the ATRP described below.

With regard to the position of the azo skeleton structure in the azo skeleton structure-containing compound, it may be randomly present at individual points or may be unevenly distributed wherein one or a plurality of blocks are formed at one end.

Based on the balance between the affinity for the pigment and the affinity for the dispersion medium, the number of azo skeleton structures in the azo skeleton structure-containing compound, expressed per 100 monomers forming the polymer segment, is preferably 0.5 to 10 and more preferably 0.5 to 5.

As shown in the following scheme, the azo skeleton structure given by formula (1) occurs as the tautomers given by the following formulas (16) and (17), and these tautomers are also included in the scope of the present invention.

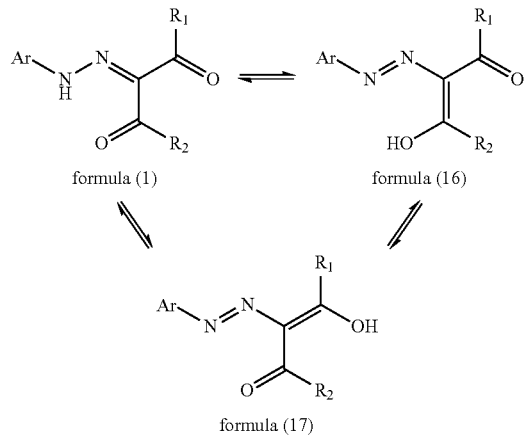

formula (1)  formula (16)

formula (17)

The $R_1$, $R_2$, and Ar in formulas (16) and (17) each have the same definition as the $R_1$, $R_2$, and Ar in formula (1).

<Methods of Producing the Azo Skeleton Structure-Containing Compound>

Methods of producing the azo skeleton structure-containing compound are described below. Methods for synthesizing the azo skeleton structure-containing compound can be exemplified by the methods given below in (i) to (iv).

Method (i) is described in detail first using the scheme provided below as an example. In method (i), the azo skeleton structure and the polymer segment are preliminarily synthesized separately and the azo skeleton structure-containing compound is then synthesized by bonding the azo skeleton structure to the polymer segment using a condensation reaction.

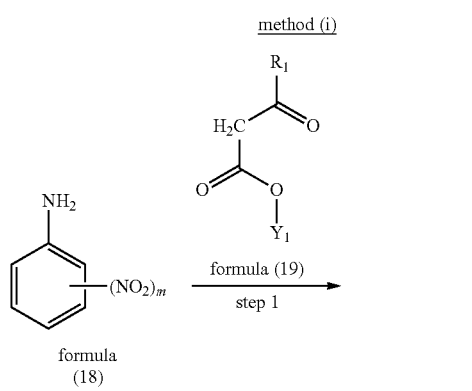

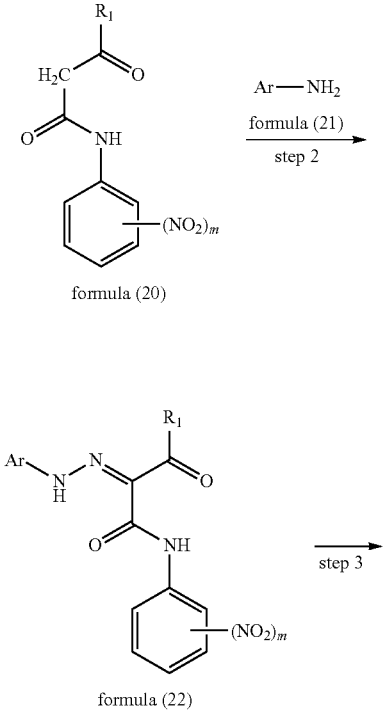

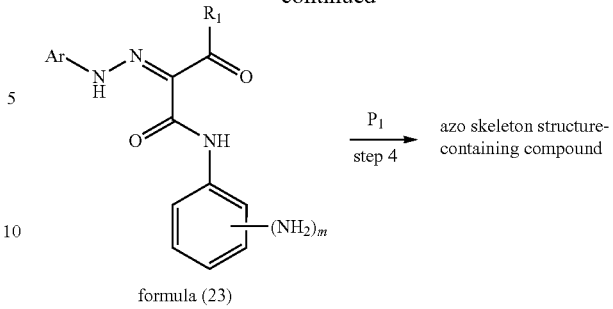

The $R_1$ and Ar in formulas (18) to (23) each have the same definition as the $R_1$ and Ar in formula (1). The $Y_1$ in formula (8) represents a leaving group. $P_1$ represents a polymer segment obtained by the polymerization of polymerizable monomer that forms the monomer unit given by formula (2). m in formulas (18), (20), (22), and (23) represents an integer with a value of 1 or 2.

In the scheme for method (i) provided as an example above, the azo skeleton structure-containing compound with formula (1) can be synthesized by proceeding through the steps 1 to 4 described in the following. In step 1, the acetoacetate analog with formula (19) is amidated with the nitroaniline derivative with formula (18) to synthesize the intermediate (20), which is an acylacetoanilide analog. In step 2, diazo coupling is carried out between the intermediate (20) and the aniline derivative (21) to synthesize the azo compound (22). In step 3, the nitro group in the azo compound (22) is reduced to synthesize the azo compound (23). In step 4, the azo compound (23) is bonded with the polymer segment $P_1$ using, for example, a condensation reaction.

Step 1 is described first.

Known methods can be used for step 1. Refer, for example, to The Journal of Organic Chemistry, 1998, Volume 63, Number 4, pp. 1058-1063. In addition, when $R_1$ in formula (20) is the methyl group, synthesis can also be carried out by a method that uses a diketene in place of the starting material (19). Refer, for example, to The Journal of Organic Chemistry, 2007, Volume 72, Number 25, pp. 9761-9764.

The nitroaniline derivative (18) and the acetoacetate analog (19) are each available commercially in a variety of species and thus can be readily acquired. They can also be readily synthesized by known methods.

Step 1 may be carried out in the absence of solvent, but is preferably carried out in the presence of a solvent in order to prevent the sudden development of the reaction. The solvent can be exemplified by alcohols such as methanol and ethanol; esters such as methyl acetate and ethyl acetate; ethers such as diethyl ether and tetrahydrofuran; hydrocarbons such as benzene, toluene, and xylene; halogenated hydrocarbons such as dichloromethane and dichloroethane; amides such as N,N-dimethylformamide and N-methylpyrrolidone; nitriles such as acetonitrile and propionitrile; acids such as formic acid and acetic acid; and water. In addition, a mixture of two or more of these solvents may be used as necessary. The amount of use of the solvent, considered from the standpoint of the reaction rate, is preferably in the range from 1.0- to 20-fold the mass of the compound with formula (18).

Step 1 is generally carried out in the temperature range from 0 to 250° C. and is generally complete within 24 hours.

Step 2 is described in the following.

A known method can be used for step 2. The following method is provided as a specific example. First, the aniline derivative (21) is reacted with a diazotizing agent, e.g., sodium nitrite or nitrosylsulfuric acid, in the presence of an inorganic acid, e.g., hydrochloric acid or sulfuric acid, in methanol as the solvent, in order to synthesize the corresponding diazonium salt. This diazonium salt is then coupled with the intermediate (20) to synthesize the azo compound (22). The aniline derivative (21) is available commercially in a variety of species and thus can be readily acquired. It can also be readily synthesized by known methods.

Step 2 may be carried out in the absence of solvent, but is preferably carried out in the presence of a solvent in order to prevent the sudden development of the reaction. The solvent can be exemplified by the same solvents provided as examples in step 1. In addition, a mixture of two or more of these solvents may be used as necessary. The amount of use of the solvent, considered from the standpoint of the reaction rate, is preferably in the range from 1.0- to 20-fold the mass of the compound with formula (20).

Step 2 is generally carried out in the temperature range from −50 to 100° C. and is generally complete within 24 hours.

Step 3 is described in the following.

Known methods can be used for step 3. Specifically, a method using, for example, a metal compound, can be exemplified by Experimental Chemistry, Series 2, Volume 17-2, pp. 162-179. For example, the method described in WO 2009/060886 can be used for a catalytic hydrogenation method.

Step 3 may be carried out in the absence of solvent, but is preferably carried out in the presence of a solvent in order to prevent the sudden development of the reaction. The solvent can be exemplified by the alcohols, esters, ethers, hydrocarbons, and amides among the solvents provided as examples in step 1. In addition, a mixture of two or more of these solvents may be used as necessary. The amount of use of the solvent, considered from the standpoint of the reaction rate, is preferably in the range from 1.0- to 20-fold the mass of the compound with formula (22).

This step is generally carried out in the temperature range from 0 to 250° C. and is generally complete within 24 hours.

The method of synthesizing the polymer segment $P_1$ used in step 4 will now be described.

A known polymerization method can be used to synthesize the polymer segment $P_1$ (for example, Chemical Reviews, 2001, Volume 101, pp. 2921-2990).

The polymerization method used to synthesize the polymer segment can be specifically exemplified by radical polymerization, cationic polymerization, and anionic polymerization, but among these the use of radical polymerization is preferred from the standpoint of the ease of production. The radical polymerization can be run using a radical polymerization initiator, by exposure to, for example, radiation or laser light, using a combination of a photopolymerization initiator and exposure to light, and with heating.

The radical polymerization initiator is selected from among compounds that generate radicals under the action of heat, light, radiation, or an oxidation-reduction reaction. Examples here are azo compounds, organoperoxides, inorganic peroxides, organometal compounds, and photopolymerization initiators. Specific examples are azo-type polymerization initiators such as 2,2'-azobis(isobutyronitrile), 2,2'-azobis(2-methylbutyronitrile), 2,2'-azobis(4-methoxy-2,4-dimethylvaleronitrile), 2, 2'-azobis(2,4-dimethylvaleronitrile), and 4,4'-azobis(4-cyanovaleric acid); organoperoxide-type polymerization initiators such as benzoyl peroxide, di-tert-butyl peroxide, tert-butylperoxy isopropyl carbonate, tert-hexyl peroxybenzoate, and tert-butyl peroxybenzoate; inorganic peroxide-type polymerization initiators such as potassium persulfate and ammonium persulfate; and redox initiators such as hydrogen peroxide-ferrous systems, benzoyl peroxide-dimethylaniline systems, and cerium(IV) salt-alcohol systems. The photopolymerization initiator can be exemplified by benzophenones, benzoin ethers, acetophenones, and thioxanthones. As necessary two or more of these radical polymerization initiators may be used in combination.

The amount of use of the polymerization initiator used here is preferably in the range from 0.1 to 20 mass parts per 100 mass parts of the polymerizable monomer.

The polymer segment represented by $P_1$ may also be produced using any of the following polymerization methods: solution polymerization, suspension polymerization, emulsion polymerization, dispersion polymerization, precipitation polymerization, and bulk polymerization. Among these, solution polymerization in a solvent capable of dissolving each of the components used during production is preferred. Specifically, a single one of the following or a mixture of the following can be used as the solvent: polar organic solvents such as alcohols, ketones such as acetone and methyl ethyl ketone, ethers, ethylene glycol monoalkyl ethers and their acetates, propylene glycol monoalkyl ethers and their acetates, and diethylene glycol monoalkyl ethers, and nonpolar solvents such as toluene and xylene. Among the preceding, the use is more preferred of a single selection from or a mixture of solvents having a boiling point in the temperature range from 100 to 180° C. With regard to the specific polymerization temperature, the polymerization is generally carried out in the temperature range from −30 to 200° C., while a more preferred temperature range is 40 to 180° C.

The molecular weight distribution and/or molecular structure of the polymer segment represented by $P_1$ can be controlled using known methods. Specifically, a polymer segment $P_1$ having a controlled molecular weight distribution and/or molecular structure can be produced by using, for example, the following methods: methods that use an addition-fragmentation chain transfer agent (refer to Japanese Patent Nos. 4,254,292 and 3,721,617); NMP methods, which use the dissociation and bonding of an amine oxide radical (for example, Chemical Reviews, 2001, Volume 101, pp. 3661-3688); ATRP methods, which use a halogen compound as the polymerization initiator and carry out polymerization using a metal catalyst and ligands (for example, Chemical Reviews, 2001, Volume 101, pp. 3689-3745); RAFT methods, which use a dithiocarboxylate ester or xanthate compound as the polymerization initiator (for example, Japanese Translation of PCT Application No. 2000-515181); and also MADIX methods (for example, WO 99/05099) and DT methods (for example, Journal of the American Chemical Society, 2003, Volume 125, pp. 8720-8721).

Step 4 is described in the following.

An azo skeleton structure-containing compound in which the linking group has a carboxamide bond can be synthesized in step 4 by reacting, using a known method, the amino group in the azo compound (23) with a carboxyl group-bearing polymer segment $P_1$. Specific examples are methods that use a dehydration condensation agent, e.g., 1-ethyl-3-(3-dimethylaminopropyl)carbodiimide hydrochloride (for example, The Journal of Organic Chemistry, 1961, Volume 26, Number 7, pp. 2525-2528) and the Schotten-Baumann method (for example, Chemical Reviews, 1953, Volume 52, Number 2, pp. 237-416).

Step 4 may be carried out in the absence of solvent, but is preferably carried out in the presence of a solvent in order to prevent the sudden development of the reaction. The solvent can be exemplified by the ethers, hydrocarbons, halogenated hydrocarbons, amides, and nitriles among the solvents provided as examples in step 1. In addition, a mixture of two or more of these solvents may be used as necessary. The amount of use of the solvent, considered from the standpoint of the reaction rate, is preferably in the range from 1.0- to 20-fold the mass of the polymer segment indicated by $P_1$.

Step 4 is generally carried out in the temperature range from 0 to 250° C. and is generally complete within 24 hours.

Method (ii) is described in detail in the following using the scheme provided below as an example.

In method (ii), an azo compound is synthesized in which the substituent that forms the linking group with the polymer segment is present at a position (the Ar in formula (1)) different from that in method (i), and the azo skeleton structure-containing compound is then synthesized by bonding this azo compound to the polymer segment using a condensation reaction.

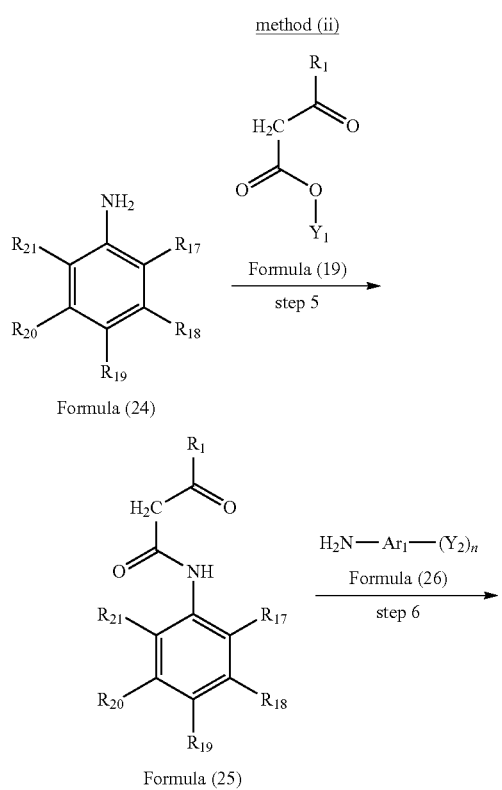

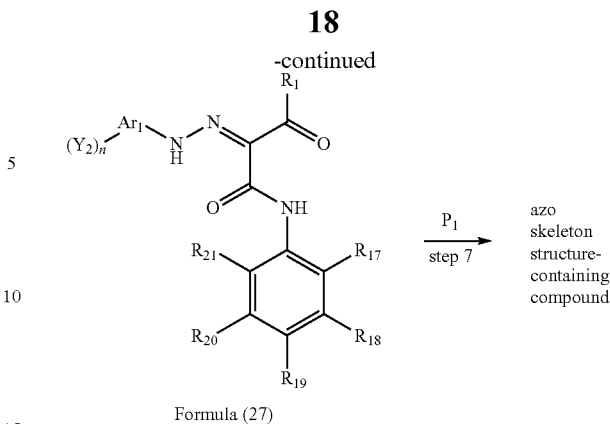

Formula (27)

$R_1$ and $R_{17}$ to $R_{21}$ in formulas (24) to (27) have the same definitions as the $R_1$ and $R_{17}$ to $R_{21}$ in formula (5). $Y_1$ and $P_1$ have the same definitions as the $Y_1$ and $P_1$ in the preceding scheme for method (i). The $Ar_1$ in formulas (26) and (27) represents an arylene group. $Y_2$ in formulas (26) and (27) represents a substituent that reacts with $P_1$ with the formation of a divalent linking group as described above. n represents an integer with a value of 1 or 2.

The azo skeleton structure-containing compound can be synthesized by proceeding through steps 5 to 7 in the scheme provided above as an example. In step 5, the acetoacetate analog given by formula (19) is amidated with the aniline derivative given by formula (24) to synthesize the intermediate (25), which is an acylacetoanilide analog. In step 6, diazo coupling is carried out between the intermediate (25) and the aniline derivative (26) to synthesize the azo compound (27). Synthesis is carried out in step 7 by, for example, a condensation reaction between the azo skeleton structure and the polymer segment $P_1$.

Step 5 is described first. The intermediate (25), which is an acylacetoanilide analog, is synthesized in step 5 using the same method as for step 1 in method (i).

Step 6 is described as follows. The azo compound (27) can be synthesized in step 6 using the same method as for step 2 in method (i).

The aniline derivative (26) is available commercially in a variety of species and thus can be readily acquired. It can also be readily synthesized by known methods.

Step 7 is described as follows.

The azo skeleton structure-containing compound can be synthesized in step 7 using the same method as for the synthesis of the polymer segment $P_1$ in method (i) and carrying out, for example, a condensation reaction between the azo skeleton structure (27) and the polymer segment $P_1$. Specifically, for example, an azo skeleton structure-containing compound in which the linking group has a carboxylate ester bond can be synthesized using a carboxyl group-bearing polymer segment $P_1$ and an azo compound (27) in which $Y_2$ is a substituent having the hydroxyl group. In addition, an azo skeleton structure-containing compound in which the linking group has a carboxamide bond can be synthesized using a carboxyl group-bearing polymer segment $P_1$ and an azo compound (27) in which $Y_2$ is a substituent having the amino group.

Method (iii) is described in detail in the following using the scheme provided below as an example.

In method (iii), the azo skeleton structure-containing compound is synthesized by preliminarily synthesizing a polymerizable functional group-bearing azo compound and copolymerizing this with a polymerizable monomer that forms the monomer unit represented by formula (2).

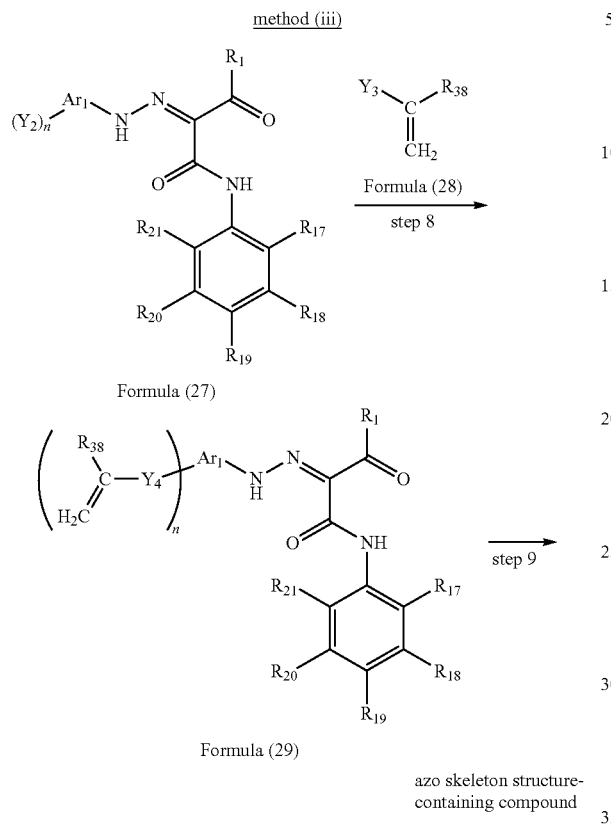

Formula (27)

Formula (28)

step 8

Formula (29)

step 9 azo skeleton structure-containing compound

In formula (27), $R_1$, $R_{17}$ to $R_{21}$, $Ar_1$, $Y_2$, and n each have the same definition as the $R_1$, $R_{17}$ to $R_{21}$, $Ar_1$, $Y_2$, and n in formula (27) in the scheme for method (ii). In formula (28), $R_{38}$ represents a hydrogen atom or an alkyl group and $Y_3$ represents a substituent that reacts with the $Y_2$ in formula (27) to form the $Y_4$ in formula (29). In formula (29), $R_1$, $R_{17}$ to $R_{21}$, $Ar_1$, and n each have the same definition as in formula (27), and $Y_4$ represents a divalent linking group that is formed when $Y_2$ in formula (27) reacts with $Y_3$ in formula (28). The azo skeleton structure-containing compound can be synthesized in the scheme for method (iii) provided above as an example by proceeding through steps 8 and 9. In step 8, a polymerizable functional group-bearing azo compound (29) is synthesized by reacting the azo compound (27) with the vinyl group-containing compound given by formula (28). In step 9, the polymerizable functional group-bearing azo compound (29) is copolymerized with a polymerizable monomer that forms the monomer unit represented by formula (2).

Step 8 is described first. In step 8, the polymerizable functional group-bearing azo compound (29) can be synthesized using the same method as for step 4 in the previously described method (i).

In step 9, the azo skeleton structure-containing compound can be synthesized by copolymerizing, using the same method as for the synthesis of $P_1$ in method (i), the azo skeleton structure (29) with polymerizable monomer that forms the monomer unit represented by formula (2).

Method (iv) is described in detail in the following using the scheme provided below as an example.

In method (iv), the azo skeleton structure-containing compound is synthesized by using a preliminarily synthesized halogen atom-bearing azo compound as a polymerization initiator and carrying out copolymerization with a polymerizable monomer that forms the monomer unit represented by formula (2).

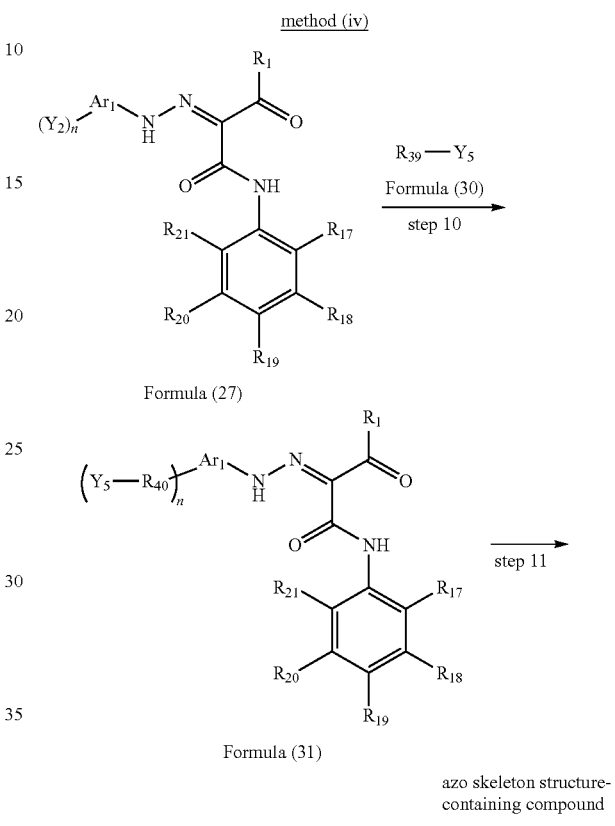

Formula (27)

Formula (30)

step 10

Formula (31)

step 11 azo skeleton structure-containing compound

In formula (27), $R_1$, $R_{17}$ to $R_{21}$, $Ar_1$, $Y_2$, and n each have the same definition as the $R_1$, $R_{17}$ to $R_{21}$, $Ar_1$, $Y_2$, and n in formula (27) in the scheme for method (ii). In formula (30), $R_{39}$ represents a substituent that reacts with the $Y_2$ in formula (27) to form the $R_{40}$ in formula (31), and $Y_5$ represents a chlorine atom, bromine atom, or iodine atom. In formula (31), $R_1$, $R_{17}$ to $R_{21}$, $Ar_1$, and n each have the same definition as in formula (27), and $R_{40}$ represents a divalent linking group that is formed when $Y_2$ in formula (27) reacts with $R_{39}$ in formula (30). The azo skeleton structure-containing compound can be synthesized in the scheme provided above as an example by proceeding through steps 10 and 11. In step 10, a halogen atom-bearing azo compound (31) is synthesized by reacting the azo compound (27) with the halogen atom-containing compound given by formula (30). In step 11, copolymerization with polymerizable monomer that forms the monomer unit represented by formula (2) is carried out using the halogen atom-bearing azo compound (31) as a polymerization initiator.

Step 10 is described first.

In step 10, the halogen atom-bearing azo compound (31) can be synthesized using the same method as in step 4 in the previously described method (i). Specifically, the halogen atom-bearing azo compound (31) can be synthesized using, for example, a halogen atom-containing compound (30) that has a carboxyl group and an azo compound (27) in which $Y_2$ is a hydroxyl group-bearing substituent. The halogen atom-bearing azo compound (31) can also be synthesized using a halogen atom-containing compound (30) that has a carboxyl group and an azo compound (27) in which $Y_2$ is an amino group-bearing substituent. In addition, a halogen atom-containing azo compound (30) that has a hydroxyl group can be used and can be reacted with an azo compound (27) in which $Y_2$ is a carboxyl group-bearing substituent.

The halogen atom-containing compound (30) having a carboxyl group can be exemplified by chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-β-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-β-phenylpropionic acid, α-iodo-β-phenylpropionic acid, β-chlorobutyric acid, β-bromoisobutyric acid, iododimethylmethylbenzoic acid, and 1-chloroethylbenzoic acid; the acid halides and acid anhydrides of the preceding can also be similarly used.

The halogen atom-containing compound (30) having a hydroxyl group can be exemplified by 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, and 2-phenyl-2-iodoethanol.

Step 11 is described in the following.

The azo skeleton structure-containing compound can be synthesized in step 11 using the ATRP method from the previously described method (ii). Specifically, using the halogen atom-bearing azo compound (31) as a polymerization initiator, copolymerization is carried out, in the presence of a metal catalyst and a ligand, with polymerizable monomer that forms the monomer unit represented by formula (2).

The metal catalyst used in the ATRP method is not particularly limited, but at least one transition metal selected from Groups 7 to 11 of the Periodic Table is favorable. With regard to the redox catalyst (redox-couple complex) that reversibly converts between a low-valent complex and a high-valent complex, the low-valent metal that is specifically used can be exemplified by a metal selected from the group consisting of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$. $Cu^+$, $Ru^{2+}$, $Fe^{2+}$, and $Ni^{2+}$ are preferred among the preceding, and $Cu^+$ is particularly preferred. Monovalent copper compounds can be specifically exemplified by cuprous chloride, cuprous bromide, cuprous iodide, and cuprous cyanide.

Organic ligands are generally used as the ligand used in the ATRP method. Examples are 2,2'-bipyridyl and its derivatives, 1,10-phenanthroline and its derivatives, tetramethylethylenediamine, N,N,N',N'',N''-pentamethyldiethylenetriamine, tris(dimethylaminoethyl)amine, triphenylphosphine, and tributylphosphine, whereamong aliphatic polyamines such as N,N,N',N'',N''-pentamethyldiethylenetriamine are preferred in particular.

The azo skeleton structure-containing compounds yielded by the synthesis methods provided above as examples and the compounds with formulas (20), (22), (23), (25), (27), (29), and (31) can be purified using the usual isolation and purification methods for organic compounds. These isolation and purification methods can be exemplified by recrystallization or reprecipitation using organic solvents and by column chromatography using silica gel. High-purity compounds can be obtained by carrying out purification using a single one or a combination of these methods.

<The Acidic Group Structure-Containing Compound>

The acidic group structure-containing compound is described in the following.

The acidic group structure-containing compound is a polymer compound that has a monomer unit that contains a structure selected from the partial structures (acidic group structures) given by formulas (3) and (4).

The acidic group structure is described in detail first.

The halogen atom encompassed by $R_8$ to $R_{11}$ in formula (3) and $R_{12}$ to $R_{16}$ in formula (4) can be exemplified by the fluorine atom, chlorine atom, bromine atom, and iodine atom.

The $C_{1-18}$ alkyl group encompassed by $R_8$ to $R_{11}$ in formula (3) can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, cyclohexyl group, octyl group, 2-ethylhexyl group, dodecyl group, hexadecyl group, and octadecyl group.

The $C_{1-18}$ alkoxy group encompassed by $R_8$ to $R_{11}$ in formula (3) can be exemplified by the methoxy group, ethoxy group, n-propoxy group, n-butoxy group, isopropoxy group, isobutoxy group, sec-butoxy group, tert-butoxy group, octyloxy group, 2-ethylhexyloxy group, and octadecyloxy group.

In addition, $R_8$ to $R_{11}$ in formula (3) may represent an organic group as required to form a ring with an adjacent position and may then form a ring with an adjacent position. This ring can be exemplified by rings formed by $C_{3-8}$ alkylene groups, heterocycles having the oxygen atom or sulfur atom present in the alkylene group, and the benzene ring.

Considering the affinity with the azo skeleton structure-containing compound, the $R_8$ to $R_{11}$ in formula (3) is, among the preceding, preferably the hydrogen atom, methyl group, methoxy group, isopropyl group, or tert-butyl group.

The metal atom encompassed by $M^1$ and $M^2$ in formula (3) can be exemplified by divalent to tetravalent metals such as Zn, Al, Si, B, Fe, Cr, and Zr.

Among the preceding, the $M^1$ and $M^2$ in formula (3) is preferably the hydrogen atom from the standpoint of the ease of production.

The alkyl group encompassed by $R_{12}$ to $R_{16}$ in formula (4) can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

The alkoxy group encompassed by $R_{12}$ to $R_{16}$ in formula (4) can be exemplified by the methoxy group, ethoxy group, n-propoxy group, n-butoxy group, isopropoxy group, isobutoxy group, sec-butoxy group, and tert-butoxy group.

Considering the affinity with the azo skeleton structure-containing compound, the $R_{12}$ to $R_{16}$ in formula (4) is, among the preceding, preferably the hydrogen atom, methyl group, or methoxy group.

The metal atom encompassed by $M^3$ in formula (4) can be exemplified by monovalent to trivalent metals such as Na, K, Mg, Ca, and Al.

Among the preceding, the $M^3$ in formula (4) is preferably the hydrogen atom or $NH_4$ from the standpoint of the ease of production. Viewed from the standpoint of the ease of production, the polymer compound having a monomer unit that contains a structure selected from the partial structures with formulas (3) and (4) preferably has a monomer unit represented by the following formula (8) or (9). In this case, the monomer unit of the acidic group structure-containing compound can be formed by a partial structure represented by formula (8) or (9) and a partial structure represented by formula (3) or (4).

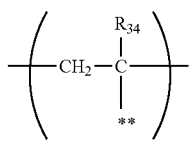

formula (8)

In formula (8), $R_{34}$ represents a hydrogen atom or an alkyl group. "**" represents a site bonded to a partial structure represented by formula (3) or (4).

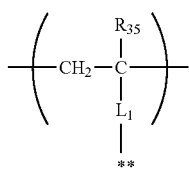

formula (9)

In formula (9), $R_{35}$ represents a hydrogen atom or an alkyl group. $L_1$ represents a divalent linking group. "**" represents a site bonded to a partial structure represented by formula (3) or (4).

The alkyl group encompassed by $R_{34}$ in formula (8) and the alkyl group encompassed by $R_{35}$ in formula (9) can be exemplified by straight-chain, branched, and cyclic alkyl groups such as the methyl group, ethyl group, n-propyl group, n-butyl group, n-pentyl group, n-hexyl group, isopropyl group, isobutyl group, sec-butyl group, tert-butyl group, and cyclohexyl group.

Among the preceding, the $R_{34}$ in formula (8) is preferably a hydrogen atom or the methyl group from the standpoint of the polymerizability of the polymerizable monomer that forms the monomer unit.

Among the preceding, the $R_{35}$ in formula (9) is preferably a hydrogen atom or the methyl group from the standpoint of the polymerizability of the polymerizable monomer that forms the monomer unit.

Viewed in terms of the ease of production, a linking group containing a carboxylate ester bond, a carboxamide bond, or a sulfonamide bond is preferred for the linking group $L_1$ in formula (9). A structure given by any of the following formulas (10) to (15) is more preferred from the standpoint of the ease of starting material acquisition and ease of production.

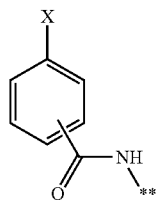

Formula (10)

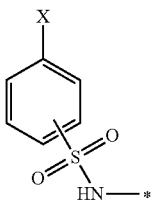

Formula (11)

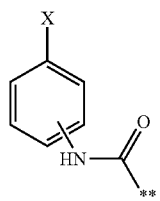

Formula (12)

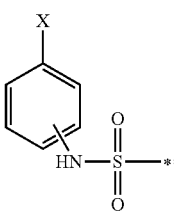

Formula (13)

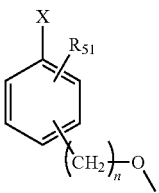

Formula (14)

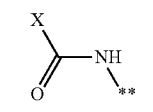

Formula (15)

In formulas (10) to (15), X represents a site bonded to the carbon to which $L_1$ is bonded in formula (9) and "**" represents a site bonded to formula (3) or (4). n is an integer from 1 to 3. In formula (13), the single bond of the phenylene with X may be an amide bond (for example, —CONH—). $R_{51}$ represents a hydrogen atom or a $C_{1-4}$ alkyl group. With regard to the substitution position of the substituents in formulas (10) to (14), substitution may be at the o-position, m-position, or p-position with respect to X, but substitution at the m-position or p-position is preferred from the standpoint of the affinity with the azo skeleton structure-containing compound.

The n in formula (14) is from 1 to 3, but n is preferably 1 from the standpoint of the ease of production.

The polymer compound having a monomer unit containing a structure selected from the partial structures given by formulas (3) and (4) may be a copolymer having a monomer unit represented by the following formula (32).

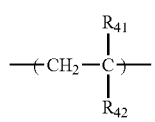

formula (32)

[In formula (32), $R_{41}$ represents a hydrogen atom or an alkyl group. $R_{42}$ represents a phenyl group, carboxy group, alkoxycarbonyl group, or carboxamide group.]

The alkyl group encompassed by $R_{41}$ in formula (32) can be exemplified as for $R_{34}$ in formula (8). Viewed in terms of the polymerizability of the polymerizable monomer that forms the monomer unit, $R_{41}$ in formula (32) is preferably a hydrogen atom or the methyl group from among the preceding.

The alkoxycarbonyl group and carboxamide group encompassed by $R_{42}$ in formula (32) can be exemplified as for the $R_4$ in formula (2).

The $R_{42}$ in formula (32) may also be substituted by a substituent. This substituent can be exemplified by alkoxy groups such as the methoxy group and ethoxy group; amino groups such as the N-methylamino group and N,N-dimethylamino group; acyl groups such as the acetyl group; and halogen atoms such as the fluorine atom and chlorine atom.

Among the preceding, the $R_{42}$ in formula (32) is preferably a phenyl group or an alkoxycarbonyl group considering the compatibility and dispersibility in the medium of the azo skeleton structure-containing compound.

The affinity of the polymer segment with the dispersion medium can be controlled by changing the proportion of the monomer unit given by formula (32). When the dispersion medium is a nonpolar solvent such as styrene, monomer unit in which the $R_{42}$ in formula (32) is the phenyl group is preferably present in a large proportion from the standpoint of the affinity with the dispersion medium. When the dispersion medium is a solvent having some degree of polarity, such as an acrylate ester, monomer unit in which $R_{42}$ in formula (32) is a carboxyl group, alkoxycarbonyl group, or carboxamide group is preferably present in a large proportion from the standpoint of the affinity with the dispersion medium.

The number-average molecular weight of this polymer compound is preferably 2,000 to 50,000 considering the affinity with the non-water-soluble solvent and the ease of production.

With regard to the position of the acidic group structure in the acidic group structure-containing compound, it may be randomly present at individual points or may be unevenly distributed wherein one or a plurality of blocks are formed at one end.

Based on the balance between the affinity for the azo skeleton structure-containing compound and the affinity for the dispersion medium, the number of acidic group structures in the acidic group structure-containing compound, expressed per 100 monomers forming the polymer compound, is preferably 0.5 to 20 and more preferably 1 to 10.

<Methods of Producing the Acidic Group Structure-Containing Compound>

Methods of producing the acidic group structure-containing compound are described in the following.#

Methods for synthesizing the acidic group structure-containing compound can be exemplified by the methods given in (v) to (ix) below.

Method (v) will be described in detail first. In method (v), the acidic group structure-containing compound is produced by the polymerization by a known method of, for example, a vinylsalicylic acid or p-styrenesulfonic acid—which are polymerizable monomers that form the monomer unit containing a partial structure given by formula (3) or (4)—with a polymerizable monomer. This polymerizable monomer can be exemplified by styrene, acrylic acid, acrylate esters, and methacrylate esters.

The polymerization method used for the acidic group structure-containing compound can be exemplified by radical polymerization, cationic polymerization, living polymerization, and anionic polymerization, whereamong the use of radical polymerization is preferred from the standpoint of the ease of production.

This radical polymerization is the same as that described above with regard to the methods of producing the azo skeleton structure-containing compound (step 4).

Production may also be carried out using any of the following polymerization methods for the polymerization method for the acidic group structure-containing compound: solution polymerization, suspension polymerization, emulsion polymerization, dispersion polymerization, precipitation polymerization, and bulk polymerization. Among these, solution polymerization in a solvent capable of dissolving each of the components used during production is preferred. Specifically, a single one of the following or a mixture of the following can be used as the solvent: polar organic solvents such as alcohols, ethers, ethylene glycol monoalkyl ethers and their acetates, propylene glycol monoalkyl ethers and their acetates, diethylene glycol monoalkyl ethers, N,N-dimethylformamide, and N-methyl-2-pyrrolidone, and nonpolar solvents such as toluene and xylene. Among the preceding, the use is more preferred of a single selection from or a mixture of solvents having a boiling point in the temperature range from 100 to 180° C.

With regard to the specific polymerization temperature, the polymerization is generally carried out in the temperature range from −30 to 200° C., while a more preferred temperature range is 40 to 180° C.

Method (vi) is described in detail in the following.

In method (vi), the acidic group structure-containing compound of the present invention is produced by synthesizing an acidic group structure-bearing polymerizable monomer using the Williamson reaction, which is a known method, followed by polymerization by a known method.

One example of the synthesis of the acidic group structure-bearing polymerizable monomer is the reaction of a vinylphenylalkylene halide with a hydroxysalicylic acid compound.

The vinylphenylalkylene halide that can be used in the synthesis using the Williamson reaction can be specifically exemplified by the following substituted and unsubstituted vinylphenylalkylene halides: 4-(chloromethyl)styrene, 4-(bromomethyl)styrene, 3-methoxy-4-(chloromethyl)styrene, 3-methoxy-4-(bromomethyl)styrene, 2-hydroxy-4-(chloromethyl) styrene, 2-hydroxy-4-(bromomethyl)styrene, 2-methoxy-4-(chloromethyl)styrene, 2-methoxy-4-(bromomethyl)styrene, 3-tert-butyl-4-(chloromethyl) styrene, 3-tert-butyl-4-(bromomethyl)styrene, 3-isooctyl-4-(chloromethyl) styrene, 3-isopropyl-4-(chloromethyl)styrene, 3-methyl-4-(chloromethyl)styrene, 3-ethoxy-4-(chloromethyl)styrene, 3-carboxy-4-(chloromethyl) styrene, 3-(chloromethyl)styrene, 5-methyl-3-(chloromethyl)styrene, 5-isopropyl-3-(chloromethyl) styrene, 5-isooctyl-3-(chloromethyl) styrene, 5-methoxy-3-(chloromethyl)styrene, 4-ethoxy-3-(chloromethyl)styrene, 4-carboxy-3-(chloromethyl)styrene, 5-hydroxy-3-(chloromethyl) styrene, 4-hydroxy-3-(chloromethyl) styrene, 4-methoxy-3-(chloromethyl) styrene, 5-tert-butyl-3-(chloromethyl)styrene, 2-(chloromethyl)styrene, 3-tert-butyl-2-(chloromethyl)styrene, 4-(2-chloroethyl)styrene, 3-methoxy-4-(2-bromoethyl) styrene, 2-hydroxy-4-(2-chloroethyl)styrene, 3-ethoxy-4-(2-chloroethyl)styrene, 3-(2-chloroethyl)styrene, 5-isopropyl-3-(2-chloroethyl)styrene, 5-hydroxy-3-(2-chloroethyl) styrene, 4-hydroxy-3-(2-chloroethyl)styrene, 2-(2-chloroethyl)styrene, 4-(3-chloropropyl)styrene, 2-methoxy-4-(3-chloropropyl)styrene, 2-isopropyl-4-(3-chloropropyl) styrene, 2-isooctyl-4-(3-chloropropyl)styrene, 3-methoxy-4-(3-chloropropyl)styrene, 3-(3-chloropropyl)styrene, 5-isooctyl-3-(3-chloropropyl)styrene, 5-methoxy-3-(3-chloropropyl)styrene, and 2-(3-chloropropyl)styrene.

The hydroxysalicylic acid can be specifically exemplified by hydroxysalicylic acids such as 2,3-dihydroxybenzoic acid, 5-methyl-2,3-dihydroxybenzoic acid, 5-ethyl-2,3-dihydroxybenzoic acid, 5-isopropyl-2,3-dihydroxybenzoic acid, 5-n-butyl-2,3-dihydroxybenzoic acid, 5-tert-butyl-2,3-dihydroxybenzoic acid, 5-isooctyl-2,3-dihydroxybenzoic acid, 4-carboxy-2,3-dihydroxybenzoic acid, 4-methoxy-2,3-dihydroxybenzoic acid, 4-ethoxy-2,3-dihydroxybenzoic acid, 6-butoxy-2,3-dihydroxybenzoic acid, 4-hydroxy-2,3-dihydroxybenzoic acid, 6-hydroxy-2,3-dihydroxybenzoic acid, 2,4-dihydroxybenzoic acid, 6-methyl-2,4-dihydroxybenzoic acid, 6-isopropyl-2,4-dihydroxybenzoic acid, 6-tert-butyl-2,4-dihydroxybenzoic acid, 6-isooctyl-2,4-dihydroxybenzoic acid, 5-methoxy-2,4-dihydroxybenzoic acid, 5-ethoxy-2,4-dihydroxybenzoic acid, 6-butoxy-2,4-dihydroxybenzoic acid, 6-carboxy-2,4-dihydroxybenzoic acid, 5-hydroxy-6-methyl-2,4-dihydroxybenzoic acid, 2,5-dihydroxybenzoic acid, 3-methyl-2,5-dihydroxybenzoic acid, 3-isopropyl-2,5-dihydroxybenzoic acid, 3-tert-butyl-2,5-dihydroxybenzoic acid, 3-isooctyl-2,5-dihydroxybenzoic acid, 3-carboxy-2,5-dihydroxybenzoic acid, 6-methoxy-2,5-dihydroxybenzoic acid, 3-tert-butoxy-2,5-dihydroxybenzoic acid, 6-hydroxy-3-methyl-2,5-dihydroxybenzoic acid, 3,4,6-triisopropyl-2,5-dihydroxybenzoic acid, 2,6-dihydroxybenzoic acid, 3-isopropyl-2,6-dihydroxybenzoic acid, 4-tert-butyl-2,6-dihydroxybenzoic acid, and 5-methyl-2,6-dihydroxybenzoic acid.

The reaction solvent that can be used in this reaction can be specifically exemplified by organic solvents such as alcohol, ether, and glycol organic solvents, e.g., methanol, ethanol, ethylene glycol monomethyl ether, ethylene glycol monoethyl ether, propylene glycol monomethyl ether, ethylene glycol dimethyl ether, diethylene glycol dimethyl ether, ethylene glycol diethyl ether, triethylene glycol dimethyl ether, tetraethylene glycol dimethyl ether, ethylene glycol, and propylene glycol; aprotic polar solvents such as N,N-dimethylformamide, N,N-dimethylacetamide, N-methyl-2-pyrrolidone, and dimethyl sulfoxide; ketones such as acetone, methyl ethyl ketone, and methyl isobutyl ketone; esters such as ethyl acetate, butyl acetate, ethyl propionate, and cellosolve acetate; hydrocarbons such as hexane, octane, petroleum ether, cyclohexane, benzene, toluene, and xylene; and halogenated hydrocarbons such as trichloroethylene, dichloromethane, and chloroform. In addition, a base is preferably added in order to promote the reaction and scavenge the hydrogen halide that is produced as a secondary product during ether bond formation. The base used here should not cause the reaction system to become more complex by reacting with the solvent or medium, but is not otherwise particularly limited and can be exemplified by alkali metal hydroxides such as lithium hydroxide, sodium hydroxide, and potassium hydroxide and by alkali metal carbonates such as lithium carbonate, sodium carbonate, and potassium carbonate.

The polymerization for obtaining the acidic group structure-containing compound can be carried out by the same known methods as in method (v).

Method (vii) is described in detail in the following using the scheme provided below as an example.

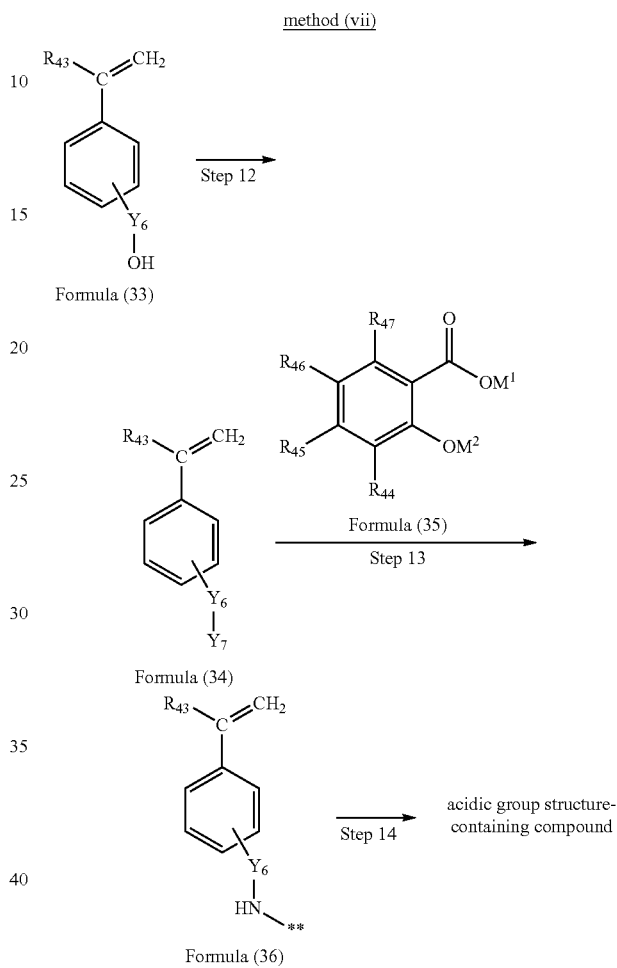

$R_{43}$ in formulas (33), (34), and (36) represents a hydrogen atom or an alkyl group. This alkyl group can be exemplified by the same alkyl groups as described above for $R_{34}$. $Y_6$ in formulas (33), (34), and (36) represents —CO— or —SO$_2$—. $Y_7$ in formula (34) represents a halogen atom, and the $R_{44}$ to $R_{47}$ and $M^1$ and $M^2$ in formula (35) have the same definitions as the $R_8$ to $R_{11}$ and $M^1$ and $M^2$ in formula (3), respectively. At least one of $R_{44}$ to $R_{47}$ represents an amino group. The "**" represents a site bonded to the partial structure given by formula (35).

The acidic group structure-containing compound is synthesized in method (vii) through the following steps 12, 13, and 14. Step 12 is a step in which the styrene derivative given by formula (33) is halogenated to synthesize the intermediate (34), which is the acid halide of the styrene derivative. Step 13 is a step in which the aminosalicylic acid derivative (35) is amidated with the intermediate (34). Step 14 is a step in which the previously described polymerizable monomer is copolymerized with the polymerizable monomer that forms the monomer unit of the acidic group structure-containing compound.

Step 12 will be described first. Known methods can be used for step 12 (for example, New Experimental Chemistry, Series 3, Volume 14-2, pp. 1111-1119). Specifically, the intermediate (34) can be synthesized by reacting the styrene derivative (33) with a halogenating agent, as necessary in the presence of a solvent and a catalyst.

The styrene derivative (33) is available commercially in a variety of species and thus can be readily acquired. It can also be synthesized by known methods.

Halogenating agents usable in step 12 can be exemplified by thionyl halides such as thionyl chloride and thionyl bromide; phosphoryl halides such as phosphoryl chloride and phosphoryl bromide; phosphorus halides such as phosphorus pentachloride, phosphorus trichloride, phosphorus pentabromide, and phosphorus tribromide; oxalyl halides such as oxalyl chloride; and by cyanuric fluoride, phosgene, triphenylphosphine-carbon tetrachloride, and triphenylphosphine-carbon tetrabromide.

With regard to the amount of use of the halogenating agent, the halogenating agent is used, per 1 mole of the styrene derivative (33), at from 1.0 to 30 moles, preferably 1.0 to approximately 20 moles, and more preferably 1.0 to 10 moles.

Step 12 may be run in the absence of a solvent, but may also be run in a solvent when controlling the reaction temperature is problematic and/or when by-products are produced. The solvent can be exemplified by ethers, hydrocarbons, halocarbons, amides, nitriles, and sulfur-containing compounds such as dimethyl sulfoxide and sulfolane. Viewed from the standpoint of the production efficiency, the amount of use of the solvent is preferably in the range from 1.0- to 20-fold on a mass basis with reference to the styrene derivative (33).

The reaction in step 12 may be accelerated through the addition of a suitable catalyst. For example, pyridine, hexamethylphosphoric triamide, and so forth are suitably used as the catalyst.

A polymerization inhibitor can be used in step 12 in order to prevent the polymerization of the styrene derivative (33) during the reaction. This polymerization inhibitor can be exemplified by quinones such as p-benzoquinone, naphthoquinone, and 2,5-diphenyl-p-benzoquinone; polyhydric phenols such as hydroquinone, p-t-butylcatechol, and 2,5-di-t-butylhydroquinone; and phenols such as hydroquinone monomethyl ether, di-t-butyl-para-cresol, and α-naphthol. The amount of addition of the polymerization inhibitor is preferably an addition in the range from 10 to 5,000 ppm with reference to the styrene derivative (33).

Step 12 is generally run in the temperature range from −50 to approximately 120° C., but is preferably run in the temperature range from −20° C. to 60° C. in order to prevent thermal polymerization of the styrene derivative (33). In addition, this reaction is generally complete within 24 hours.

After removal of unreacted halogenating agent, solvent, and so forth, the intermediate (34) yielded by step 12 can be used as such in its crude state in the next step.

Step 13 is described in the following. Known methods can be used for step 13. An example of a typical reaction procedure is the Schotten-Baumann method (for example, Chemical Reviews, 1953, Volume 52, Number 2, pp. 237-416). Specifically, the polymerizable monomer (36) can be synthesized by reacting the intermediate (34) obtained in step 12 with the aminosalicylic acid derivative (35) in the presence as necessary of a solvent and base.

The aminosalicylic acid derivative (35) is available commercially in a variety of species and thus can be readily acquired. It can also be synthesized by known methods.

This step can also be run in the absence of a solvent, but is preferably run in a solvent in order to prevent the sudden development of the reaction. The solvent can be exemplified by water, esters, ketones, ethers, hydrocarbons, and amides. A mixture of two or more of these solvents may also be used. Considering the production efficiency, the amount of use of the solvent is preferably in the range from 1.0- to 20-fold on a mass basis with reference to the intermediate (34) in conformity with reagent solubility.

Step 13 can be carried out in the temperature range from −20° C. to 200° C., but is preferably carried out in the temperature range from −20° C. to 60° C. in order to prevent the thermal polymerization of the polymerizable monomer (36) and the intermediate (34). In addition, this reaction is generally complete within 24 hours.

A polymerization inhibitor may be used in step 13 in order to inhibit the polymerization of the polymerizable monomer (36) and the intermediate (34) during the reaction. This polymerization inhibitor can be exemplified by the same polymerization inhibitors as for step 12. The amount of addition of the polymerization inhibitor is generally preferably an addition in the range from 10 to 5,000 ppm with reference to the polymerizable monomer (36) or intermediate (34).

The reaction in step 13 can be accelerated by the removal with a base of the hydrogen chloride that is produced during the reaction. This base can be exemplified by alkali hydroxides such as sodium hydroxide and potassium hydroxide and by organic bases such as pyridine, triethylamine, and N,N-diisopropylethylamine. The aminosalicylic acid derivative (35) may also be used in excess. A mixture of two or more of these bases may also be used. The mixing ratio when a mixture is used may be freely selected. The use amount for the base is preferably at least equimolar with respect to the intermediate (34), and it may also be used as the reaction solvent.

The method of producing the polymerizable monomer (36) is not particularly limited to the synthesis scheme provided above as an example. For example, the following, inter alia, may also be used as appropriate: methods in which the styrene derivative (33) is converted to the acid anhydride rather than synthesizing the acid halide (34), and amidation with the aminosalicylic acid derivative (35) is then carried out as in the scheme provided above as an example; methods in which the polymerizable monomer (36) is directly obtained by reacting the styrene derivative (33) with the aminosalicylic acid derivative (35) in the presence of a condensing agent.

The usual isolation and purification methods for organic compounds can be used with the compounds with formulas (36) and (34) obtained in this step. These isolation and purification methods can be exemplified by recrystallization and reprecipitation and by column chromatography using an adsorbent such as silica gel. The target compounds can be obtained at high purities by carrying out purification using a single one or a combination of these methods.

Step 14 is described in the following. The polymerization method of step 14 for obtaining the acidic group structure-containing compound may be the same known methods as in step (v).

Method (viii) is described in detail in the following using the scheme provided below as an example.

method (viii)

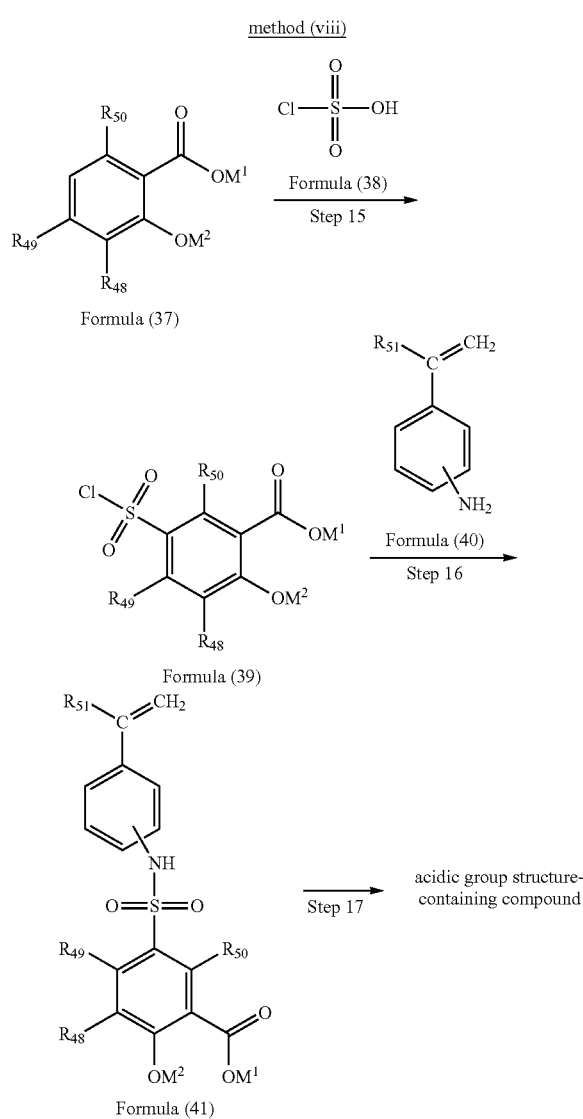

Formula (37)

Formula (39)

Formula (41)

$R_{48}$ to $R_{50}$ and $M^1$ and $M^2$ in formulas (37), (39), and (41) have the same definitions as the $R_8$ to $R_{11}$ and $M^1$ and $M^2$ in formula (3), respectively. $R_{51}$ in formulas (40) and (41) represents a hydrogen atom or an alkyl group. This alkyl group can be exemplified by the same alkyl groups as for the previously described $R_{34}$.

The acidic group structure-containing compound is synthesized in method (viii) using the following steps 15, 16, and 17. Step 15 is a step in which the salicylic acid derivative given by formula (37) is chlorosulfonated to obtain the intermediate (39). Step 16 is a step in which the intermediate (39) is amidated by the vinyl group-bearing amine derivative given by formula (40) to synthesize the polymerizable monomer given by formula (41). Step 17 is a step of copolymerization with polymerizable monomer that forms a monomer unit of the acidic group structure-containing compound.

Step 15 is described first. Known methods can be used for step 15 (for example, New Experimental Chemistry, Series 3, Volume 14-3, pp. 1787-1788).

The salicylic acid derivative (37) is available commercially in a variety of species and thus can be readily acquired. It can also be synthesized by known methods.

This step is preferably run in the absence of a solvent, but can also be run in a solvent when controlling the reaction temperature is problematic and/or when by-products are produced. A halogenated hydrocarbon solvent is preferred for the solvent. The amount of use of the solvent can be freely selected, but, considering the production efficiency, it is preferably in the range from 1.0- to 20-fold on a mass basis with reference to the salicylic acid derivative (37).

This reaction is generally run in the temperature range from −20° C. to 180° C. and is generally complete within 24 hours.

Step 16 is described in the following. Known methods can be used for step 16 (for example, New Experimental Chemistry, Series 3, Volume 14-3, pp. 1803-1804).

The vinyl group-bearing amine derivative (40) is available commercially in a variety of species and thus can be readily acquired. It can also be synthesized by known methods.

This step can also be run in the absence of a solvent, but is preferably run in a solvent in order to prevent the sudden development of the reaction. The solvent can be exemplified by water, esters, ketones, ethers, hydrocarbons, and amides. A mixture of two or more of these solvents may also be used. Considering the production efficiency, the amount of use of the solvent is preferably in the range from 1.0- to 20-fold on a mass basis with reference to the intermediate (39).

This step can be carried out in the temperature range from −20° C. to 200° C., but is preferably carried out in the temperature range from −20° C. to 60° C. in order to prevent the thermal polymerization of the polymerizable monomer (41) and the vinyl group-bearing amine derivative (40). In addition, this reaction is generally complete within 24 hours.

A polymerization inhibitor may be used in this step in order to inhibit the polymerization of the polymerizable monomer (41) and the vinyl group-bearing amine derivative (40) during the reaction. This polymerization inhibitor can be exemplified by the same polymerization inhibitors as for step 12. The amount of addition of the polymerization inhibitor is generally preferably in the range from 10 to 5,000 ppm with reference to the polymerizable monomer (41) or the vinyl group-bearing amine derivative (40).

The reaction in this step can be accelerated by the removal with a base of the hydrogen chloride that is produced during the reaction. This base can be exemplified by alkali hydroxides such as sodium hydroxide and potassium hydroxide and by organic bases such as pyridine, triethylamine, and N,N-diisopropylethylamine. The vinyl group-bearing amine derivative (40) may also be used in excess. A mixture of two or more of these bases can be used, and the mixing ratio when a mixture is used may be freely selected. The amount of use for the base is preferably at least equimolar with respect to the intermediate (39), and it may also be used as the reaction solvent in place of the solvents referenced above.

The usual isolation and purification methods for organic compounds can be used on the compounds with formulas (37), (39), and (41) obtained in the individual steps. These isolation and purification methods are the same as the methods described above for step 13.

Step 17 is described in the following. The polymerization in step 17 for obtaining the acidic group structure-containing compound can be carried out by the same known methods as in method (v).

Method (ix) is described in detail in the following using the scheme provided below as an example.

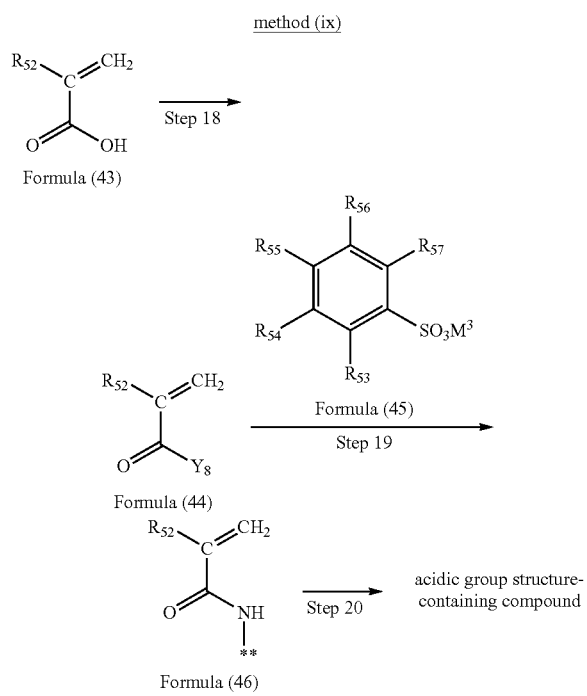

$R_{52}$ in formulas (43), (44), and (46) represents a hydrogen atom or an alkyl group. This alkyl group can be exemplified by the same alkyl groups as described above for $R_{34}$. $Y_8$ in formula (44) represents a halogen atom. The $R_{53}$ to $R_{57}$ and $M^3$ in formula (45) have the same definitions as the $R_{12}$ to $R_{16}$ and $M^3$ in formula (4). At least one of $R_{53}$ to $R_{57}$ represents an amino group. The "**" represents a site bonded to the partial structure given by formula (45).

The acidic group structure-containing compound is synthesized in method (ix) using the following steps 18, 19, and 20. Step 18 is a step in which the polymerizable monomer with formula (43) is halogenated to synthesize the intermediate (44), which is the acid halide of the polymerizable monomer. Step 19 is a step in which the benzenesulfonic acid derivative (45) is amidated with the intermediate (44) to synthesize the polymerizable monomer (46). Step 20 is a step of copolymerizing the polymerizable monomer (46) with polymerizable monomer that forms a monomer unit of the acidic group structure-containing compound.

Step 18 is described first. Known methods can be used for step 18 (for example, Experimental Chemistry, Series 3, Volume 14-2, pp. 1111-1119). Specifically, the intermediate (44) can be synthesized by reacting the polymerizable monomer (43) with a halogenating agent as necessary in the presence of a solvent and a catalyst.

The polymerizable monomer (43) is available commercially in a variety of species and thus can be readily acquired. It can also be synthesized by known methods.

The individual conditions in step 18 can be the same as in step 12.

Step 19 is described in the following. Known methods can be used for step 19. A typical reaction procedure is the Schotten-Baumann method (for example, Chemical Reviews, 1953, Volume 52, Number 2, pp. 237-416) as in the previously described step 13. Specifically, the polymerizable monomer (46) can be synthesized by reacting the intermediate (44) obtained in step 18 with the aminobenzenesulfonic acid derivative (45) as necessary in the presence of solvent and base.

The aminobenzenesulfonic acid derivative (45) is available commercially in a variety of species and thus can be readily acquired. It can also be synthesized by known methods.

The individual conditions in step 19 can be the same as in step 13.

Step 20 is described in the following. The polymerization in step 20 for obtaining the acidic group structure-containing compound can be carried out by the same known methods as in method (v).

<Compound Identification and Purity Measurement>

The compounds given by formulas (20), (22), (23), (25), (27), (29), (31), (36), (41), and (46) were identified and their purities were measured using nuclear magnetic resonance spectroscopic analysis (ECA-400, JEOL Ltd.), ESI-TOF MS (LC/MSD TOF, Agilent Technologies), and HPLC analysis (LC-20A, Shimadzu Corporation).

The acidic group structure-containing compounds were identified and their purities were measured using size exclusion chromatography (SEC) (HLC8220 GPC, Tosoh Corporation), nuclear magnetic resonance spectroscopic analysis (ECA-400, JEOL Ltd., or FT-NMR ADVANCE-600, Bruker BioSpin), and measurement of the acid value based on JIS K-0070 (Automatic Titrator COM 2500, Hiranuma Sangyo Co., Ltd.).

The pigment dispersion of the present invention contains a pigment, the azo skeleton structure-containing compound as described above, the acidic group structure-containing compound as described above, and a non-water-soluble solvent, which is the dispersion medium.

Yellow pigment that may be contained in the pigment dispersion of the present invention can be exemplified by azo pigments such as monoazo pigments, bisazo pigments, polyazo pigments, and condensed azo pigments, and by isoindoline pigments, azomethine pigments, anthraquinone pigments, and quinoxaline pigments. Among these, monoazo pigments, bisazo pigments, polyazo pigments, and isoindoline pigments can be advantageously used. Acetoacetoanilide pigments such as C. I. Pigment Yellow 74, 83, 93, 128, 155, 175, and 180 and isoindoline pigments such as C. I. Pigment Yellow 139 and 185 are specifically preferred. In particular, C. I. Pigment Yellow 155, 180, and 185 are more preferred due to the high dispersing effect provided by the hereabove-described azo skeleton structure-containing compound. A single one of these yellow pigments may be used or a mixture of two or more may be used.

With regard to yellow colorants that may be contained in the pigment dispersion of the present invention, a known yellow colorant may be used in combination with a yellow pigment as described above insofar as the dispersibility of the pigment is not impaired.

Co-usable colorants can be exemplified by compounds as represented by condensed azo compounds, isoindolinone compounds, anthraquinone compounds, azo metal complexes, methine compounds, quinophthalone compounds, and allylamide compounds.

The following can specifically be used: C. I. Pigment Yellow 12, 13, 14, 15, 17, 62, 94, 95, 97, 109, 110, 111, 120, 127, 129, 139, 147, 151, 154, 168, 174, 176, 181, 191, 194, 213, and 214; C. I. Vat Yellow 1, 3, and 20; Mineral Fast Yellow; Navel Yellow; Naphthol Yellow S; Hansa Yellow G; Permanent Yellow NCG; and C. I. Solvent Yellow 9, 17, 24, 31, 35, 58, 93, 100, 102, 103, 105, 112, 162, and 163.

A suitable selection from among the following, for example, can be used as the magenta pigment contained in the pigment dispersion of the present invention: quinacridone pigments, monoazo naphthol pigments, disazo naphthol pigments, perylene pigments, thioindigo pigments, diketopyrrolopyrrole pigments, naphthol AS pigments, and BONA lake pigments. Among these, quinacridone pigments, diketopyrrolopyrrole pigments, naphthol AS pigments, and BONA lake pigments are preferred. Specific examples are quinacridone pigments such as C. I. Pigment Red 202, 122, 192, and 209; diketopyrrolopyrrole pigments such as C. I. Pigment Red 255, 254, and 264; naphthol AS pigments such as C. I. Pigment Red 2, 3, 5, 6, 7, 23, 150, 146, 184, and 269; and BONA lake pigments such as C. I. Pigment Red 48:2, 48:3, 48:4, and 57:1. Quinacridone pigments such as C. I. Pigment Red 122 and 202 and naphthol AS pigments such as C. I. Pigment Red 255, 264, and 150 are particularly preferred from the standpoint of the affinity with the hereabove-described azo skeleton structure-containing compound and acidic group structure-containing compound. A single one of these magenta pigments may be used or a mixture of two or more may be used.

With regard to magenta colorants that may be contained in the pigment dispersion of the present invention, a known magenta colorant may be used in combination with a magenta pigment as described above insofar as the dispersibility of the pigment is not impaired.

Co-usable magenta colorants can be exemplified by condensed azo compounds, anthraquinones, basic dye lake compounds, benzimidazolone compounds, thioindigo compounds, and perylene compounds. Specific examples are C. I. Pigment Red 81:1, 144, 166, 169, 177, 185, 220, 221, and 238.

Phthalocyanine pigments are advantageously used as the cyan pigment that may be contained in the pigment dispersion of the present invention. Specific examples are C. I. Pigment Blue 15, 15:1, 15:2, 15:3, 15:4, 15:5, 15:6, 16, 17, 17:1, 68, 70, 75, 76, and 79. Among the preceding, C. I. Pigment Blue 15, 15:1, 15:2, 15:3, 15:4, 15:5, and 15:6 are particularly preferred from the standpoint of the affinity with the hereabove-described azo skeleton structure-containing compound and acidic group structure-containing compound. A single one of these cyan pigments may be used or a mixture of two or more may be used.

With regard to cyan colorants that may be contained in the pigment dispersion of the present invention, a known cyan colorant may be used in combination with a cyan pigment as described above insofar as the dispersibility of the pigment is not impaired.

Co-usable cyan colorants can be exemplified by C. I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83, and 84.

In addition, a colorant other than a cyan colorant can be used to adjust the color tone. For example, the cyan color purity can be improved by using a mixture of C. I. Pigment Green 7 with C. I. Pigment Blue 15:3.

Carbon black can be advantageously used as the black colorant contained in the pigment dispersion of the present invention. There are no particular limitations on the carbon black used in the present invention, and, for example, carbon black obtained by the following production methods can be used: thermal methods, acetylene methods, channel methods, furnace methods, and lampblack methods.

The average primary particle diameter of the carbon black used by the present invention is not particularly limited, but viewed from the standpoint of the color tone the average primary diameter is preferably 14 to 80 nm and more preferably 25 to 50 nm. The average primary particle diameter of carbon black can be measured using a photograph taken after enlargement with a scanning electron microscope.

The DBP absorption of the carbon black used in the present invention is not particularly limited, but is preferably 30 to 200 mL/100 g and is more preferably 40 to 150 mL/100 g. Having the DBP absorption of the carbon black be in the indicated range makes it possible to bring about additional improvements in the tinting strength of the printed image.

The DBP absorption of a carbon black is the amount of dibutyl phthalate (DBP) absorbed by 100 g of the carbon black and can be measured in accordance with "JIS K 6217".

The specific surface area of the carbon black is not particularly limited, but not greater than 300 $m^2/g$ is preferred and not greater than 100 $m^2/g$ is more preferred. Having the specific surface area of the carbon black be in the indicated range makes it possible to further lower the amount of addition of the azo skeleton structure-containing compound. The specific surface area of the carbon black refers to the BET specific surface area and can be measured in accordance with "JIS K 4652". A single carbon black may be used or a mixture of two or more may be used.

With regard to black colorant that may be used in the present invention, a known black colorant may be used in combination with the aforementioned carbon black insofar as the dispersibility of the carbon black is not impaired.

The co-usable black colorants can be exemplified by C. I. Pigment Black 1, 10, and 31; C. I. Natural Black 1, 2, 3, 4, 5, and 6; and active carbon.

Known magenta colorants, cyan colorants, and yellow colorants may be used in combination for color mixing and used as the black colorant contained in the pigment dispersion of the present invention.

Pigments other than the above-described yellow pigments, magenta pigments, cyan pigments, and carbon blacks can be used—insofar as they are pigments compatible with the pigment dispersing agent of the present invention—as pigments usable by the present invention, and as a consequence there is no limitation to the pigments described in the preceding.

These pigments may be crude pigments (a pigment produced from starting substances that correspond to the pigment, but without modification such as purification, control of the crystalline form or particle diameter, or surface treatment). In addition, the pigment may be a prepared pigment composition as long as the effects of the above-described azo skeleton structure-containing compound and acidic group structure-containing compound are not significantly impaired.

A non-water-soluble solvent is used as the dispersion medium in the pigment dispersion of the present invention. This non-water-soluble solvent can be exemplified by esters such as methyl acetate, ethyl acetate, and propyl acetate; hydrocarbons such as hexane, octane, petroleum ether, cyclohexane, benzene, toluene, and xylene; and halogenated hydrocarbons such as carbon tetrachloride, trichloroethylene, and tetrabromoethane.

The non-water-soluble solvent that is the dispersion medium for the pigment dispersion of the present invention may be a polymerizable monomer. This polymerizable monomer can be exemplified by the following:

styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n- nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide. Among the preceding, the non-water-soluble solvent is preferably styrene from the standpoint of the affinity with the hereinabove-described azo skeleton structure-containing compound and acidic group structure-containing compound.

With regard to the method of producing the pigment dispersion of the present invention, for example, the pigment dispersion can be produced proceeding as follows.

The azo skeleton structure-containing compound, the acidic group structure-containing compound, and as necessary a pigment dispersing agent and a resin are dissolved and the pigment is gradually added while stirring and thorough mixing is carried out. The aforementioned non-water-soluble solvent is used as the dispersion medium. In addition, the pigment can be stably dispersed into a uniform and finely particulate form by the application of mechanical shear force using a dispersing device such as a ball mill, paint shaker, dissolver, attritor, sand mill, or high-speed mill.

The compositional ratio on a mass basis between the pigment and the azo skeleton structure-containing compound in the pigment dispersion of the present invention [(mass of the pigment):(mass of the azo skeleton structure-containing compound)] is preferably in the range from 100:0.1 to 100:100 from the standpoint of the pigment dispersibility. 100:0.5 to 100:20 is more preferred. The compositional ratio on a mass basis between the azo skeleton structure-containing compound and the acidic group structure-containing compound [(mass of the azo skeleton structure-containing compound):(mass of the acidic group structure-containing compound)] is preferably in the range from 100:2 to 100:500 from the standpoint of the pigment dispersibility. 100:20 to 100:200 is more preferred.

Auxiliaries may also be added to the pigment dispersion of the present invention during its production. These auxiliaries can be exemplified by surfactants, dispersing agents, fillers, standardizing agents, resins, waxes, defoamants, static inhibitors, dust inhibitors, thickeners, shading colorants, preservatives, drying inhibitors, rheology control additives, wetting agents, antioxidants, UV absorbers, and photostabilizers. Combinations of these auxiliaries may also be used. In addition, the azo skeleton structure-containing compound and acidic group structure-containing compound may be added in advance during the production of a crude pigment.

The resin that may be added as an auxiliary can be exemplified by polystyrene resins, styrene copolymers, polyacrylic acid resins, polymethacrylic acid resins, polyacrylate ester resins, polymethacrylate ester resins, acrylate ester copolymers, methacrylate ester copolymers, polyester resins, polyvinyl ether resins, polyvinyl alcohol resins, polyvinyl butyral resins, polyurethane resins, and polypeptide resins. Mixtures of two or more of these resins may also be used.

<The Toner>

The toner of the present invention is described in the following.

The toner of the present invention has a toner particle that contains a binder resin and a colorant. By using the hereinabove-described pigment dispersion as the colorant here, a toner having a high tinting strength can be obtained because the dispersibility of the pigment in the toner particle is then well maintained.

The binder resin can be exemplified by styrene-methacrylic acid copolymers, styrene-acrylic acid copolymers, polyester resins, epoxy resins, and styrene-butadiene copolymers.

The toner particle may be directly obtained by the polymerization of polymerizable monomer using a polymerization method, and the polymerizable monomer used here can be exemplified by the following: styrenic monomers, methacrylate monomers, acrylate monomers, and olefin monomers.

A single one of these may be used or a suitable mixture of these monomers may be used such that the theoretical glass transition temperature (Tg) is in the range from 40 to 75° C. (refer to Polymer Handbook, Third Edition, John Wiley & Sons, 1989, pp. 209-262).

The distribution in the toner particle of additives such as colorant, charge control agent, wax, and so forth can be controlled by the use as the binder resin of the combination of a polar resin, e.g., a polyester resin or polycarbonate resin, in a nonpolar resin such as polystyrene. For example, when the toner particle is directly produced by the suspension polymerization method, the polar resin is added to the polymerization reaction by addition from the dispersion step to the polymerization step. The polar resin undergoes addition in conformity to the balance between the polarities of the aqueous medium and the polymerizable monomer composition that will form the toner particle. As a result, control can be exercised such that the concentration of the polar resin undergoes a continuous change from the toner particle surface towards the center, for example, the polar resin can form a thin layer at the surface of the toner particle. Here, the state of occurrence of the colorant in the toner particle can be brought into a desirable configuration by using a polar resin that exhibits interaction with the azo skeleton structure-containing compound, the acidic group structure-containing compound, the colorant, and the charge control agent.

A crosslinking agent can also be used in synthesis of the binder resin in the present invention in order to increase the mechanical strength of the toner particle and control the molecular weight of the binder resin.

A difunctional crosslinking agent or a trifunctional or higher functional crosslinking agent can be used as this crosslinking agent.

The difunctional crosslinking agent can be exemplified by divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, the diacrylates of polyethylene glycol #200, #400, and #600, dipropylene glycol diacrylate, polypropylene glycol diacrylate, polyester-type diacrylates, and the difunctional crosslinking agents provided by replacing the diacrylate in the preceding with dimethacrylate.

The trifunctional and higher functional crosslinking agents can be exemplified by pentaerythritol triacrylate, trimethylolethane triacrylate, trimethylolpropane triacrylate, tetramethylolmethane tetraacrylate, oligoester acrylate and its methacrylate, triallyl cyanurate, triallyl isocyanurate, and triallyl trimellitate.

Considered from the standpoint of the offset resistance and fixing performance of the toner, the amount of addition for these crosslinking agents, per 100 mass parts of the aforementioned polymerizable monomer, is preferably 0.05 to 10 mass parts and more preferably 0.1 to 5 mass parts.

A wax may also be used during synthesis of the binder resin in the present invention in order to prevent adhesion to the fixing members.

This wax can be exemplified by petroleum waxes such as paraffin waxes, microcrystalline waxes, and petrolatum, and derivatives thereof; montan wax and derivatives thereof; hydrocarbon waxes produced by the Fischer-Tropsch method and derivatives thereof; polyolefin waxes, as typified by polyethylene, and derivatives thereof; and natural waxes such as carnauba wax and candelilla wax and derivatives thereof. These derivatives include the oxides and graft modifications and block copolymers with vinyl monomer. Additional examples are alcohols such as higher aliphatic alcohols, fatty acids such as stearic acid and palmitic acid, fatty acid amides, fatty acid esters, hydrogenated castor oil and derivatives thereof, vegetable waxes, and animal waxes. A single one of these waxes may be used or combinations may be used.

The amount of addition of this wax, expressed per 100 mass parts of the binder resin, is preferably 2.5 to 15.0 mass parts and more preferably 3.0 to 10.0 mass parts. A charge control agent may as necessary also be incorporated in the toner particle in order to control the optimal triboelectric charge quantity in correspondence to the developing system for the toner.

A known charge control agent can be used. Negative-charging charge control agents and positive-charging charge control agents can be used as the charge control agent.

The negative-charging charge control agents can be exemplified by polymers and copolymers that have a sulfonic acid group, sulfonate salt group, or sulfonate ester group; salicylic acid derivatives and their metal complexes; monoazo metal compounds; acetylacetone-metal compounds; aromatic oxycarboxylic acids and aromatic mono- and polycarboxylic acids and their metal salts, anhydrides, and esters; phenol derivatives such as bisphenols; urea derivatives; metal-containing naphthoic acid compounds; boron compounds; quaternary ammonium salts; calixarene; and resin-type charge control agents.

The positive-charging charge control agents can be exemplified by nigrosine and modifications of nigrosine by fatty acid metal salts; guanidine compounds; imidazole compounds; quaternary ammonium salts such as tributylbenzylammonium 1-hydroxy-4-naphthosulfonate and tetrabutylammonium tetrafluoroborate, and their onium salt analogs, such as phosphonium salts, and their lake pigments; triphenylmethane dyes and their lake pigments (the laking agent can be exemplified by phosphotungstic acid, phosphomolybdic acid, phosphotungstomolybdic acid, tannic acid, lauric acid, gallic acid, ferricyanides, and ferrocyanides); the metal salts of higher fatty acids; diorganotin oxides such as dibutyltin oxide, dioctyltin oxide, and dicyclohexyltin oxide; diorganotin borates such as dibutyltin borate, dioctyltin borate, and dicyclohexyltin borate; and resin-type charge control agents.

A single one of these charge control agents may be used by itself or two or more may be used in combination.

An inorganic fine powder may be added to the toner particle in the toner of the present invention as an external additive. The following can be used as this inorganic fine powder: silica, titanium oxide, and alumina and their complex oxides, and the preceding that have been subjected to a surface treatment.

<Methods for Producing the Toner Particle>

Methods for producing the toner particle according to the present invention can be exemplified by pulverization methods, suspension polymerization methods, suspension granulation methods, and emulsion polymerization methods. Among these production methods, production of the toner particle by a suspension polymerization method or a suspension granulation method is particularly preferred.

In the case of a toner particle produced by a suspension polymerization method, production can be carried out, for example, as follows.

A polymerizable monomer composition is first produced by mixing a colorant comprising the pigment dispersion of the present invention, polymerizable monomer, and as necessary wax, a polymerization initiator, and so forth. This polymerizable monomer composition is then dispersed in an aqueous medium with granulation into polymerizable monomer composition particles. Toner particles are obtained by producing a binder resin by polymerizing the polymerizable monomer in the polymerizable monomer composition particles in the aqueous medium.

This polymerizable monomer composition is preferably prepared by first dispersing the aforementioned colorant in a first polymerizable monomer to obtain a dispersion and by then mixing this dispersion with a second polymerizable monomer. That is, the pigment can be disposed in the toner particle in an even better dispersed state by thoroughly dispersing the pigment dispersion using the first polymerizable monomer followed by mixing with the second polymerizable monomer along with other starting materials for the toner.

A known polymerization initiator can be used for the polymerization initiator that is used in this suspension polymerization method. Examples in this regard are azo compounds, organoperoxides, inorganic peroxides, organometal compounds, and photopolymerization initiators. A single one of these polymerization initiators may be used or two or more may be used in combination. The amount of addition of the polymerization initiator, expressed per 100 mass parts of the polymerizable monomer, is preferably 0.1 to 20 mass parts and more preferably 0.1 to 10 mass parts.

The aqueous medium used in this suspension polymerization method preferably contains a dispersion stabilizer. A known inorganic dispersion stabilizer or organic dispersion stabilizer can be used as this dispersion stabilizer.

The use is preferred in the present invention of a sparingly water-soluble inorganic dispersion stabilizer that is soluble in acid. When the aqueous medium is prepared using a sparingly water-soluble inorganic dispersion stabilizer, the amount of use of this dispersion stabilizer in the present invention is preferably 0.2 to 2.0 mass parts with reference to 100 mass parts of the polymerizable monomer. Use in the indicated range provides an improved drop stability for the polymerizable monomer composition in the aqueous medium. In addition, the aqueous medium is preferably prepared in the present invention using water in the range from 300 to 3,000 mass parts per 100 mass parts of the polymerizable monomer composition.

In the case of a toner particle produced by a suspension granulation method, production can be carried out, for example, as follows. First, a solvent composition is prepared by mixing the following in a solvent: colorant comprising the pigment dispersion of the present invention, binder resin, and as necessary a wax and so forth. A toner particle suspension is then obtained by dispersing the solvent composition in an aqueous medium and granulating into solvent composition particles. The toner particles can be obtained by removing the solvent by subjecting the obtained suspension to heating or reduced pressure.

The solvent composition in this step is preferably prepared by dispersing the colorant in a first solvent to prepare a dispersion and then mixing this dispersion with a second solvent. That is, the pigment can be disposed in the toner particle in an even better dispersed state by thoroughly dispersing the colorant using the first solvent followed by mixing with the second solvent along with other starting materials for the toner.

The solvent that can be used in this suspension granulation method can be exemplified by hydrocarbons, halogenated hydrocarbons, alcohols, polyhydric alcohols, cellosolves, ketones, ethers, and esters. A single one of these may be used by itself or a mixture of two or more may be used. The amount of use of the solvent is preferably in the range from 50 to 5,000 mass parts per 100 mass parts of the binder resin.

The aqueous medium used in this suspension granulation method preferably contains a dispersion stabilizer. A known inorganic dispersion stabilizer or organic dispersion stabilizer can be used as this dispersion stabilizer. With regard to the amount of use of this dispersion stabilizer, the range from 0.01 to 20 mass parts per 100 mass parts of the binder resin is preferred from the standpoint of the drop stability of the solvent composition in the aqueous medium.

The weight-average particle diameter of the toner (also referred to below as D4) is preferably 3.0 to 15.0 µm. By having the weight-average particle diameter of the toner be in the indicated range, an excellent charge stability is obtained and fogging and toner scattering can be suppressed when development is carried out continuously for a large number of prints.

The toner of the present invention may be a magnetic toner or a nonmagnetic toner. When used in the form of a magnetic toner, the toner particle constituting the toner of the present invention may be used mixed with a magnetic material. This magnetic material can be exemplified by iron oxides such as magnetite, maghemite, and ferrite; iron oxides that contain another metal oxide; metals such as Fe, Co, and Ni; alloys of these metals with a metal such as Al, Co, Cu, Pb, Mg, Ni, Sn, Zn, Sb, Be, Bi, Cd, Ca, Mn, Se, Ti, W, and V; and mixtures of the preceding. A triiron tetraoxide fine powder and a γ-ferric oxide fine powder are particularly advantageous magnetic materials for the objects of the present invention.

These magnetic bodies preferably have an average particle diameter of 0.1 to 2 µm. The amount of addition of these magnetic materials is preferably 10 to 200 mass parts of the magnetic body per 100 mass parts of the binder resin.

EXAMPLES

The present invention is described in additional detail in the following using examples and comparative examples, but the present invention is not limited to or by the following examples. In the description that follows, "parts" and "%" are on a mass basis unless specifically indicated otherwise. The measurement methods used in the production examples are given below.

(1) Measurement of the Molecular Weight

The molecular weight of the azo skeleton structure-containing compounds is determined as polystyrene using size exclusion chromatography (SEC). Measurement of the molecular weight by SEC was carried out as follows.

The sample was added to the eluent indicated below to provide a sample concentration of 1.0%; the solution held for 24 hours at room temperature was filtered with a solvent-resistant membrane filter having a pore diameter of 0.2 µm to provide the sample solution; and the measurement was performed using the following conditions.

instrument: "HLC-8220GPC" high-performance GPC instrument (Tosoh Corporation)
column: 2×LF-804
eluent: THF
flow rate: 1.0 mL/min
oven temperature: 40° C.
amount of sample injection: 0.025 mL The determination of the molecular weight of the sample was carried out using a molecular weight calibration curve constructed using standard polystyrene resin (TSK Standard Polystyrene F-850, F-450, F-288, F-128, F-80, F-40, F-20, F-10, F-4, F-2, F-1, A-5000, A-2500, A-1000, and A-500 from Tosoh Corporation).

The molecular weight of the acidic group structure-containing compounds is determined as polystyrene using size exclusion chromatography (SEC). Measurement of the molecular weight by SEC was carried out as follows.

The sample was added to the eluent indicated below to provide a sample concentration of 1.0%; after holding for 24 hours at room temperature, the solution was filtered with a solvent-resistant membrane filter having a pore diameter of 0.2 µm to provide the sample solution; and the measurement was performed using the following conditions.

instrument: "HLC-8220GPC" high-performance GPC instrument (Tosoh Corporation)
column: 2 column train of Asahipak GF-510HQ, 310HQ (Showa Denko Kabushiki Kaisha)
eluent: DMF (contained 20 mmol/L lithium bromide) flow rate: 0.6 mL/min
oven temperature: 40° C.
amount of sample injection: 0.10 mL The determination of the molecular weight of the sample was carried out using a molecular weight calibration curve constructed using the standard polystyrene resin indicated above.

(2) Measurement of the Acid Value

The acid value of the azo skeleton structure-containing compounds and acidic group structure-containing compounds was measured using the following method.

The basic procedure is based on JIS K-0070.
1) 0.5 to 2.0 g of the sample is exactly weighed out. This mass is designated as M (g).
2) The sample is placed in a 50 mL beaker and 25 mL of a mixture of tetrahydrofuran/ethanol (2/1) is added and dissolution is carried out.
3) Using an ethanol solution of 0.1 mol/L KOH, titration is carried out using a potentiometric titration instrument (for example, an Automatic Titrator "COM-2500" from Hiranuma Sangyo Co., Ltd. can be used).
4) The amount of the KOH solution used here is designated S (mL). The blank is measured at the same time and the amount of KOH used in this case is designated B (mL).

5) The acid value is calculated using the following equation. f is the factor for the KOH solution.

$$\text{acid value (mg KOH/g)} = \frac{(S-B) \times f \times 5.61}{M} \quad [\text{Math. 1}]$$

(3) Compositional Analysis

Structural determination was carried out on the high molecular weight moiety, the azo skeleton structure-containing compound, and the acidic group structure-containing compound using the following instrumentation.

$^1$H-NMR: ECA-400 from JEOL Ltd. (solvent used: deuterochloroform)

$^{13}$C-NMR: FT-NMR AVANCE-600 from Bruker BioSpin (solvent used: deuterochloroform)

With the $^{13}$C-NMR, quantification and compositional analysis were performed by the inverse-gated decoupling method using chromium(III) acetylacetonate as the relaxation reagent.

Example 1

Azo skeleton structure-containing compounds as described above were obtained by the following methods.

Compound (A-1) Production Example

An azo skeleton structure-containing compound (A-1) with the structure indicated below was produced according to the following scheme.

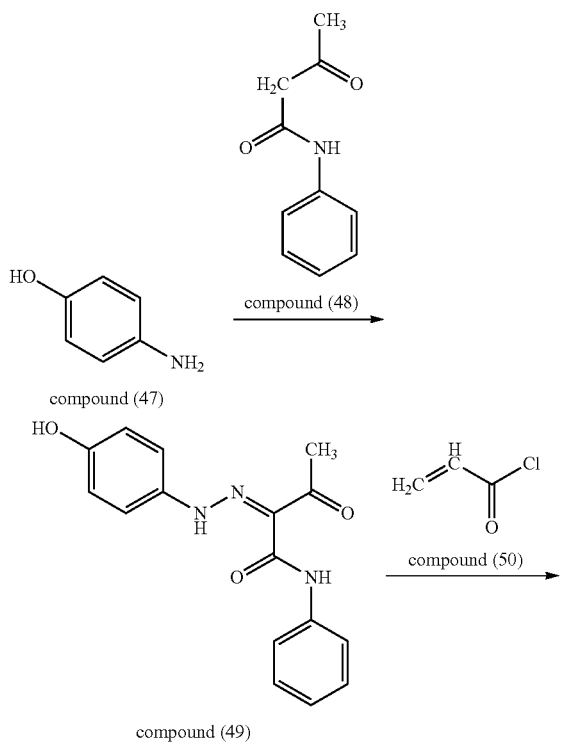

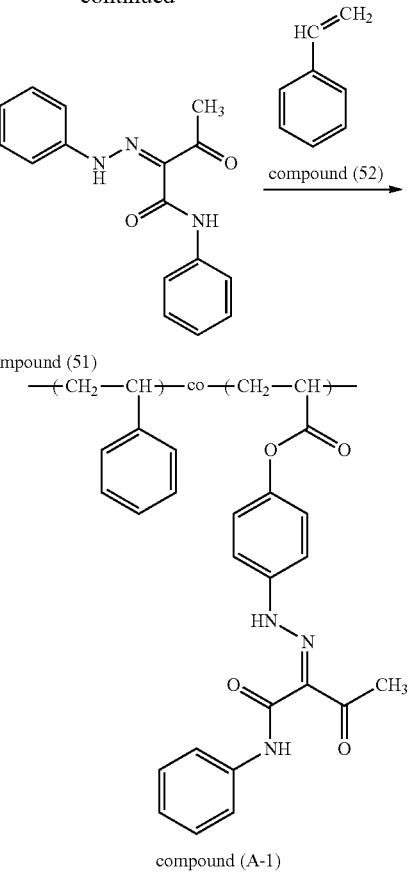

The "co" in this scheme is a term that indicates that the sequence of the individual monomer units constituting the copolymer is random (this also applies in the schemes provided herebelow).

First, 30.0 parts of water and 11.0 parts of concentrated hydrochloric acid were added to 5.00 parts of compound (47) and ice cooling was carried out to 10° C. or less. To this solution was added 3.46 parts of sodium nitrite dissolved in 8.10 parts of water and a reaction was carried out for 1 hour at the same temperature. 0.657 parts of sulfamic acid was then added and stirring was carried out for an additional 20 minutes (diazonium salt solution). 8.13 parts of compound (48) was then added to 48.0 parts of water and this was ice cooled to 10° C. or less and the diazonium salt solution was added. 14.3 parts of sodium carbonate dissolved in 80.0 parts of water was subsequently added and a reaction was carried out for 2 hours at 10° C. or below. After the completion of the reaction, 50 parts of water was added and stirring was performed for 30 minutes; the solid was then separated by filtration; and purification by recrystallization from N,N-dimethylformamide yielded 13.2 parts of compound (49) (98.9% yield).

3.00 parts of compound (49) and 1.20 parts of triethylamine were then added to 30.0 parts of chloroform and ice cooling was carried out to 10° C. or less. 1.03 parts of compound (50) was added to this solution and a reaction was run for 20 minutes at the same temperature. This was extracted with chloroform followed by concentration and purification to obtain 3.40 parts of compound (51) (98.8% yield).

9.44 parts of N,N-dimethylformamide, 1.06 parts of compound (51), and 0.327 parts of azobisisobutyronitrile were added to 10 parts of compound (52) and stirring was carried out for 2 hours at 80° C. under a nitrogen atmosphere. After the completion of the reaction, purification by recrystallization from N,N-dimethylformamide was carried out to obtain 7.60 parts of the azo skeleton structure-containing compound (A-1) (69.0% yield).

[Results of Analysis for the Azo Skeleton Structure-Containing Compound (A-1)]

[1] Results of the molecular weight measurement (GPC): weight-average molecular weight (Mw)=16762, number-average molecular weight (Mn)=10221

[2] Results of the acid value measurement: 0.0 mg KOH/g

[3] Results of $^1$H-NMR (400 MHz, CDCl$_3$, room temperature) (refer to FIG. 1): δ [ppm]=14.69 (s, 1H), 11.40 (s, 1H), 7.56 (s, 2H), 7.31 (s, 2H), 7.19-6.43 (m, 135H), 2.53 (s, 3H), 2.47-1.05 (m, 97H)

Compound (A-10) Production Example

An azo skeleton structure-containing compound (A-10) with the structure indicated below was produced according to the following scheme.

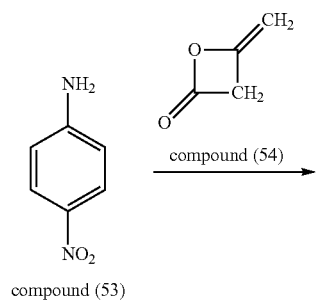
compound (53)

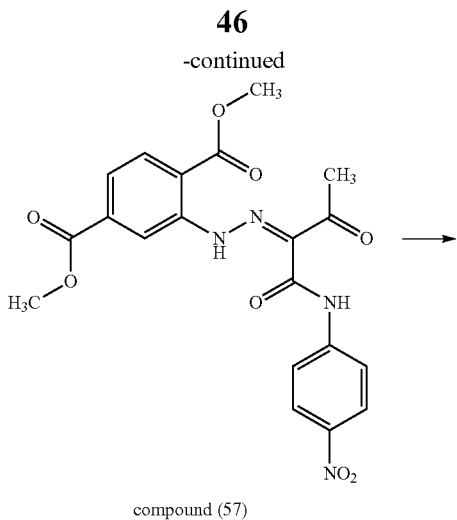
compound (57)

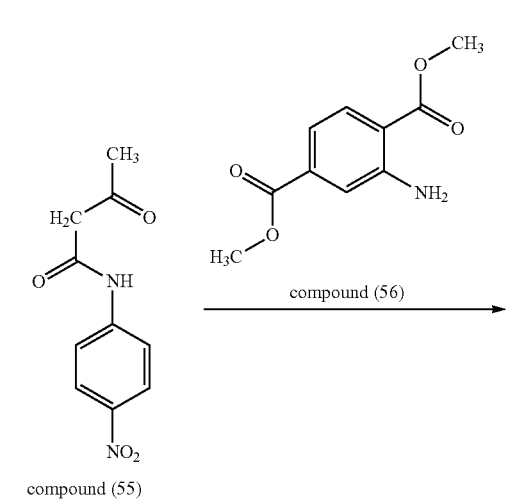
compound (55)

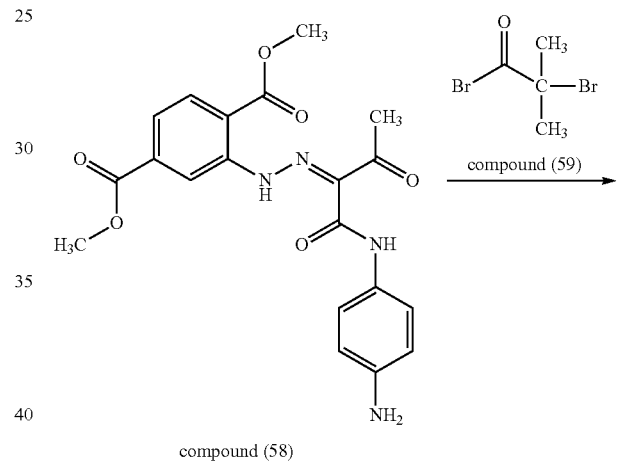
compound (58)

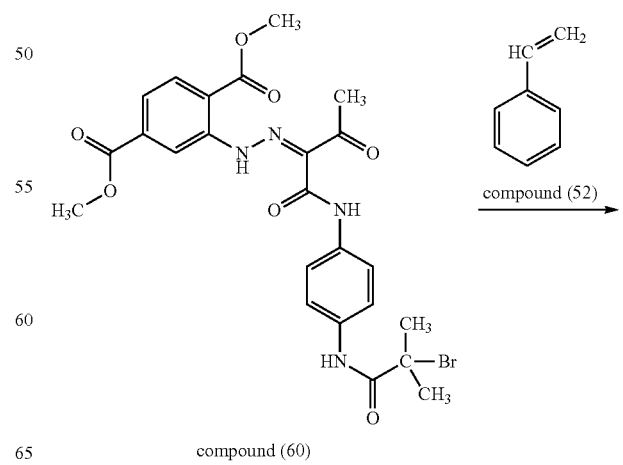
compound (60)

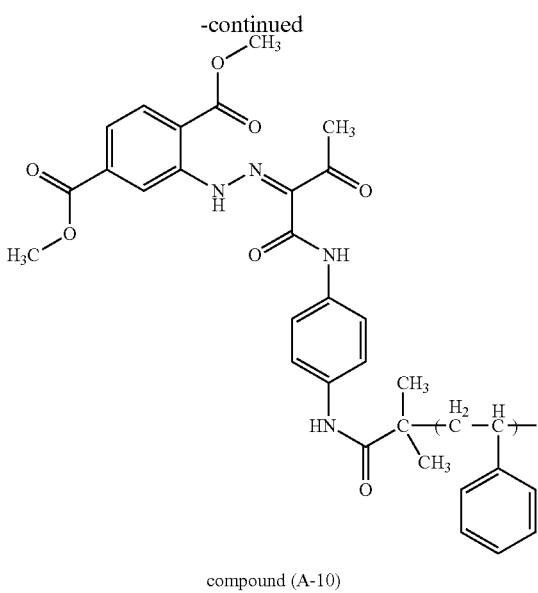

compound (A-10)

First, 3.11 parts of compound (53) was added to 30 parts of chloroform; ice cooling was carried out to 10° C. or less; and 1.89 parts of compound (54) was added. This was followed by stirring for 2 hours at 65° C. After the completion of the reaction, extraction with chloroform and concentration produced 4.80 parts of compound (55) (96.0% yield).

40.0 parts of methanol and 5.29 parts of concentrated hydrochloric acid were then added to 4.25 parts of compound (56) and ice cooling was carried out to 10° C. or less. To this solution was added 2.10 parts of sodium nitrite dissolved in 6.00 parts of water and a reaction was run for 1 hour at the same temperature. 0.990 parts of sulfamic acid was then added and stirring was carried out for an additional 20 minutes (diazonium salt solution). 4.51 parts of compound (55) was added to 70.0 parts of methanol; ice cooling to 10° C. or less was carried out; and the diazonium salt solution was added. After this, 5.83 parts of sodium acetate dissolved in 7.00 parts of water was added and a reaction was run for 2 hours at 10° C. or less. After the completion of the reaction, 300 parts of water was added; stirring was carried out for 30 minutes; the solid was separated by filtration; and purification by recrystallization from N,N-dimethylformamide yielded 8.65 parts of compound (57) (96.1% yield).

8.58 parts of compound (57) and 0.4 parts of palladium-active carbon (5% palladium) were then added to 150 parts of N,N-dimethylformamide and stirring was carried out for 3 hours at 40° C. under a hydrogen gas atmosphere (reaction pressure=0.1 to 0.4 MPa). After the completion of the reaction, the solution was filtered off and concentrated to obtain 7.00 parts of compound (58) (87.5% yield).

5.00 parts of compound (58) and 1.48 parts of triethylamine were then added to 25.0 parts of chloroform; ice cooling was carried out to 10° C. or less; and 2.07 parts of compound (59) was added. This was followed by stirring for 6 hours at room temperature. After the completion of the reaction, extraction with chloroform and concentration produced 5.35 parts of compound (60) (97.3% yield).

2.50 parts of compound (60), 140 parts of styrene (52), 1.77 parts of N,N,N',N'',N''-pentamethyldiethylenetriamine, and 0.64 parts of copper(I) bromide were then added to 50.0 parts of N,N-dimethylformamide. Stirring was subsequently carried out for 45 minutes at 120° C. under a nitrogen atmosphere. After the completion of the reaction, extraction with chloroform and purification by reprecipitation with methanol produced 86.2 parts of the azo skeleton structure-containing compound (A-10) (60.5% yield).

Figure 2:
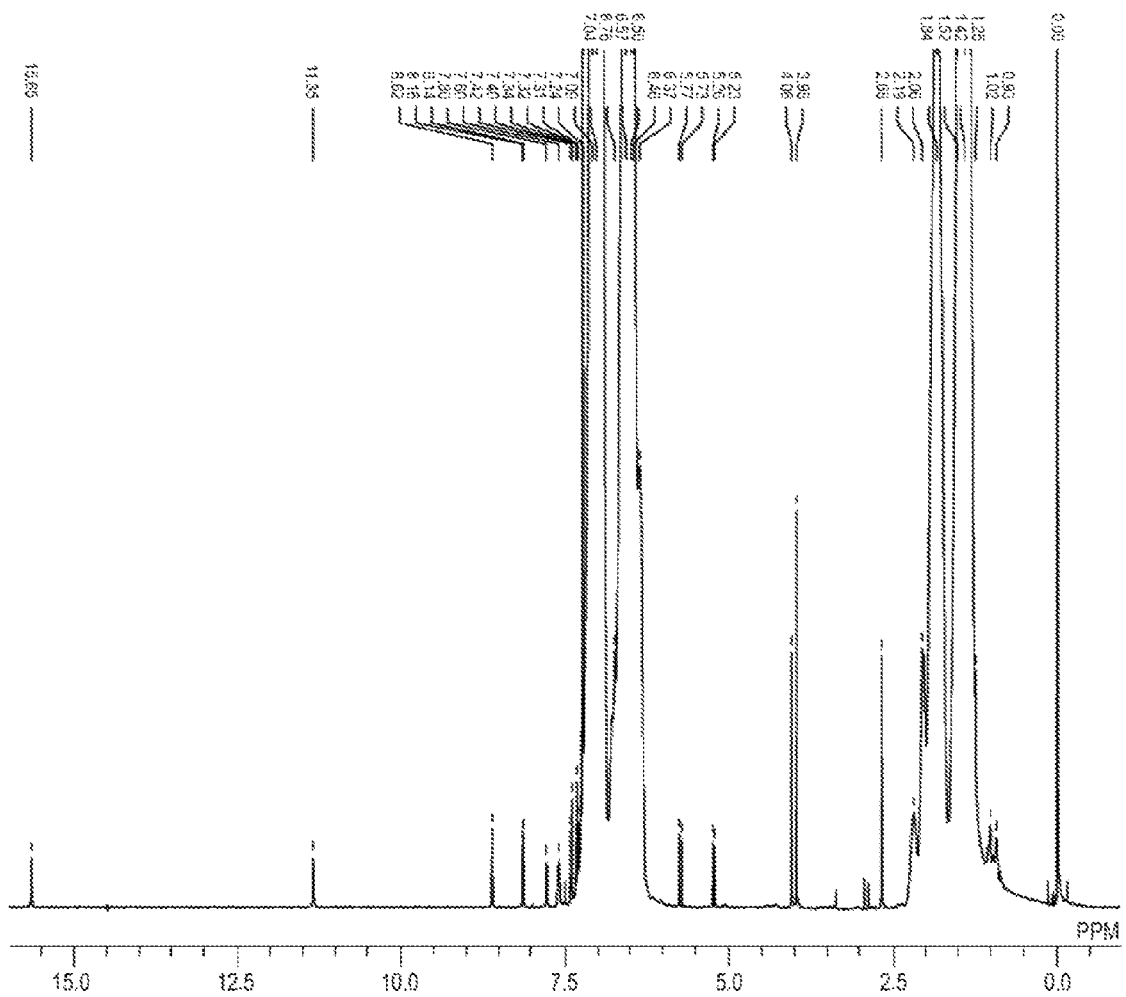
FIG. 2 is a $^1$H-NMR spectrum of compound (A-10)

The obtained product was confirmed to have the structure given by the preceding formula using the instrumentation indicated above. The results of the analyses are given below.
[Results of Analysis for the Azo Skeleton Structure-Containing Compound (A-10)]
[1] Results of the molecular weight measurement (GPC): weight-average molecular weight (Mw)=36377, number-average molecular weight (Mn)=21338
[2] Results of the acid value measurement: 0.0 mg KOH/g
[3] Results of $^1$H-NMR (400 MHz, CDCl$_3$, room temperature) (refer to FIG. 2): δ [ppm]=15.65 (s, 1H), 11.35 (s, 1H), 8.62 (s, 1H), 7.37-6.27 (m, 1294H), 4.06 (s, 3H), 3.98 (s, 3H), 2.47-1.05 (m, 786H)

Compound (A-52) Production Example

An azo skeleton structure-containing compound (A-52) with the structure indicated below was produced according to the following scheme.

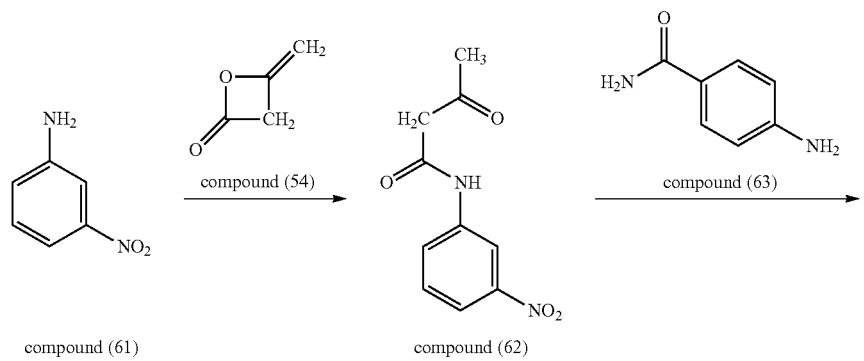

-continued

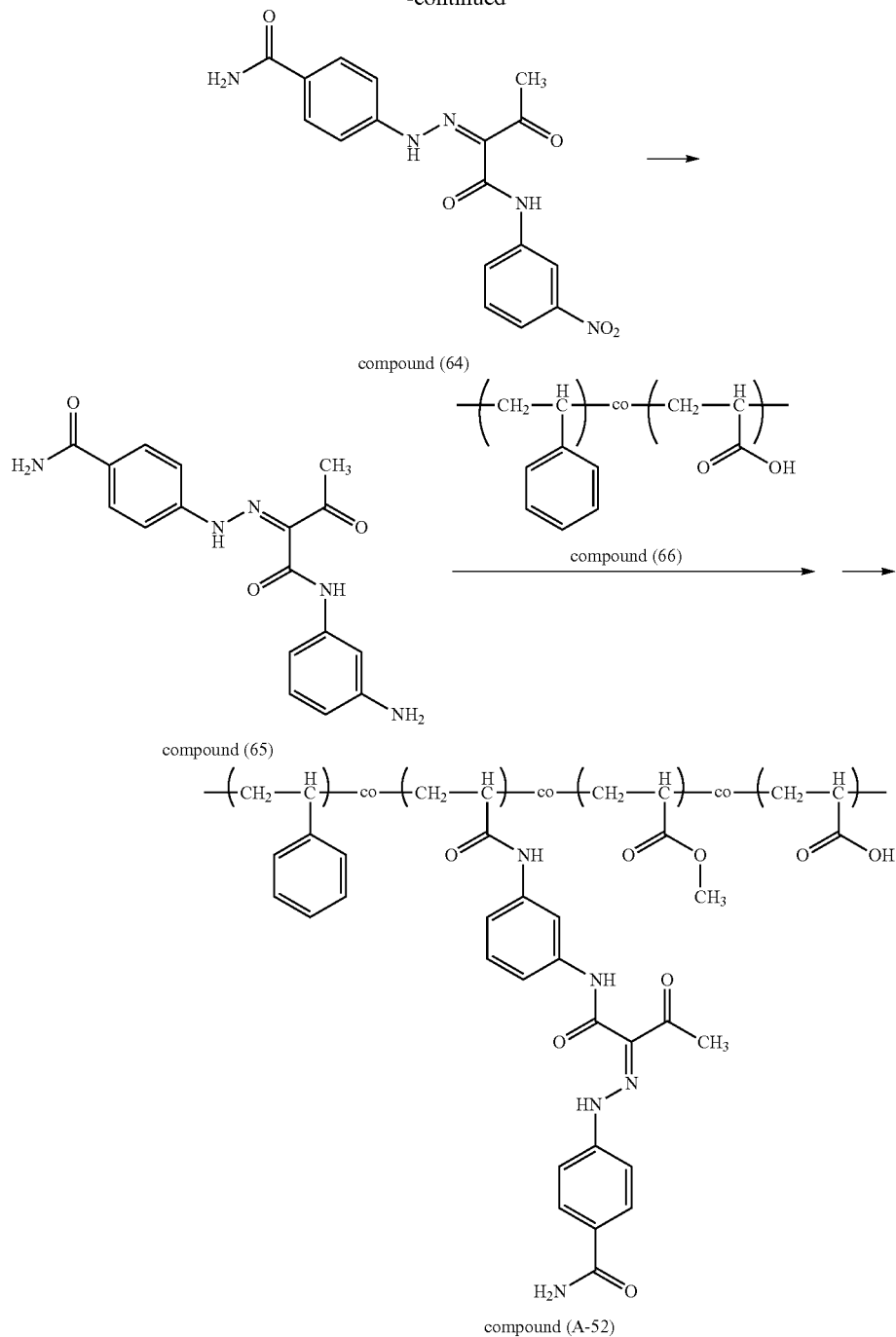

First, 3.02 parts of compound (61) was added to 30 parts of chloroform; ice cooling to 10° C. or less was carried out; and 1.90 parts of compound (54) was added. This was followed by stirring for 2 hours at 65° C. After the completion of the reaction, extraction with chloroform and concentration produced 4.68 parts of compound (62) (96.5% yield).

100.0 parts of N,N-dimethylformamide and 21.4 parts of concentrated hydrochloric acid were added to 10.0 parts of compound (63) and ice cooling to 5° C. or less was carried out. To the resulting solution was added 5.28 parts of sodium nitrite dissolved in 20.0 parts of water and a reaction was run for 30 minutes at the same temperature. 1.00 parts of sulfamic acid was then added and stirring was performed for an additional 30 minutes (diazonium salt solution). 15.5 parts of compound (62) and 47.6 parts of potassium carbonate were added to 150.0 parts of DMF; ice cooling to 5° C. or less was carried out; the diazonium salt solution was added; and a reaction was run for 2 hours at the same temperature. After the completion of the reaction, the reaction solution was discharged into 50 parts of water; the pH was then adjusted to 1 by the addition of concentrated hydrochloric acid; and stirring was performed for 30 minutes. The precipitated solid was filtered off and washed with 150 parts of water followed by dispersion and washing with 150 parts of methanol to obtain 22.4 parts of compound (64) (88.3% yield).

20.0 parts of compound (64) was added to 300 parts of N,N-dimethylformamide and dissolution was carried out with heating at 70° C. The solution was cooled to room temperature; 2.28 parts of palladium-active carbon (5% palladium) was added; and stirring was carried out for 6 hours at room temperature under a hydrogen gas atmosphere (reaction pressure=0.1 to 0.4 MPa). After the completion of the reaction, the solution was filtered off and the solvent was removed by distillation under reduced pressure followed by dispersion and washing with methanol to obtain 16.3 parts of compound (65) (94.6% yield).

25.0 parts of compound (66) was then added to 250 parts of toluene and dissolved. The reaction solution was cooled to 5° C. or less; 11.6 parts of oxalyl chloride was gradually added dropwise; and stirring was carried out for 15 hours while gradually returning the solution temperature to room temperature. After the solvent had been distilled out under reduced pressure, re-dissolution was performed in 163 parts of N,N-dimethylacetamide; 3.00 parts of compound (65) was added; and stirring was performed for 3 hours at 65° C. 27.8 parts of methanol was added to the reaction solution and stirring was performed for an additional 3 hours at 65° C. The solution temperature was gradually returned to room temperature and the reaction was brought to completion by stirring overnight. After the completion of the reaction, the reaction solution was discharged into methanol/water and the precipitated precipitate was filtered off and purified by washing with methanol to obtain 26.6 parts of the azo skeleton structure-containing compound (A-52).

The obtained product was confirmed to have the structure given by the preceding formula using the instrumentation indicated above. The results of the analyses are given below.

[Results of Analysis for the Azo Skeleton Structure-Containing Compound (A-52)]

[1] Results of GPC: number-average molecular weight (Mn)=9,757

[2] Results of the acid value measurement: 4.1 mg KOH/g

Figure 3:
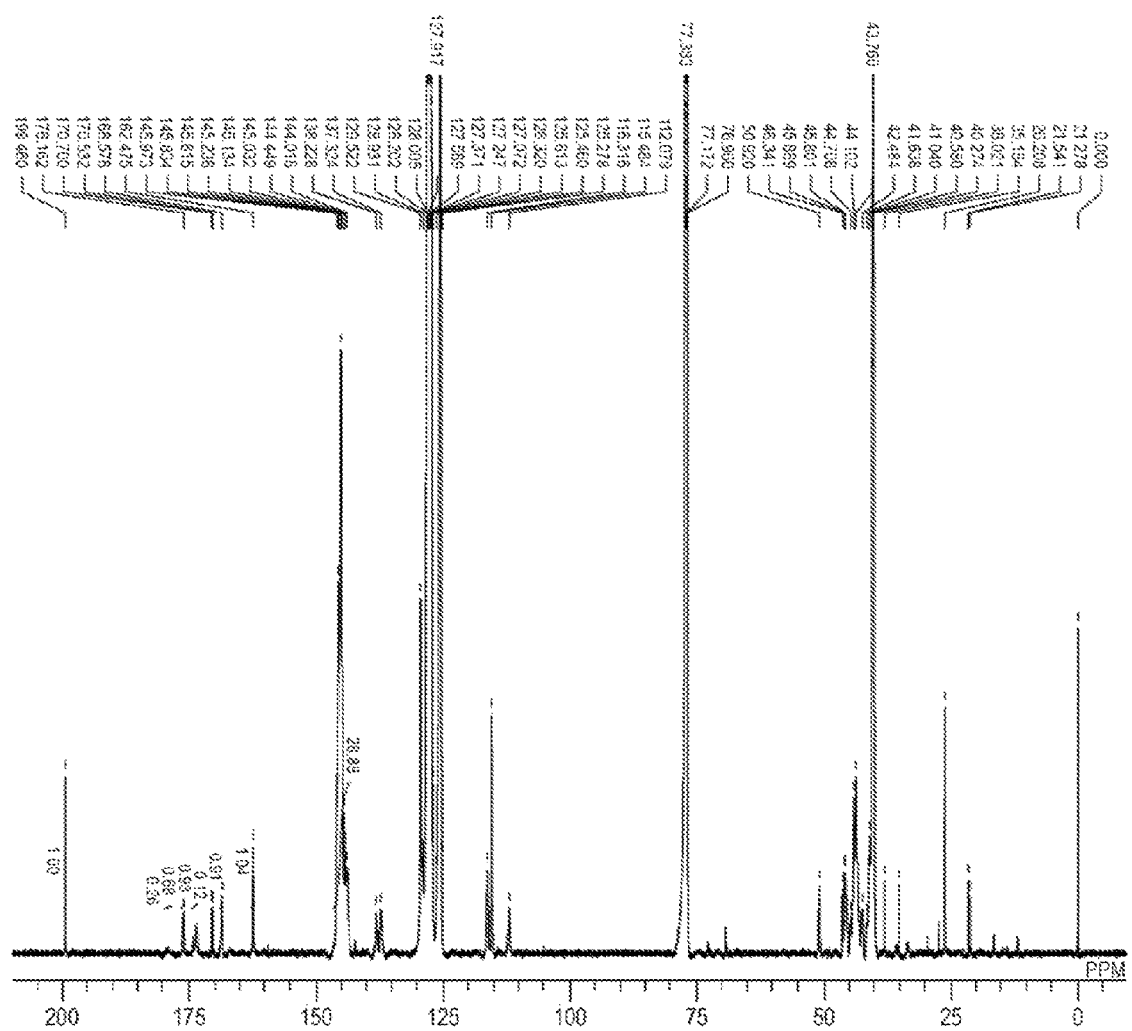
FIG. 3 is a $^{13}$C-NMR spectrum of compound (A-52)

[3] Results of $^{13}$C-NMR (150 MHz, CDCl$_3$, room temperature) (refer to FIG. 3): δ [ppm]=199.5 (3C), 179.4 (1C), 176.2 (2C), 174.3-173.6 (3C), 170.1, 170.5, 168.6 (3C), 162.5 (3C), 146.0-144.0 (97C), 138.2, 137.3, 129.5, 128.2-127.1, 125.6-125.3, 116.3, 115.5, 112.1, 50.9, 46.3, 45.9, 44.1-43.8, 42.5, 41.0, 40.3, 38.0, 35.2, 26.2, 21.5, 21.3, 16.6, 11.9

Compound (A-57) Production Example

An azo skeleton unit-containing compound (A-57) with the structure indicated below was produced according to the following scheme.

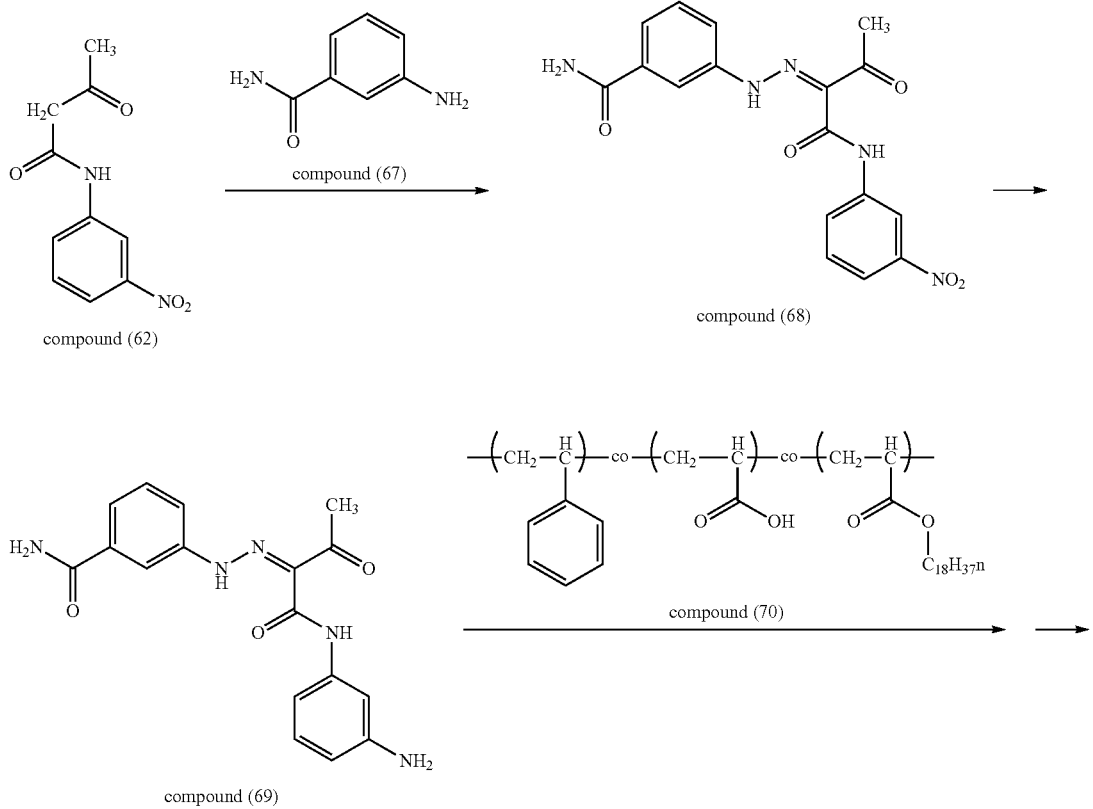

-continued

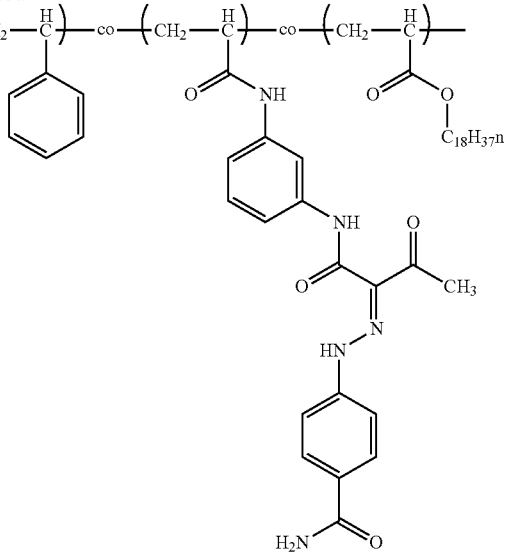

compound (A-57)

[The "n" in the scheme is a symbol that indicates that the alkyl chain is a straight chain.]

First, 100 parts of propylene glycol monomethyl ether was heated under nitrogen substitution and a reflux was established at a liquid temperature of at least 120° C., and to this was added dropwise over 3 hours a mixture of 11.5 parts of styrene, 1.0 parts of stearyl acrylate, 0.5 parts of acrylic acid, and 1.0 parts of tert-butyl peroxybenzoate (product name: Perbutyl Z, NOF Corporation, an organoperoxide-type polymerization initiator). After the completion of the dropwise addition, the solution was stirred for 3 hours followed by solvent removal by distillation at normal pressure while raising the solution temperature to 170° C. and then, once the solution temperature had reached 170° C., by distillation for 1 hour under a reduced pressure of 1 hPa, to obtain a solid resin material. This solid was dissolved in tetrahydrofuran and reprecipitated with n-hexane and the precipitated solid was filtered off to obtain compound (70).

25.0 parts of methanol and 6.00 parts of concentrated hydrochloric acid were first added to 2.45 parts of compound (67) and ice cooling was carried out to 10° C. or less. To this solution was added 1.37 parts of sodium nitrite dissolved in 5.50 parts of water and a reaction was carried out for 1 hour at the same temperature (diazonium salt solution). 4.00 parts of compound (62) was then added to 40.0 parts of methanol; ice cooling to 10° C. or less was carried out; and the diazonium salt solution was added. This was followed by the addition of 8.86 parts of sodium acetate dissolved in 35.0 parts of water and reaction for 2 hours at 10° C. or less. After the completion of the reaction, 300 parts of water was added; stirring was performed for 30 minutes; and the solid was then filtered off and purified by recrystallization from N,N-dimethylformamide to obtain 6.37 parts of compound (68) (95.8% yield).

6.00 parts of compound (68) and 0.3 parts of palladium-active carbon (5% palladium) were added to 150 parts of N,N-dimethylformamide and stirring was carried out for 3 hours at 40° C. under a hydrogen gas atmosphere (reaction pressure=0.1 to 0.4 MPa). After the completion of the reaction, the solution was filtered off and concentrated to obtain 4.84 parts of compound (69) (87.9% yield).

25.0 parts of compound (70) was then added to 250 parts of toluene and dissolved. The reaction solution was cooled to 5° C. or less; 11.6 parts of oxalyl chloride was gradually added dropwise; and stirring was carried out for 15 hours while gradually returning the solution temperature to room temperature. After the solvent had been distilled out under reduced pressure, re-dissolution was performed in 163 parts of N,N-dimethylacetamide; 3.00 parts of compound (69) was added; and stirring was performed for 3 hours at 65° C. 27.8 parts of methanol was added to the reaction solution and stirring was performed for an additional 3 hours at 65° C. The solution temperature was gradually returned to room temperature and the reaction was brought to completion by stirring overnight. After the completion of the reaction, the reaction solution was discharged into methanol/water and the precipitated precipitate was filtered off and purified by washing with methanol to obtain 25.5 parts of the azo skeleton structure-containing compound (A-57).

The obtained product was confirmed to have the structure given by the preceding formula using the instrumentation indicated above. The results of the analyses are given below.

Figure 4:
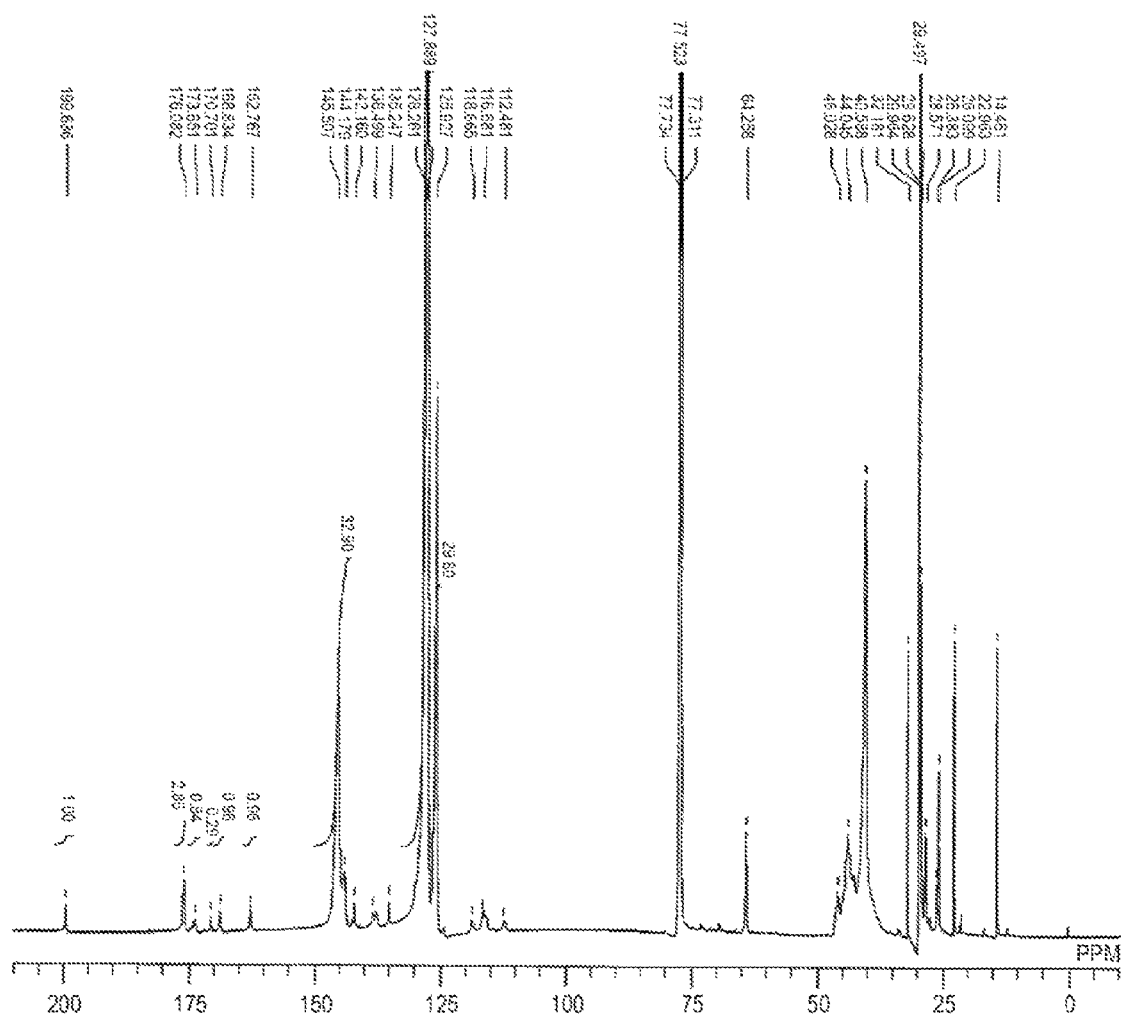
FIG. 4 is a $^{13}$C-NMR spectrum of compound (A-57)

[Results of Analysis for the Azo Skeleton Structure-Containing Compound (A-57)]
[1] Results of the molecular weight measurement (GPC): number-average molecular weight (Mn)=22047
[2] Results of the acid value measurement: 0.0 mg KOH/g
[3] Results of $^{13}$C-NMR (150 MHz, CDCl$_3$, room temperature) (refer to FIG. 4): δ [ppm]=199.64 (3C), 176.08 (8C), 173.85 (3C), 170.70, 168.84, 162.77, 145.51 (93C), 144.18, 138.50, 135.25, 128.26, 127.89, 125.93, 118.67, 116.68, 112.48, 64.26, 50-36.00, 32.18, 29.57, 26.38, 22.66, 14.46

Compound (A-62) Production Example

An azo skeleton structure-containing compound (A-62) with the structure indicated below was produced according to the following scheme.

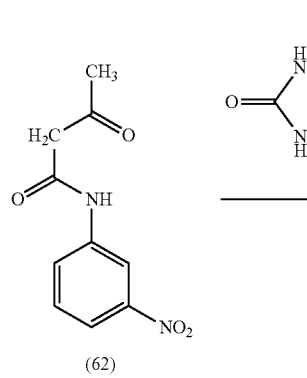
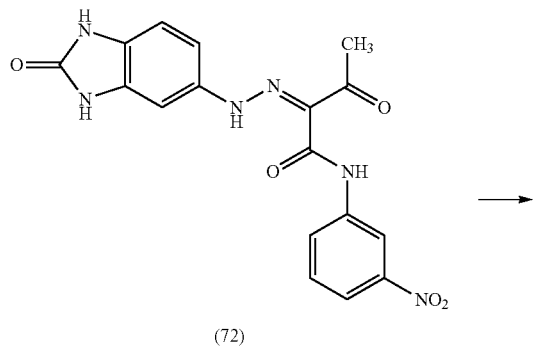
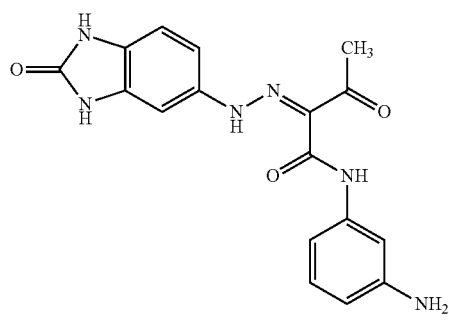
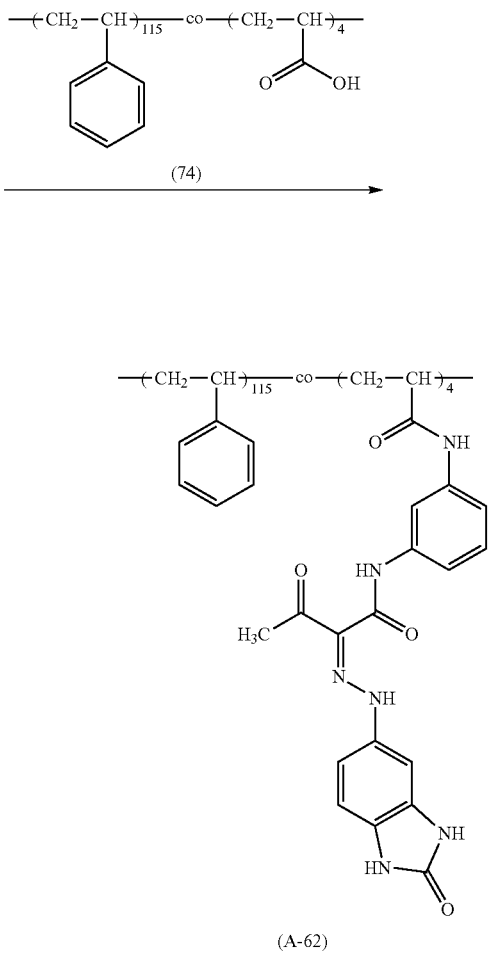

142 parts of N,N-dimethylformamide and 30.8 parts of concentrated hydrochloric acid were added to 15.0 parts of compound (71) and ice cooling to 5° C. or less was carried out. To this solution was added 7.25 parts of sodium nitrite dissolved in 50.0 parts of water and stirring was performed for 1 hour at the same temperature (diazonium salt solution). 21.9 parts of compound (62) and 68.4 parts of calcium carbonate were added to 142 parts of N,N-dimethylformamide; ice cooling to 5° C. or less was carried out; the diazonium salt solution was added; and a reaction was carried out for 3 hours at 5° C. or less. After the completion of the reaction, the reaction solution was filtered and the solvent was distilled off under reduced pressure. The precipitated precipitate was washed with dilute hydrochloric acid, water, and methanol to obtain 36.0 parts of compound (72) (94.3% yield).

203 parts of 1,4-dioxane was added to the obtained compound (72) and a solution of 12.4 parts of sodium hydrosulfide dissolved in 80 parts of water was added dropwise at room temperature. After the completion of the dropwise addition, the solution temperature was raised and stirring was performed for 26 hours at 50° C. After the completion of the reaction, the reaction solution was poured into water and the precipitated precipitate was filtered off and washed with dilute hydrochloric acid, water, and methanol to obtain 10.0 parts of compound (73) (50.6% yield).

10.0 parts of compound (74) was then added to 100 parts of chloroform; 2.23 parts of thionyl chloride was added dropwise; and stirring was carried out for 24 hours at room temperature. The reaction solution was subsequently concentrated to remove the chloroform and the excess thionyl chloride; the obtained solid resin material was recovered and re-dissolved in 61.1 parts of N,N-dimethylacetamide; 1.58 parts of compound (73) was added; and stirring was carried out for 8 hours at 65° C. in a nitrogen atmosphere. After the completion of the reaction, the reaction solution was concentrated followed by reprecipitation with methanol; the precipitated precipitate was filtered off; and the precipitate was dispersed and washed with methanol to obtain 10.8 parts of the azo skeleton structure-containing compound (A-62).

The obtained compound was confirmed to have the structure of the azo skeleton structure-containing compound (A-62) using the instrumentation indicated above. The results of the analyses are given below.

Figure 5:
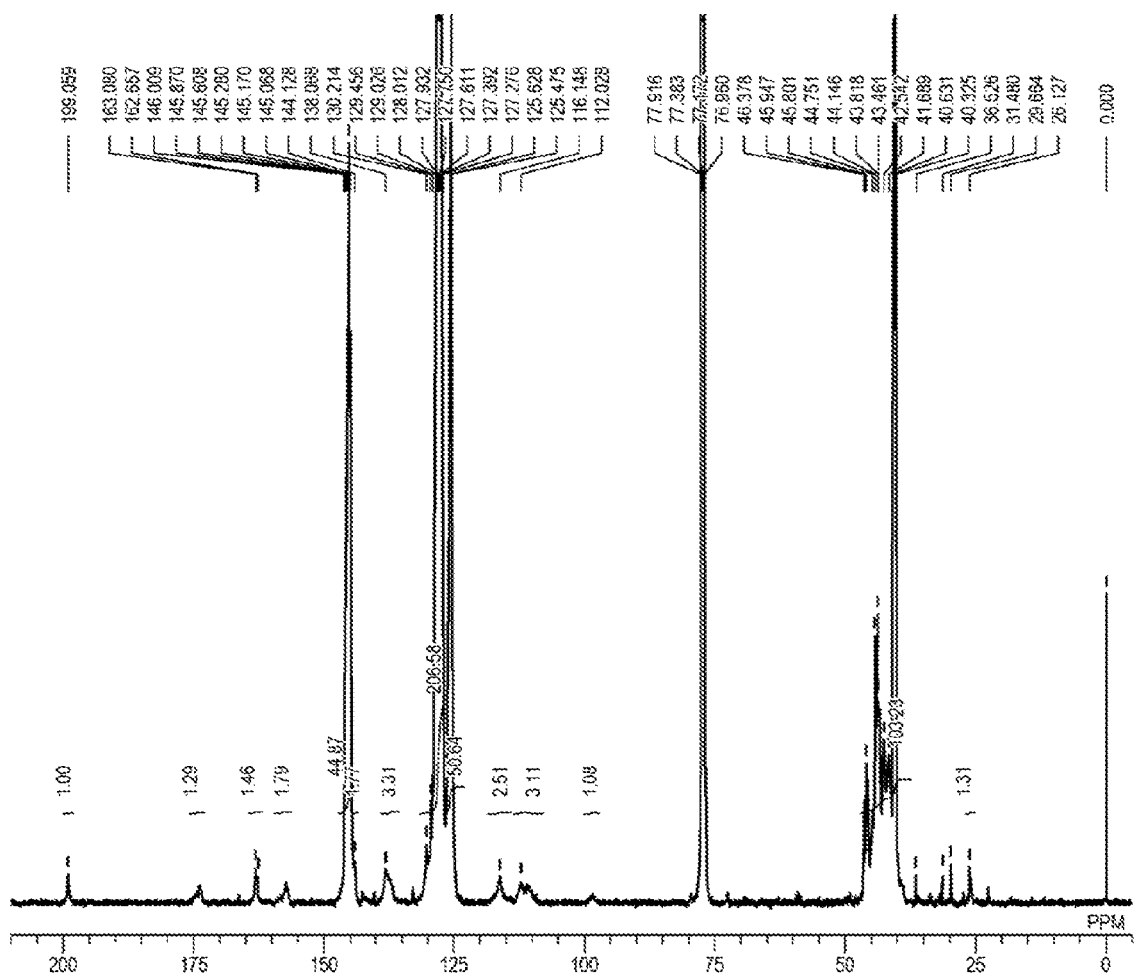
FIG. 5 is a $^{13}$C-NMR spectrum of compound (A-62)

[Results of Analysis for the Azo Skeleton Structure-Containing Compound (A-62)]
[1] Results of the molecular weight measurement (GPC): weight-average molecular weight (Mw)=21,468, number-average molecular weight (Mn)=12,324
[2] Results of the acid value measurement: 2.09 mg KOH/g
[3] Results of $^{13}$C-NMR (150 MHz, CDCl$_3$, room temperature) (refer to FIG. 5): δ [ppm]=199.1 (1C), 174.4-173.8 (1C), 163.1 (1C), 158.5-157.3, 146.0-145.1 (44.9C), 144.1, 138.1, 130.2-125.5, 116.1, 112.0, 98.5 (1C), 46.4-40.3, 26.1 (1C)

Production Examples for Compounds (A-2) to (A-9), (A-11) to (A-51), (A-53) to (A-56), (A-58) to (A-61), and (A-63) to (A-74)

The azo skeleton structure-containing compounds (A-2) to (A-9), (A-11) to (A-51), (A-53) to (A-56), (A-58) to (A-61), and (A-63) to (A-74) shown in Table 1 were produced by carrying out the same procedures as in the preceding production examples for compounds (A-1), (A-10), (A-52), (A-57), and (A-62), but changing the starting materials used.

The structures of these azo skeleton structure-containing compounds are given in Tables 1-1 to 1-3.

TABLE 1-1

Azo skeleton structure-containing compounds

| compound no. | chain sequence for the monomer copolymerization ratio (X/Y/Z/W) | $R_1$ | $R_2$ | $R_{29}$ | $R_{30}$ | $R_{31}$ | $R_{32}$ | $R_{33}$ |
|---|---|---|---|---|---|---|---|---|
| A-1 | poly($X_1$-co-W) ($X_1$/W = 100/4) | —CH$_3$ | —NHPh | —H | —H | —$R_{10}$-1 | —H | —H |
| A-2 | poly($X_1$-co-W) ($X_1$/W = 100/4) | —CH$_3$ | —NHPh | —H | —H | —$R_{10}$-2 | —H | —H |
| A-3 | poly($X_1$-co-W) ($X_1$/W = 100/4) | —N(CH$_3$)$_2$ | —N(CH$_3$)$_2$ | —H | —H | —$R_{10}$-1 | —H | —H |
| A-4 | poly($X_1$-co-W) ($X_1$/W = 100/4) | —OH | —OH | —H | —H | —$R_{10}$-1 | —H | —H |
| A-5 | poly($X_1$-co-W) ($X_1$/W = 100/4) | —CH$_3$ | —CH$_3$ | —H | —H | —$R_{10}$-1 | —H | —H |
| A-6 | α-W-poly$X_1$ ($X_1$/W = 110/1) | —CH$_3$ | —NHPh | —H | —H | —$R_{10}$-3 | —H | —H |
| A-7 | poly($X_1$-co-$Y_5$-co-W) ($X_1$/$Y_5$/W = 118/5/3) | —OH | —OH | —H | —H | —$R_{10}$-4 | —H | —H |
| A-8 | poly($X_1$-co-$Y_6$-co-W) ($X_1$/$Y_6$/W = 120/6/3) | —OH | —OH | —H | —H | —$R_{10}$-5 | —H | —H |
| A-9 | poly($X_1$-co-W) ($X_1$/W = 245/9) | —NH$_2$ | —NH$_2$ | —H | —H | —$R_{10}$-6 | —H | —H |
| A-10 | α-W-poly$X_1$ ($X_1$/W = 260/1) | —CH$_3$ | —$R_2$-2 | —COOCH$_3$ | —H | —H | —COOCH$_3$ | —H |
| A-11 | α-W-poly($X_1$-co-$Y_1$) ($X_1$/$Y_1$/W = 71/18/1) | —CH$_3$ | —$R_2$-1 | —COOCH$_3$ | —H | —H | —COOCH$_3$ | —H |
| A-12 | α-W-poly($X_1$-co-$Y_1$) ($X_1$/$Y_1$/W = 43/54/1) | —CH$_3$ | —$R_2$-1 | —COOCH$_3$ | —H | —H | —COOCH$_3$ | —H |
| A-13 | α-W-poly($X_1$-co-$Y_1$) ($X_1$/$Y_1$/W = 18/88/1) | —CH$_3$ | —$R_2$-1 | —COOCH$_3$ | —H | —H | —COOCH$_3$ | —H |
| A-14 | α-W-poly($X_1$-b-$Y_1$) ($X_1$/$Y_1$/W = 46/50/1) | —CH$_3$ | —$R_2$-1 | —COOCH$_3$ | —H | —H | —COOCH$_3$ | —H |
| A-15 | α-W-poly$Y_1$ ($Y_1$/W = 101/1) | —CH$_3$ | —$R_2$-1 | —COOCH$_3$ | —H | —H | —COOCH$_3$ | —H |
| A-16 | Poly$X_1$-W-Poly$X_1$ ($X_1$/W = 392/1) | —$R_1$-1 | —$R_2$-1 | —COOCH$_3$ | —H | —H | —COOCH$_3$ | —H |
| A-17 | Poly$X_1$-W-Poly$X_1$ ($X_1$/W = 386/1) | —$R_1$-2 | —$R_2$-2 | —COOCH$_3$ | —H | —H | —COOCH$_3$ | —H |
| A-18 | poly($X_1$-c-$Y_1$-c-$Z_1$-c-W) ($X_1$/$Y_1$/$Z_1$/W = 143/30/5/6) | —CH$_3$ | —$R_2$-3 | —COOCH$_3$ | —H | —H | —COOCH$_3$ | —H |
| A-19 | poly($X_1$-co-$Y_2$-co-W) ($X_1$/$Y_2$/W = 113/5/3) | —CH$_3$ | —$R_2$-4 | —COOCH$_3$ | —H | —H | —COOCH$_3$ | —H |
| A-20 | poly($X_1$-co-$Y_1$-co-$Z_1$-co-W) ($X_1$/$Y_1$/$Z_1$/W = 143/30/5/6) | —CH$_3$ | —$R_2$-3 | —COOCH$_3$ | —H | —H | —H | —H |
| A-21 | poly($X_1$-co-$Y_1$-co-$Z_1$-co-W) ($X_1$/$Y_1$/$Z_1$/W = 143/30/5/6) | —CH$_3$ | —$R_2$-3 | —H | —COOCH$_3$ | —H | —H | —H |
| A-22 | poly($X_1$-co-$Y_1$-co-$Z_1$-co-W) ($X_1$/$Y_1$/$Z_1$/W = 143/30/5/6) | —CH$_3$ | —$R_2$-3 | —H | —H | —COOCH$_3$ | —H | —H |
| A-23 | poly($X_1$-co-$Y_1$-co-$Z_1$-co-W) ($X_1$/$Y_1$/$Z_1$/W = 143/30/5/6) | —CH$_3$ | —$R_2$-3 | —H | —H | —H | —H | —H |

TABLE 1-1-continued

Azo skeleton structure-containing compounds

| compound no. | chain sequence for the monomer copolymerization ratio (X/Y/Z/W) | $R_1$ | $R_2$ | $R_{29}$ | $R_{30}$ | $R_{31}$ | $R_{32}$ | $R_{33}$ |
|---|---|---|---|---|---|---|---|---|
| A-24 | poly($X_1$-co-$Y_1$-co-$Z_1$-co-W) ($X_1/Y_1/Z_1/W$ = 143/30/5/6) | —Ph | —$R_2$-3 | —COOCH$_3$ | —H | —H | —COOCH$_3$ | —H |
| A-25 | poly($X_1$-co-$Y_1$-co-$Z_1$-co-W) ($X_1/Y_1/Z_1/W$ = 143/30/5/6) | —CH$_3$ | —$R_2$-3 | —H | —COOCH$_3$ | —H | —COOCH$_3$ | —H |
| A-26 | poly($X_1$-co-$Y_1$-co-$Z_1$-co-W) ($X_1/Y_1/Z_1/W$ = 143/30/5/6) | —CH$_3$ | —$R_2$-3 | —CONHCH$_3$ | —H | —H | —CONHCH$_3$ | —H |
| A-27 | poly($X_1$-co-$Y_1$-co-$Z_1$-co-W) ($X_1/Y_1/Z_1/W$ = 143/30/5/6) | —CH$_3$ | —$R_2$-3 | —COOH | —H | —H | —COOH | —H |
| A-28 | poly($X_1$-co-$Y_1$-co-$Z_1$-co-W) ($X_1/Y_1/Z_1/W$ = 143/30/5/6) | —CH$_3$ | —$R_2$-3 | —COOPr(i) | —H | —H | —COOPr(i) | —H |

TABLE 1-2

Azo skeleton structure-containing compounds

| compound no. | chain sequence for the monomer | $R_1$ | $R_2$ | $R_{29}$ | $R_{30}$ | $R_{31}$ | $R_{32}$ | $R_{33}$ |
|---|---|---|---|---|---|---|---|---|
| A-29 | poly($X_2$-co-$Y_2$-co-$Z_1$-co-W) ($X_2/Y_2/Z_1/W$ = 143/30/5/6) | —CH$_3$ | —$R_2$-3 | —COOCH$_3$ | —H | —H | —COOCH$_3$ | —H |
| A-30 | poly($X_1$-co-$Y_3$-co-$Z_1$-co-W) ($X_1/Y_3/Z_1/W$ = 143/30/5/6) | —CH$_3$ | —$R_2$-3 | —COOCH$_3$ | —H | —H | —COOCH$_3$ | —H |
| A-31 | poly($X_1$-co-$Y_4$-co-$Z_1$-co-W) ($X_1/Y_4/Z_1/W$ = 143/30/5/6) | —CH$_3$ | —$R_2$-3 | —COOCH$_3$ | —H | —H | —COOCH$_3$ | —H |
| A-32 | poly($X_1$-co-$Y_1$-co-W) ($X_1/Y_1/W$ = 143/30/11) | —CH$_3$ | —$R_2$-3 | —COOCH$_3$ | —H | —H | —COOCH$_3$ | —H |
| A-33 | poly($X_1$-co-$Z_1$-co-W) ($X_1/Z_1/W$ = 221/3/8) | —CH$_3$ | —$R_2$-3 | —COOCH$_3$ | —H | —H | —COOCH$_3$ | —H |
| A-34 | poly($X_1$-co-W) ($X_1/W$ = 221/11) | —CH$_3$ | —$R_2$-3 | —COOCH$_3$ | —H | —H | —COOCH$_3$ | —H |
| A-35 | poly$X_1$-b-polyW ($X_1/W$ = 84/5) | —CH$_3$ | —$R_2$-3 | —COOCH$_3$ | —H | —H | —COOCH$_3$ | —H |
| A-36 | poly($Y_1$-co-$Z_1$-co-W) ($Y_1/Z_1/W$ = 90/2/8) | —CH$_3$ | —$R_2$-3 | —COOCH$_3$ | —H | —H | —COOCH$_3$ | —H |
| A-37 | poly($X_1$-co-$Y_1$-co-$Z_1$-co-W) ($X_1/Y_1/Z_1/W$ = 10/11/5/2) | —CH$_3$ | —$R_2$-3 | —COOCH$_3$ | —H | —H | —COOCH$_3$ | —H |
| A-38 | poly($X_1$-co-$Z_1$-co-W) ($X_1/Z_1/W$ = 974/384/197) | —CH$_3$ | —$R_2$-3 | —COOCH$_3$ | —H | —H | —COOCH$_3$ | —H |
| A-39 | poly($X_2$-co-$Y_3$-co-W) ($X_2/Y_3/W$ = 142/30/11) | —CH$_3$ | —$R_2$-3 | —COOCH$_3$ | —H | —H | —COOCH$_3$ | —H |
| A-40 | a-W-poly$X_1$ ($X_1/W$ = 110/1) | —$R_1$-1 | —NHPh | —COOCH$_3$ | —H | —H | —COOCH$_3$ | —H |
| A-41 | poly($X_1$-co-$Y_1$-co-$Z_1$-co-W) ($X_1/Y_1/Z_1/W$ = 141/29/9/2) | —$R_1$-3 | —NHCH$_3$ | —COOCH$_3$ | —H | —H | —COOCH$_3$ | —H |
| A-42 | poly($X_1$-co-$Y_1$-co-$Z_1$-co-W) ($X_1/Y_1/Z_1/W$ = 141/29/9/2) | —$R_1$-3 | —N(CH$_3$)$_2$ | —COOCH$_3$ | —H | —H | —COOCH$_3$ | —H |
| A-43 | poly($X_1$-co-$Y_1$-co-$Z_1$-co-W) ($X_1/Y_1/Z_1/W$ = 141/29/9/2) | —$R_1$-3 | —OEt | —COOCH$_3$ | —H | —H | —COOCH$_3$ | —H |
| A-44 | poly($X_1$-co-$Y_1$-co-$Z_1$-co-W) ($X_1/Y_1/Z_1/W$ = 141/29/9/2) | —$R_1$-3 | 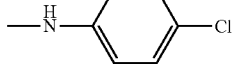 | —COOCH$_3$ | —H | —H | —COOCH$_3$ | —H |
| A-45 | poly($X_1$-co-$Y_1$-co-$Z_1$-co-W) ($X_1/Y_1/Z_1/W$ = 141/29/9/2) | —$R_1$-3 | 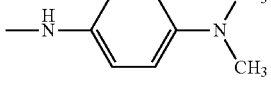 | —COOCH$_3$ | —H | —H | —COOCH$_3$ | —H |
| A-46 | poly($X_1$-co-$Y_1$-co-$Z_1$-co-W) ($X_1/Y_1/Z_1/W$ = 141/29/9/2) | —$R_1$-3 | 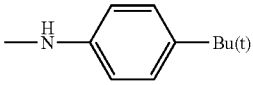 | —COOCH$_3$ | —H | —H | —COOCH$_3$ | —H |

TABLE 1-2-continued

Azo skeleton structure-containing compounds

| compound no. | chain sequence for the monomer | $R_1$ | $R_2$ | $R_{29}$ | $R_{30}$ | $R_{31}$ | $R_{32}$ | $R_{33}$ |
|---|---|---|---|---|---|---|---|---|
| A-47 | poly($X_1$-co-$Y_1$-co-$Z_1$-co-W) ($X_1$/$Y_1$/$Z_1$/W = 141/29/9/2) | —$R_1$-3 | (methyl 3-(methylamino)-terephthalate structure) | —COOCH$_3$ | —H | —H | —COOCH$_3$ | —H |
| A-48 | poly($X_1$-co-$Y_1$-co-$Z_1$-co-W) ($X_1$/$Y_1$/$Z_1$/W = 141/29/9/2) | —$R_1$-3 | —NHCH$_3$ | —COOCH$_3$ | —H | —H | —COOCH$_3$ | —H |
| A-49 | poly($X_1$-co-$Y_1$-co-$Z_1$-co-W) ($X_1$/$Y_1$/$Z_1$/W = 141/29/9/2) | —$R_1$-3 | —NHPh | —COOCH$_3$ | —H | —H | —COOCH$_3$ | —H |

TABLE 1-3

Azo skeleton structure-containing compounds

| compound no. | chain sequence for the monomer | $R_1$ | $R_2$ | $R_{29}$ | $R_{30}$ | $R_{31}$ | $R_{32}$ | $R_{33}$ |
|---|---|---|---|---|---|---|---|---|
| A-50 | poly($X_1$-co-$Y_2$-co-W) ($X_1$/$Y_2$/W = 130/5/4) | —CH$_3$ | —$R_2$-4 | —H | —CONH$_2$ | —H | —H | —H |
| A-51 | poly($X_1$-co-$Y_2$-co-$Z_1$-co-W) ($X_1$/$Y_2$/$Z_1$/W = 97/3/1/3) | —CH$_3$ | —$R_2$-4 | —CONH$_2$ | —H | —H | —H | —H |
| A-52 | poly($X_1$-co-$Y_2$-co-$Z_1$-co-W) ($X_1$/$Y_2$/$Z_1$/W = 97/3/1/3) | —CH$_3$ | —$R_2$-4 | —H | —H | —CONH$_2$ | —H | —H |
| A-53 | poly($X_1$-co-$Y_2$-co-$Z_1$-co-W) ($X_1$/$Y_2$/$Z_1$/W = 97/3/1/3) | —CH$_3$ | —$R_2$-4 | —CONH$_2$ | —H | —CONH$_2$ | —H | —H |
| A-54 | poly($X_1$-co-$Y_1$-co-$Y_2$-co-$Z_1$-co-W) ($X_1$/$Y_1$/$Y_2$/$Z_1$/W = 88/8/4/1/3) | —CH$_3$ | —$R_2$-4 | —H | —CONH$_2$ | —H | —H | —H |
| A-55 | poly($X_1$-co-$Y_1$-co-$Y_8$-co-$Z_1$-co-W) ($X_1$/$Y_1$/$Y_2$/$Z_1$/W = 64/30/6/1/3) | —CH$_3$ | —$R_2$-4 | —H | —CONH$_2$ | —H | —H | —H |
| A-56 | poly($X_1$-co-$Y_1$-co-$Y_8$-co-$Z_1$-co-W) ($X_1$/$Y_1$/$Y_4$/$Z_1$/W = 88/8/4/1/3) | —CH$_3$ | —$R_2$-4 | —H | —CONH$_2$ | —H | —H | —H |
| A-57 | poly($X_1$-co-$Y_7$-co-W) ($X_1$/$Y_3$/W = 93/8/3) | —CH$_3$ | —$R_2$-4 | —H | —CONH$_2$ | —H | —H | —H |
| A-58 | poly($X_1$-co-$Y_8$-co-$Z_1$-co-W) ($X_1$/$Y_4$/$Z_1$/W = 97/3/1/3) | —CH$_3$ | —$R_2$-4 | —H | —CONH$_2$ | —H | —H | —H |
| A-59 | poly($X_1$-co-$Y_6$-co-$Z_1$-co-W) ($X_1$/$Y_5$/$Z_1$/W = 97/3/1/3) | —CH$_3$ | —$R_2$-4 | —H | —CONH$_2$ | —H | —H | —H |
| A-60 | poly($X_1$-co-$Y_6$-co-$Z_1$-co-W) ($X_1$/$Y_5$/$Z_1$/W = 97/3/1/3) | —CH$_3$ | —$R_2$-4 | —H | —NHCONH$_2$ | —H | —H | —H |
| A-61 | poly($X_1$-co-W) ($X_1$/W = 115/4) | —CH$_3$ | —$R_2$-4 | —H | —H | —NHCONH$_2$ | —H | —H |
| A-62 | poly($X_1$-co-W) ($X_1$/W = 115/4) | —CH$_3$ | —$R_2$-4 | —H | —H | —NHCONH— | —H | —H |
| A-63 | poly($X_1$-co-W) ($X_1$/W = 115/4) | —CH$_3$ | (3-ureidophenylamino group) | —H | —H | —$R_{10}$-6 | —H | —H |
| A-64 | poly($X_1$-co-W) ($X_1$/W = 115/4) | —CH$_3$ | (2-oxo-2,3-dihydro-1H-benzimidazol-5-ylamino group) | —H | —H | —$R_{10}$-6 | —H | —H |
| A-65 | poly($X_1$-co-W) ($X_1$/W = 115/4) | —CH$_3$ | —$R_2$-4 | —H | —NHCONHBn | —H | —H | —H |
| A-66 | poly($X_1$-co-W) ($X_1$/W = 115/4) | —CH$_3$ | —$R_2$-4 | —H | —NHCONHEt | —H | —H | —H |

TABLE 1-3-continued

Azo skeleton structure-containing compounds

| compound no. | chain sequence for the monomer | $R_1$ | $R_2$ | $R_{29}$ | $R_{30}$ | $R_{31}$ | $R_{32}$ | $R_{33}$ |
|---|---|---|---|---|---|---|---|---|
| A-67 | poly($X_1$-co-W) ($X_1$/W = 115/4) | —$CH_3$ | —$R_2$-4 | —H | —NHCSNH$_2$ | —H | —H | —H |
| A-68 | poly($X_1$-co-W) ($X_1$/W = 115/4) | —$CH_3$ | —$R_2$-4 | —H | —NHCN(Boc)NHBoc | —H | —H | —H |
| A-69 | poly($X_1$-co-W) ($X_1$/W = 115/4) | —$CH_3$ | —$R_2$-4 | —H | —NHCONH$_2$ | —$CH_3$ | —H | —H |
| A-70 | poly($X_1$-co-W) ($X_1$/W = 115/4) | —$CH_3$ | —$R_2$-4 | —H | —NHCONH$_2$ | —Cl | —H | —H |
| A-71 | poly($X_1$-co-W) ($X_1$/W = 115/4) | —$CH_3$ | —$R_2$-4 | —H | —NHCONH$_2$ | —OH | —H | —H |
| A-72 | poly($X_1$-co-W) ($X_1$/W = 115/4) | —$CH_3$ | —$R_2$-4 | —H | —NHCONH$_2$ | —OCH$_3$ | —H | —H |
| A-73 | poly($X_1$-co-W) ($X_1$/W = 115/4) | —$CH_3$ | —$R_2$-4 | —H | —H | —SO$_2$NH$_2$ | —H | —H |
| A-74 | poly($X_1$-co-W) ($X_1$/W = 115/4) | —$CH_3$ | —$R_2$-4 | —H | —SO$_2$NH$_2$ | —H | —H | —H |

[In Tables 1-1 to 1-3, α indicates a terminal group attached to the left of the structure. "Pr(i)" indicates an unsubstituted isopropyl group; "Ph" indicates an unsubstituted phenyl group; "Et" indicates the ethyl group; "Bu(t)" indicates the tertiary butyl group; "Boc" indicates the tert-butoxycarbonyl group; and "Bn" indicates the benzyl group.]

The structures of the $X_1$, $X_2$, $Y_1$ to $Y_8$, $Z_1$, W, $R_1$-1 to $R_1$-3, $R_2$-1 to $R_2$-4, and $R_{10}$-1 to $R_{10}$-6 in Tables 1-1 to 1-3 are given below.

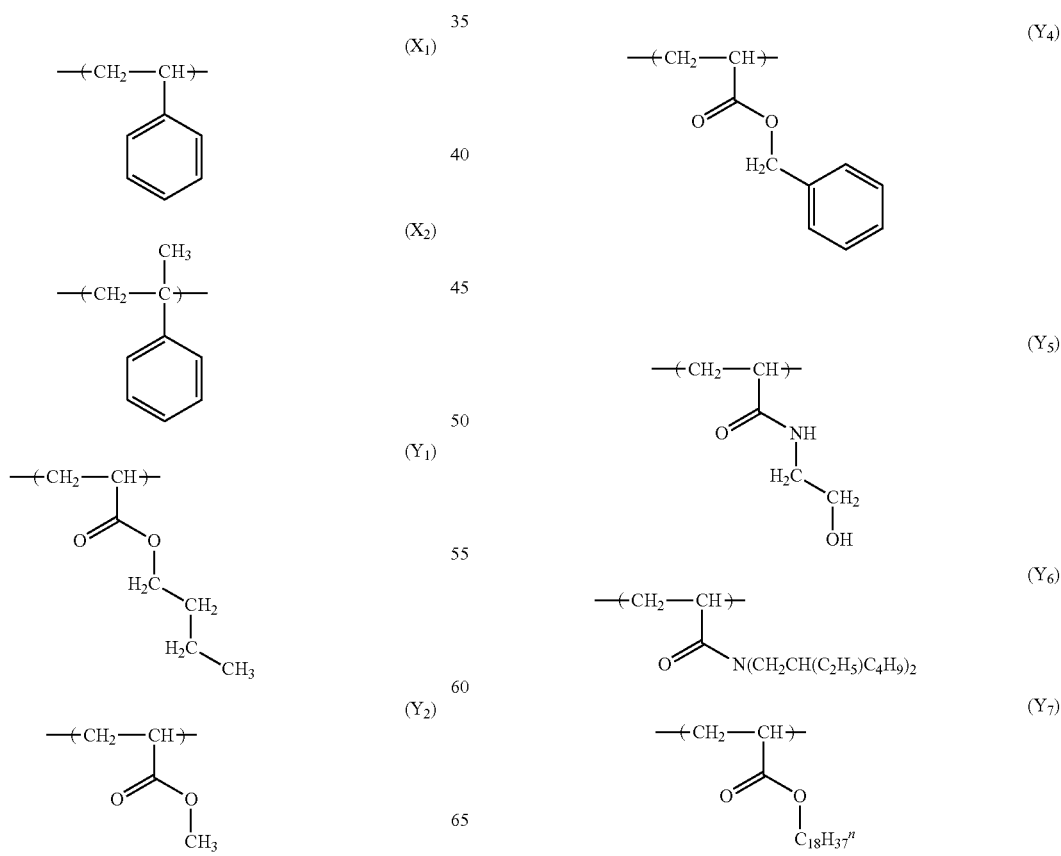

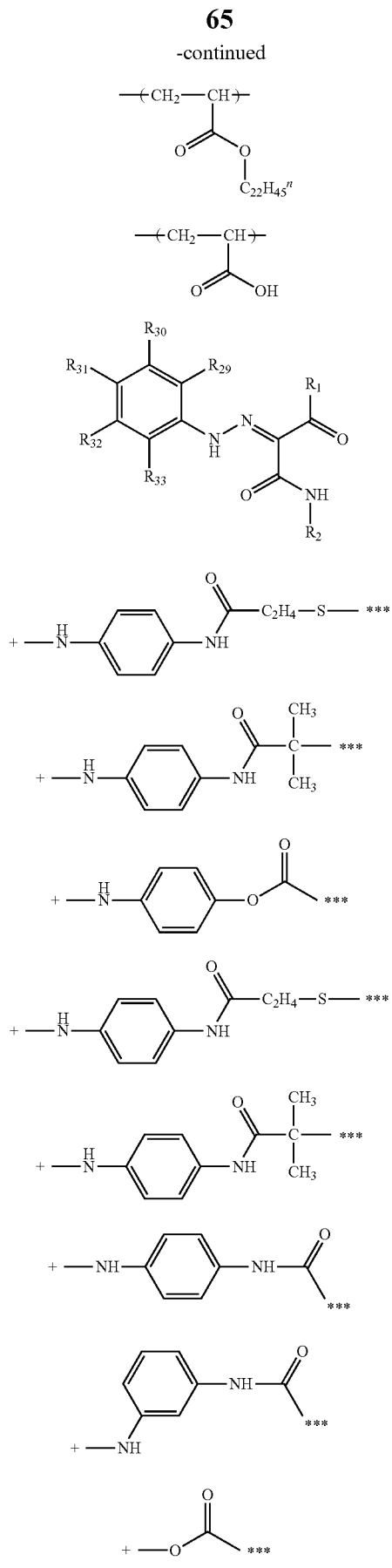

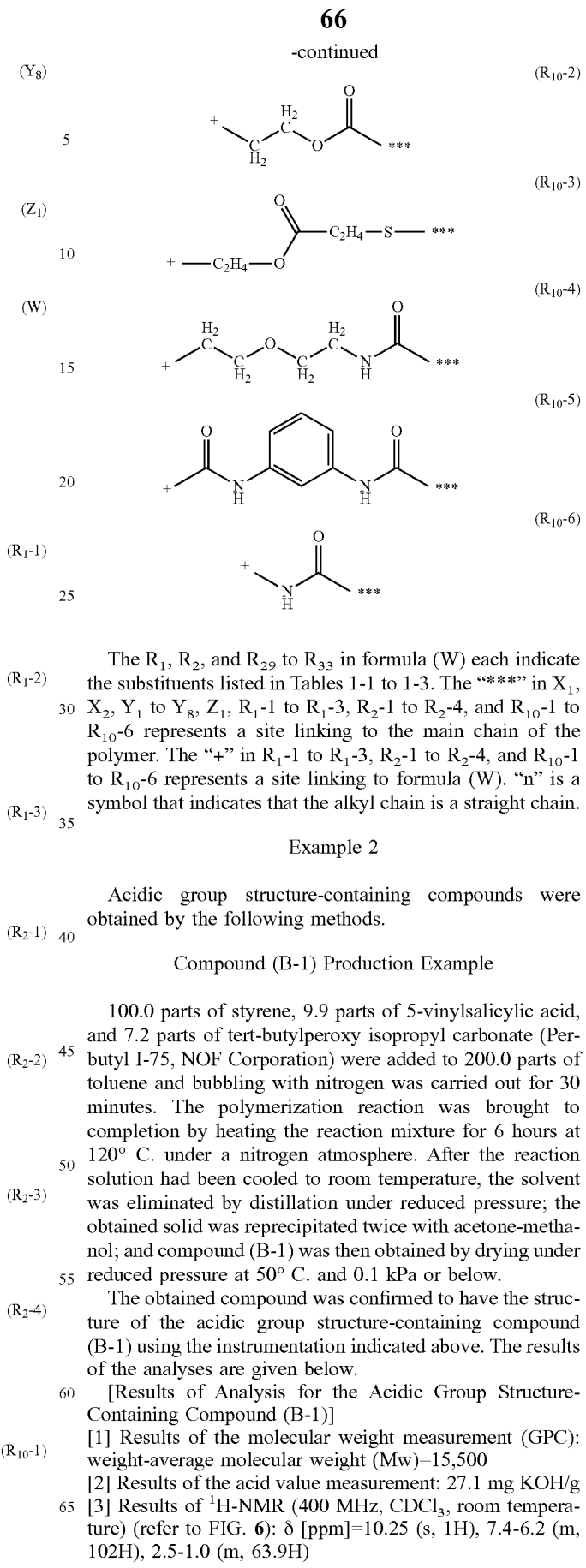

The $R_1$, $R_2$, and $R_{29}$ to $R_{33}$ in formula (W) each indicate the substituents listed in Tables 1-1 to 1-3. The "***" in $X_1$, $X_2$, $Y_1$ to $Y_8$, $Z_1$, $R_1$-1 to $R_1$-3, $R_2$-1 to $R_2$-4, and $R_{10}$-1 to $R_{10}$-6 represents a site linking to the main chain of the polymer. The "+" in $R_1$-1 to $R_1$-3, $R_2$-1 to $R_2$-4, and $R_{10}$-1 to $R_{10}$-6 represents a site linking to formula (W). "n" is a symbol that indicates that the alkyl chain is a straight chain.

Example 2

Acidic group structure-containing compounds were obtained by the following methods.

Compound (B-1) Production Example 100.0 parts of styrene, 9.9 parts of 5-vinylsalicylic acid, and 7.2 parts of tert-butylperoxy isopropyl carbonate (Perbutyl I-75, NOF Corporation) were added to 200.0 parts of toluene and bubbling with nitrogen was carried out for 30 minutes. The polymerization reaction was brought to completion by heating the reaction mixture for 6 hours at 120° C. under a nitrogen atmosphere. After the reaction solution had been cooled to room temperature, the solvent was eliminated by distillation under reduced pressure; the obtained solid was reprecipitated twice with acetone-methanol; and compound (B-1) was then obtained by drying under reduced pressure at 50° C. and 0.1 kPa or below.

The obtained compound was confirmed to have the structure of the acidic group structure-containing compound (B-1) using the instrumentation indicated above. The results of the analyses are given below.

[Results of Analysis for the Acidic Group Structure-Containing Compound (B-1)]

[1] Results of the molecular weight measurement (GPC): weight-average molecular weight (Mw)=15,500

[2] Results of the acid value measurement: 27.1 mg KOH/g

Figure 6:
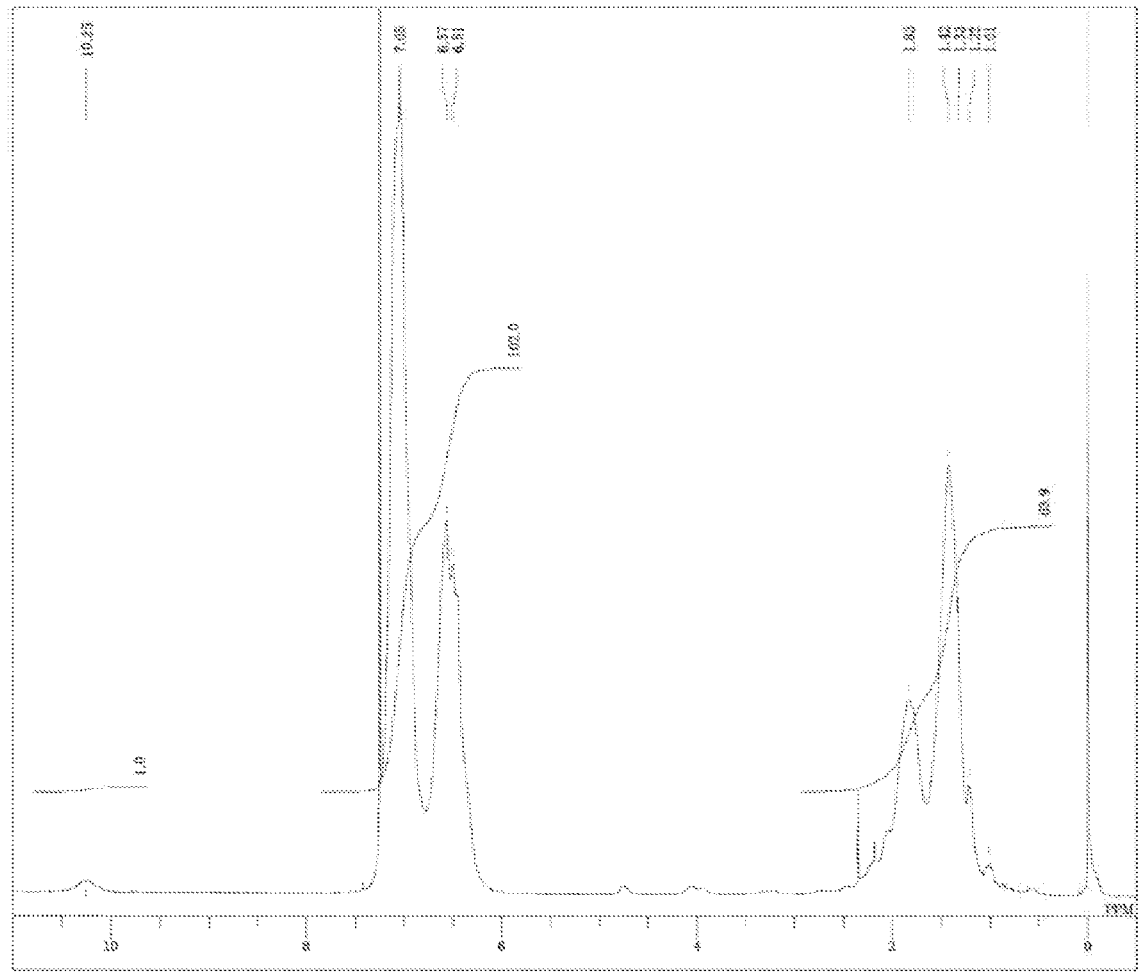
FIG. 6 is a $^1$H-NMR spectrum of compound (B-1)

[3] Results of $^1$H-NMR (400 MHz, CDCl$_3$, room temperature) (refer to FIG. 6): δ [ppm]=10.25 (s, 1H), 7.4-6.2 (m, 102H), 2.5-1.0 (m, 63.9H)

Compound (B-10) Production Example

The acidic group structure-containing compound (B-10) with the structure given below was produced according to the following scheme.

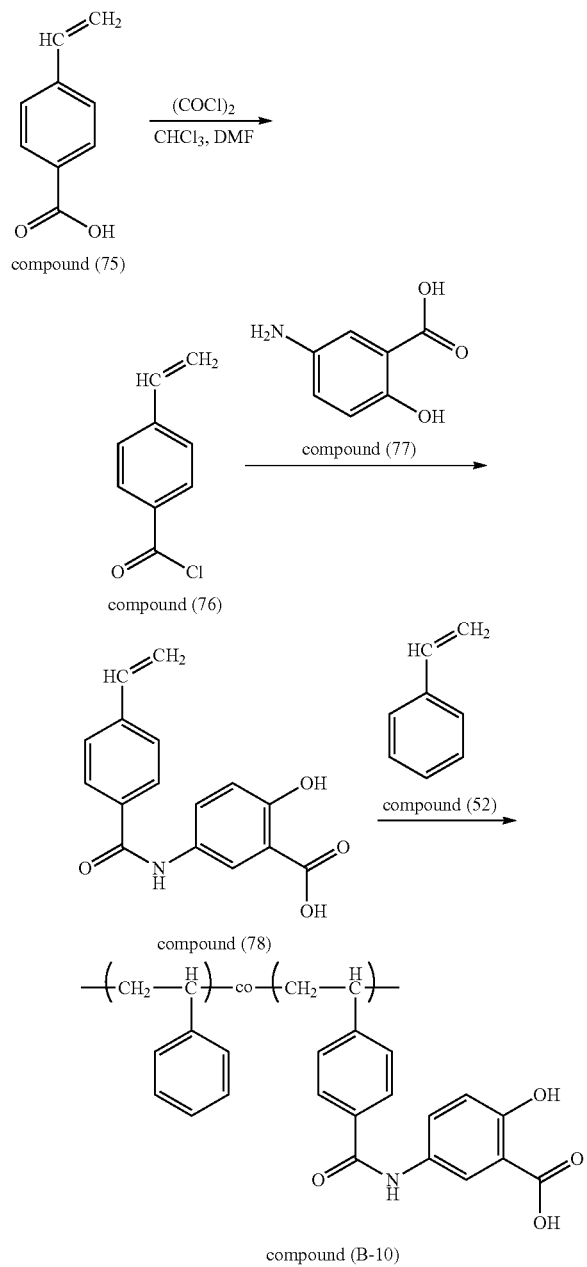

First, 20 parts of 4-vinylbenzoic acid (75) and 0.6 parts of 4-tert-butylcatechol were added to 225 parts of chloroform and this was cooled to 15° C. or less. While holding the solution temperature at 15° C. or less, 2.8 parts of dry N,N-dimethylformamide was added and 87.4 parts of oxalyl chloride was then added dropwise. After the dropwise addition, the solution temperature was raised to room temperature and stirring was carried out for 20 hours. After the completion of the reaction, the solvent was distilled out under reduced pressure and 340 parts of n-heptane was added. The organic phase was washed with deionized water; the organic layer was then dried over anhydrous magnesium sulfate; and subsequent distillation under reduced pressure produced 21.8 parts of a crude 4-vinylbenzoyl chloride (76).

24.1 parts of 5-aminosalicylic acid (77) and 22.1 parts of triethylamine were then added to 60 parts of dry N,N-dimethylformamide and stirring was carried out under ice cooling. While holding this solution at 10° C. or less, the dropwise addition was carried out of a solution prepared in advance by dissolving in 35 parts of chloroform the entire 21.8 parts of the 4-vinylbenzoyl chloride (76) obtained as described above. After the completion of the dropwise addition, the solution temperature was gradually returned to room temperature and a reaction was run for 12 hours. After the completion of the reaction, the reaction solution was poured into 500 parts of a 1 mol/L aqueous hydrochloric solution and the precipitated precipitate was filtered off. The obtained precipitate was washed with 1 mol/L aqueous hydrochloric acid and deionized water and the precipitate was filtered off and dried to obtain 32 parts of compound (78) (88% yield).

19.6 parts of compound (78), 100 parts of styrene (52), and 7.2 parts of tert-butylperoxy isopropyl carbonate were then added to 290 parts of propylene glycol monomethyl ether acetate and bubbling with nitrogen was performed for 30 minutes. The reaction mixture was heated for 8 hours at 145° C. under a nitrogen atmosphere to complete the polymerization reaction. The reaction solution was cooled to room temperature and the solvent was distilled off under reduced pressure. The obtained solid was dissolved in acetone and reprecipitated twice with methanol and the precipitate was filtered off and then dried under reduced pressure to obtain compound (B-10).

The obtained compound was confirmed to have the structure of the acidic group structure-containing compound (B-10) using the instrumentation indicated above. The results of the analyses are given below.

[Results of Analysis for the Acidic Group Structure-Containing Compound (B-10)]

[1] Results of the molecular weight measurement (GPC): weight-average molecular weight (Mw)=11,500

[2] Results of the acid value measurement: 23.3 mg KOH/g

Figure 7:
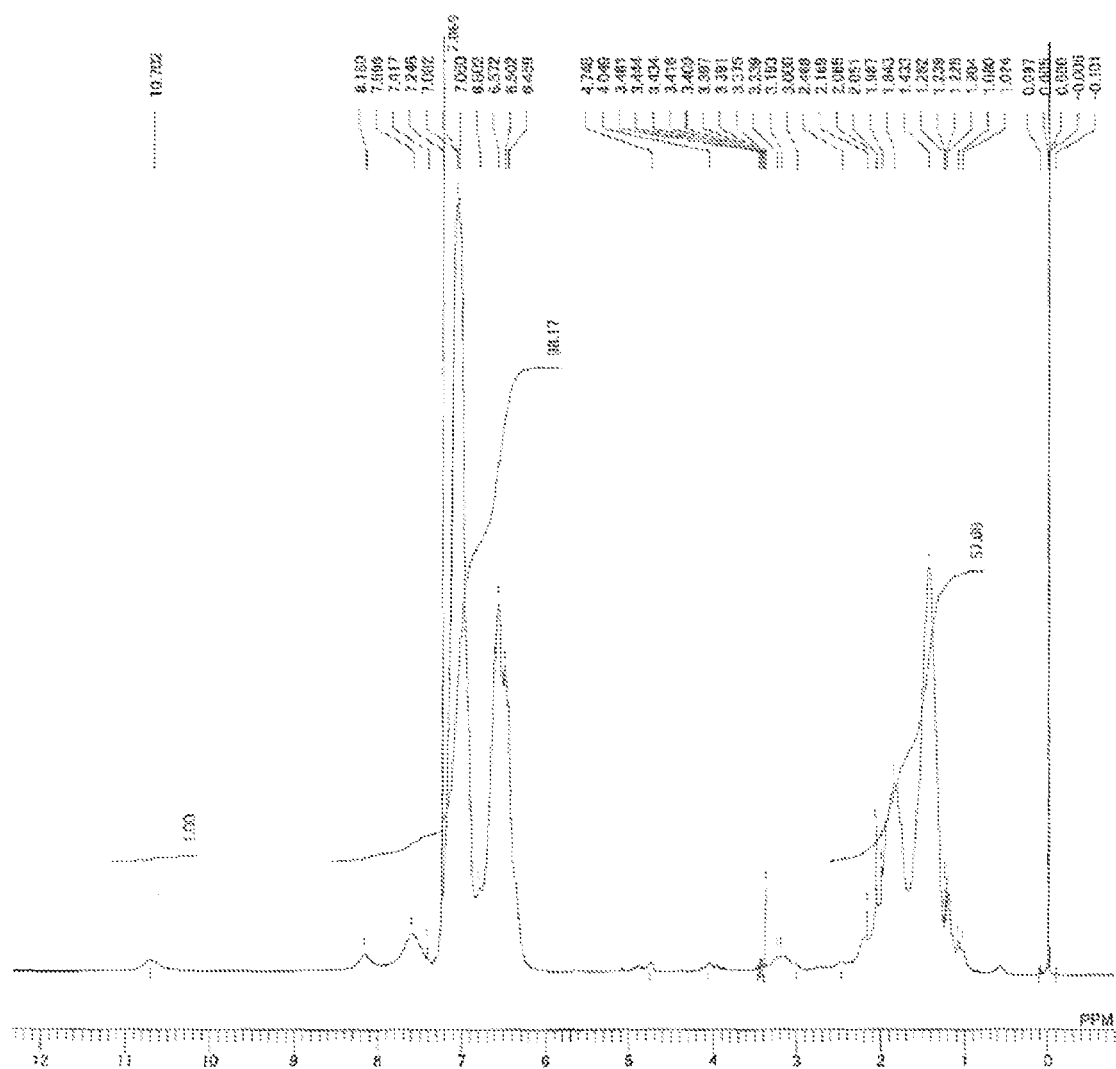
FIG. 7 is a $^1$H-NMR spectrum of compound (B-10)

[3] Results of $^1$H-NMR (400 MHz, CDCl$_3$, room temperature) (refer to FIG. 7): δ [ppm]=10.7 [s, 1H], 7.4-6.2 [m, 98.2H], 2.5-1.0 [m, 57.7H]

Compound (B-13) Production Example

The acidic group structure-containing compound (B-13) with the structure given below was produced according to the following scheme.

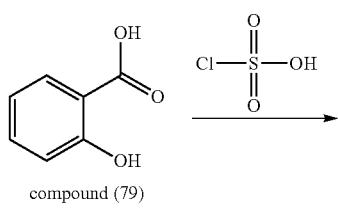

compound (79)

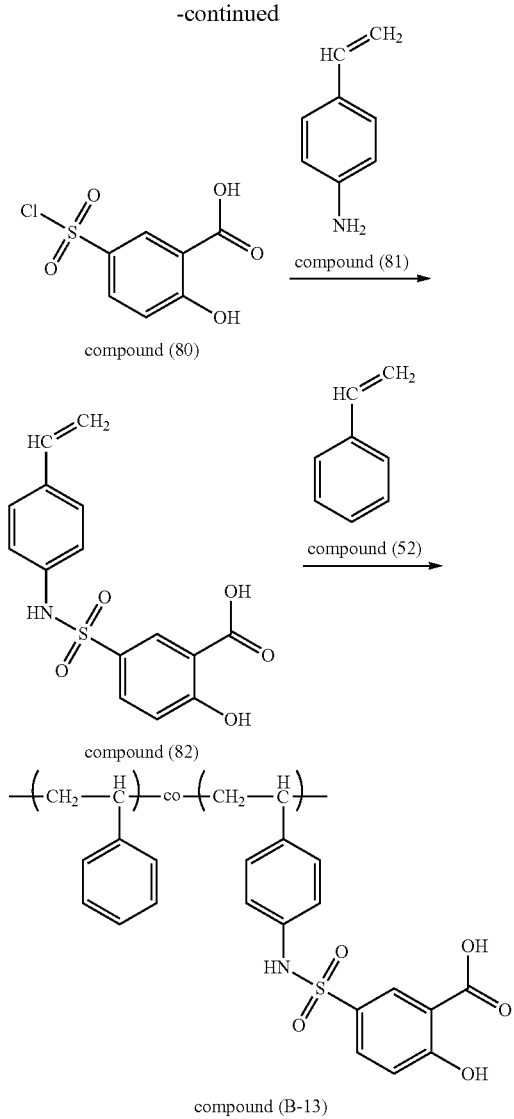

compound (80)

compound (81)

compound (52)

compound (82)

compound (B-13)

100 parts of salicylic acid (79) was first cooled to 15° C. or less. While holding at 15° C. or less, 438 parts of chlorosulfonic acid was gradually added dropwise. After the completion of the dropwise addition, the temperature of the reaction mixture was raised to 60° C. and a reaction was run for 2 hours at 60° C. After the reaction solution had been cooled to room temperature, the reaction solution was poured into 2,000 parts of crushed ice. The precipitated solid was filtered off and washed with ice water. The obtained solid was air dried and then recrystallized from chloroform to obtain 90 parts of compound (80) (53% yield).

89 parts of compound (80) was then introduced and dissolved into 120 parts of acetone and cooling to 15° C. or less was carried out. While holding the reaction solution at 15° C. or less, a solution of 47 parts of 4-aminostyrene (81) dissolved in 40 parts of acetone was gradually added dropwise. After the completion of the dropwise addition, the temperature of the reaction solution was raised to 50° C. and a reaction was run at 50° C. until the 4-aminostyrene had disappeared. After the completion of the reaction, the reaction solution was cooled to room temperature and the solvent was removed by distillation under reduced pressure. The obtained residue was dissolved in 350 parts of chloroform followed by washing with each of 500 parts of 1 mol/L hydrochloric acid and 500 parts of deionized water. The organic layer was dried over anhydrous sodium sulfate; the solvent was then removed by distillation under reduced pressure; and the residue was purified by silica gel column chromatography to obtain 76 parts of compound (82) (63% yield).

19.2 parts of compound (82), 100 parts of styrene (52), and 7.2 parts of tert-butylperoxy isopropyl carbonate were then introduced into 290 parts of propylene glycol monomethyl ether acetate and bubbling with nitrogen for 30 minutes was performed. The polymerization reaction was brought to completion by heating the reaction mixture for 8 hours at 145° C. under a nitrogen atmosphere. The reaction solution was cooled to room temperature and the solvent was then distilled off under reduced pressure. The obtained solid was reprecipitated twice with acetone-methanol and dried under reduced pressure at 50° C. and 0.1 kPa or below to obtain compound (B-13).

The obtained compound was confirmed to have the structure of the acidic group structure-containing compound (B-13) using the instrumentation indicated above. The results of the analyses are given below.

[Results of Analysis for the Acidic Group Structure-Containing Compound (B-13)]

[1] Results of the molecular weight measurement (GPC): weight-average molecular weight (Mw)=15,400

[2] Results of the acid value measurement: 26.0 mg KOH/g

Figure 8:
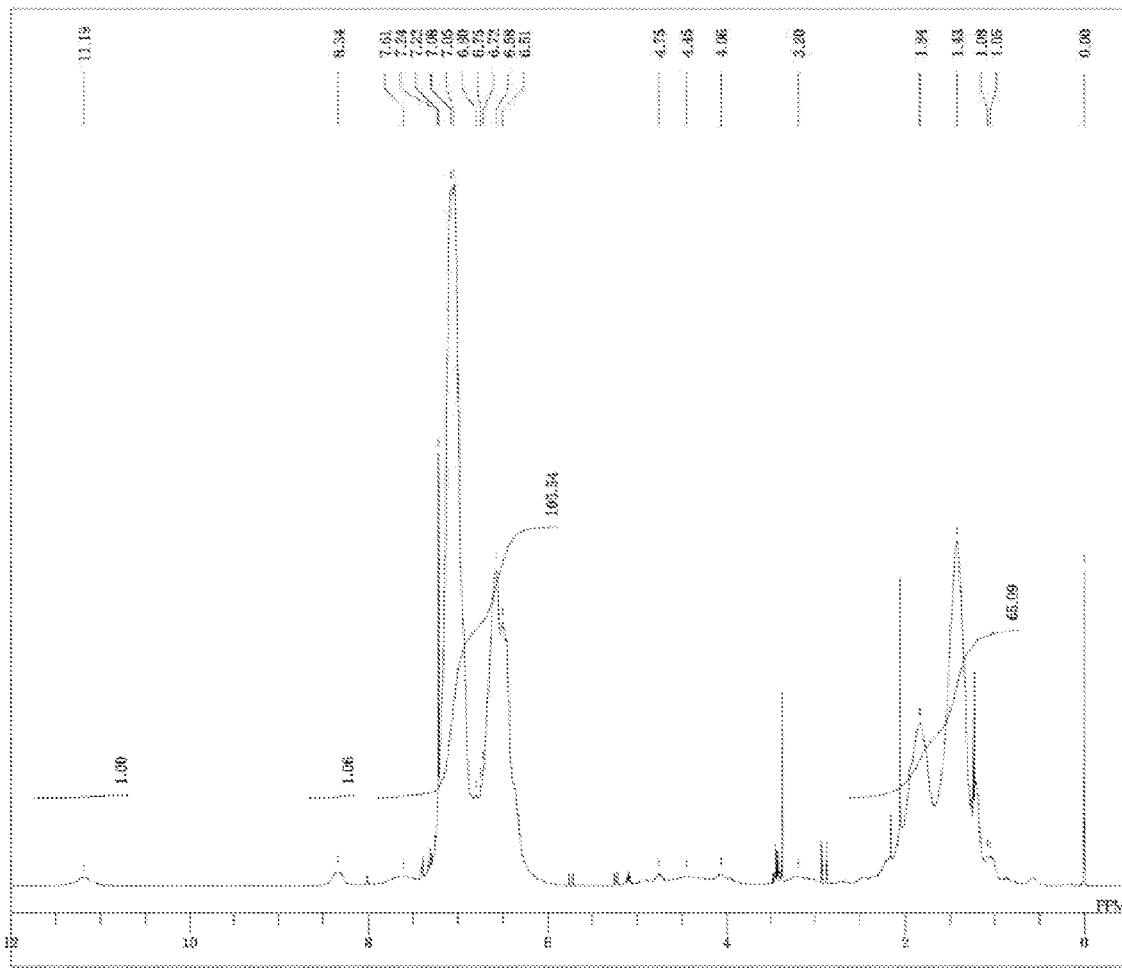
FIG. 8 is a $^1$H-NMR spectrum of compound (B-13)

[3] Results of $^1$H-NMR (400 MHz, CDCl$_3$, room temperature) (refer to FIG. 8): δ [ppm]=11.19 (s, 1H), 8.34 (s, 1H), 7.4-6.2 (m, 105.5H), 2.5-1.0 (m, 65.1H)

Compound (B-18) Production Example

The acidic group structure-containing compound (B-18) with the structure given below was produced according to the following scheme.

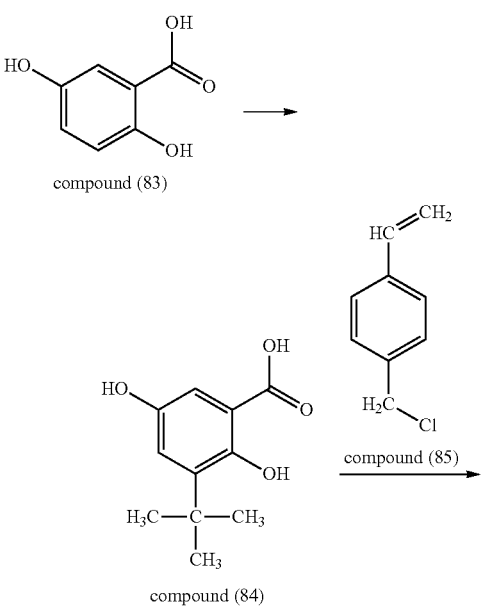

compound (83)

compound (84)

compound (85)

-continued

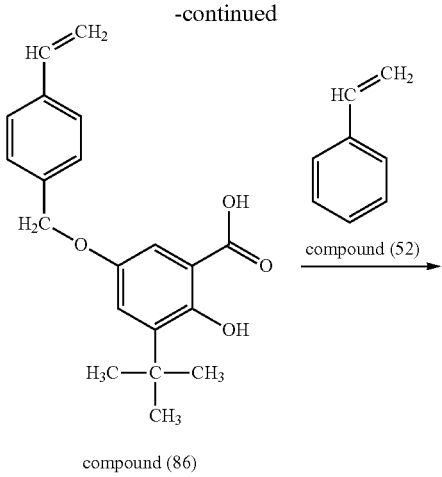

compound (86)

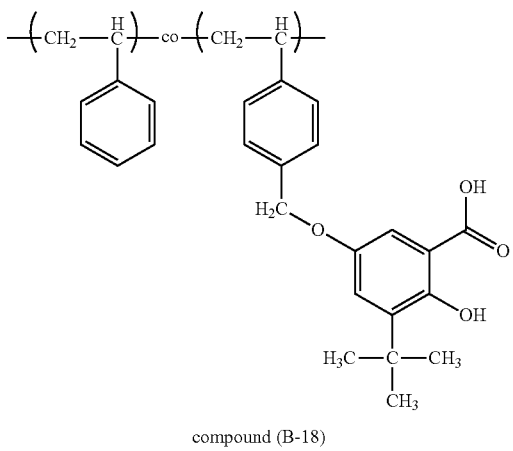

compound (B-18)

100 parts of 2,5-dihydroxybenzoic acid and 1441 parts of 80% sulfuric acid were first mixed while being heated to 50° C.; 144 parts of tert-butyl alcohol was added to this mixture; and stirring was carried out for 30 minutes at 50° C. The following process was then carried out 3 times: addition of 144 parts of tert-butyl alcohol to the mixture and stirring for 30 minutes at 50° C. After cooling the reaction solution to room temperature, it was gradually poured into 1,000 parts of ice water and the precipitate was filtered off. The precipitate was washed with water and additionally washed with hexane. The precipitate obtained at this point was dissolved in 200 parts of methanol and was reprecipitated using 3600 parts of water. After separation by filtration, drying at 80° C. provided 74.9 parts of compound (84).

25 parts of compound (84) was subsequently dissolved in 150 parts of methanol; 36.9 parts of potassium carbonate was added; and heating to 65° C. was carried out. A solution was prepared by mixing and dissolving 18.7 parts of 4-(chloromethyl)styrene (85) in 100 parts of methanol and this was added dropwise to the solution containing compound (84) and a reaction was run for 3 hours at 65° C. After cooling the obtained reaction solution, filtration was performed and the methanol in the filtrate was distilled off under reduced pressure to obtain a precipitate. The precipitate was dispersed in 1500 parts of water having pH=2 and extraction was performed by adding ethyl acetate. After washing with water, drying was carried out over anhydrous magnesium sulfate and a precipitate was obtained by distilling off the ethyl acetate under reduced pressure. The precipitate was washed with hexane followed by recrystallization with toluene/ethyl acetate to obtain 20.1 parts of compound (86).

19.7 parts of compound (86), 100 parts of styrene (52), and 7.2 parts of tert-butylperoxy isopropyl carbonate were then introduced into 290 parts of propylene glycol monomethyl ether acetate and bubbling with nitrogen was carried out for 30 minutes. The polymerization reaction was brought to completion by heating the reaction mixture for 8 hours at 145° C. in a nitrogen atmosphere. After the reaction solution had been cooled to room temperature, the solvent was distilled out under reduced pressure. The obtained solid was reprecipitated twice using acetone-methanol and compound (B-18) was obtained by drying under reduced pressure at 50° C. and 0.1 kPa or below.

The obtained compound was confirmed to have the structure of the acidic group structure-containing compound (B-18) using the instrumentation indicated above. The results of the analyses are given below.

[Results of Analysis for the Acidic Group Structure-Containing Compound (B-18)]

[1] Results of the molecular weight measurement (GPC): weight-average molecular weight (Mw)=12,000

[2] Results of the acid value measurement: 24.1 mg KOH/g

Figure 9:
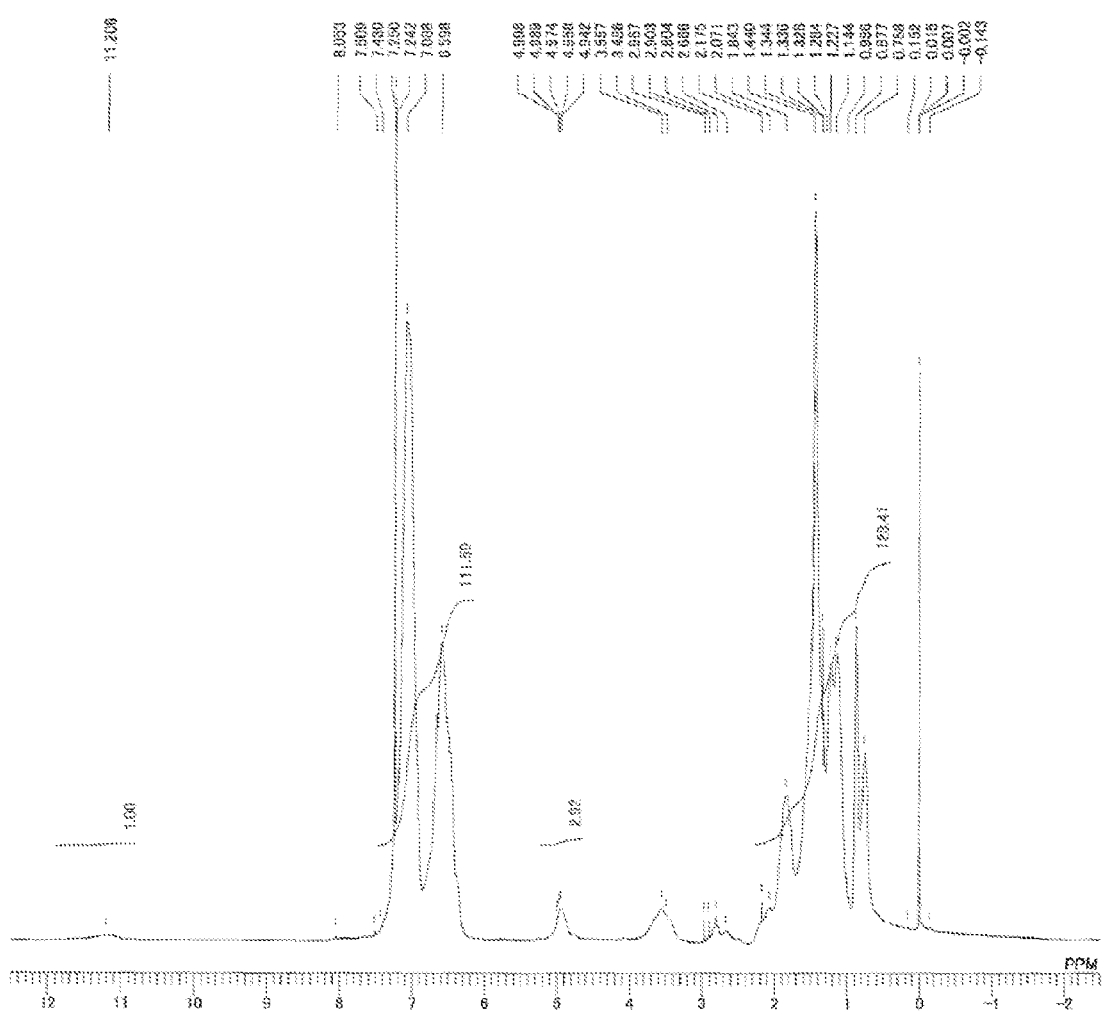
FIG. 9 is a $^1$H-NMR spectrum of compound (B-18).

[3] Results of $^1$H-NMR (400 MHz, CDCl$_3$, room temperature) (refer to FIG. 9): δ [ppm]=11.2 (s, 1H), 7.4-6.2 (m, 111.6H), 5.0-4.9 (s, 2.9H), 2.5-1.0 (m, 128.4H)

Production Examples for Compounds (B-2) to (B-9), (B-11) to (B-12), (B-14) to (B-17), and (B-19) to (B-22)

The acidic group structure-containing compounds (B-2) to (B-9), (B-11) to (B-12), (B-14) to (B-17), and (B-19) to (B-22) shown in Table 2 were produced by carrying out the same procedures as in the preceding production examples for compounds (B-1), (B-10), (B-13), and (B-18), but changing the starting materials used. The structures of these acidic group structure-containing compounds are given in Tables 2-1 and 2-2.

TABLE 2-1

| | Acidic group structure-containing compounds | | | | | |
|---|---|---|---|---|---|---|
| compound no. | copolymer component A | copolymer component B | copolymer component C | component ratio (molar ratio) (A:B:C) | acid value | Mw |
| B-1 | 5-vinyl salicylic acid | styrene | none | 5:95:0 | 27.1 | 15500 |
| B-2 | 5-vinyl salicylic acid | styrene | none | 10:90:0 | 52.7 | 14600 |
| B-3 | 5-vinyl salicylic acid | styrene | acrylic acid | 5:95:5 | 49.1 | 12500 |
| B-4 | 5-vinyl salicylic acid | styrene | n-butyl acrylate | 5:95:5 | 25.6 | 13800 |
| B-5 | 5-vinyl salicylic acid | styrene | n-butyl methacrylate | 5:95:5 | 26.3 | 14200 |
| B-6 | 5-vinyl salicylic acid | styrene | N,N-diethyl acrylamide | 5:95:5 | 25.5 | 13600 |

TABLE 2-1-continued

Acidic group structure-containing compounds

| compound no. | copolymer component A | copolymer component B | copolymer component C | component ratio (molar ratio) (A:B:C) | acid value | Mw |
|---|---|---|---|---|---|---|
| B-7 | (4-vinyl-2-hydroxybenzoic acid structure) | styrene | none | 5:95:0 | 25.3 | 12900 |
| B-8 | (3-tert-butyl-5-vinyl-2-hydroxybenzoic acid structure) | styrene | none | 5:95:0 | 24.6 | 12600 |
| B-9 | (4-chloro-5-vinyl-2-hydroxybenzoic acid structure) | styrene | none | 5:95:0 | 24.2 | 14800 |
| B-10 | (4-vinylbenzamide salicylic acid structure) | styrene | none | 5:95:0 | 23.3 | 16900 |
| B-11 | (4-vinylbenzenesulfonamide salicylic acid structure) | styrene | none | 5:95:0 | 27.4 | 15300 |

TABLE 2-2

| compound no. | copolymer component A | copolymer component B | copolymer component C | component ratio (molar ratio) (A:B:C) | acid value | Mw |
|---|---|---|---|---|---|---|
| B-12 | (4-vinylphenyl)sulfonamido-1-hydroxy-naphthalene-2-carboxylic acid structure | styrene | none | 5:95:0 | 22.7 | 17800 |
| B-13 | 5-(4-vinylphenylsulfamoyl)-2-hydroxybenzoic acid structure | styrene | none | 5:95:0 | 26.0 | 15400 |
| B-14 | 5-[(4-methacrylamidophenyl)sulfamoyl]-2-hydroxybenzoic acid structure | styrene | none | 5:95:0 | 24.0 | 16800 |
| B-15 | 4-vinylbenzenesulfonic acid | styrene | none | 5:95:0 | 26.7 | 25200 |

TABLE 2-2-continued

| | Acid group structure-containing compounds | | | | | |
|---|---|---|---|---|---|---|
| compound no. | copolymer component A | copolymer component B | copolymer component C | component ratio (molar ratio) (A:B:C) | acid value | Mw |
| B-16 | (methacrylamide with 2-methoxy-4-sulfophenyl group) | styrene | none | 5:95:0 | 21.6 | 9000 |
| B-17 | (4-vinylbenzyloxy-salicylic acid derivative) | styrene | none | 5:95:0 | 22.2 | 14400 |
| B-18 | (4-vinylbenzyloxy-salicylic acid with t-butyl) | styrene | none | 5:95:0 | 24.1 | 12000 |
| B-19 | (4-vinylbenzyloxy-salicylic acid with CH(CH$_3$)C$_6$H$_{13}^n$) | styrene | none | 5:95:0 | 20.5 | 13300 |
| B-20 | (substituted vinylbenzyloxy-salicylic acid derivative) | styrene | none | 5:95:0 | 21.8 | 14200 |
| B-21 | (4-vinylbenzyloxy-2-hydroxybenzoic acid) | styrene | none | 5:95:0 | 26.3 | 15600 |

TABLE 2-2-continued

Acid group structure-containing compounds

| compound no. | copolymer component A | copolymer component B | copolymer component C | component ratio (molar ratio) (A:B:C) | acid value | Mw |
|---|---|---|---|---|---|---|
| B-22 | 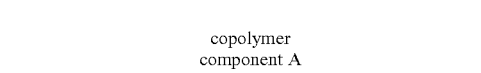 | styrene | none | 5:95:0 | 26.9 | 17800 |

The "n" in Tables 2-1 and 2-2 is a symbol that indicates that the alkyl chain is a straight chain.

Example 3-1

Yellow pigment dispersions were prepared by the following methods.

Yellow Pigment Dispersion Production Example 1

A yellow pigment dispersion (Dis-Y1) was obtained by mixing 18.0 parts of the yellow pigment C. I. Pigment Yellow 155 given by the following formula (Pig-A), 0.90 parts of the azo skeleton structure-containing compound (A-1), 0.90 parts of the acidic group structure-containing compound (B-1), 180 parts of styrene as a non-water-soluble solvent, and 130 parts of glass beads (diameter=1 mm), dispersing for 3 hours with an attritor (Nippon Coke & Engineering Co., Ltd.), and filtration across a mesh.

(Pig-A)

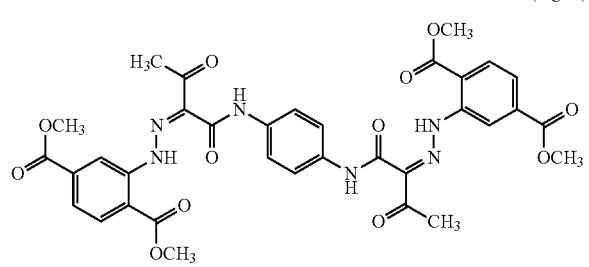

Yellow Pigment Dispersion Production Example 2

Yellow pigment dispersions (Dis-Y2 to Dis-Y98) were obtained in each case by carrying out the same procedures as in Yellow Pigment Dispersion Production Example 1, but changing compound (A-1) and compound (B-1) as shown in Tables 3-1 and 3-2.

Yellow Pigment Dispersion Production Example 3

A yellow pigment dispersion (Dis-Y99) was obtained by carrying out the same procedures as in Yellow Pigment Dispersion Production Example 1, but changing compound (A-1) to 0.36 parts of (A-52) and using 0.9 parts of compound (B-1).

Yellow Pigment Dispersion Production Example 4

Yellow pigment dispersions (Dis-Y100 and Dis-Y101) were obtained in each case by carrying out the same procedures as in Yellow Pigment Dispersion Production Example 3, but changing compound (A-52) to 0.09 parts and 1.8 parts, respectively.

Yellow Pigment Dispersion Production Example 5

A yellow pigment dispersion (Dis-Y102) was obtained by carrying out the same procedures as in Yellow Pigment Dispersion Production Example 1, but making compounds (A-1) and (B-1) as shown in Table 3-2 and changing compound (B-1) to 0.09 parts.

Yellow Pigment Dispersion Production Example 6

Yellow pigment dispersions (Dis-Y103 to Dis-Y105) were obtained in each case by carrying out the same procedures as in Yellow Pigment Dispersion Production Example 5, but changing compound (B-1) to 0.18 parts, 1.8 parts, and 2.7 parts, respectively.

Yellow Pigment Dispersion Production Example 7

Yellow pigment dispersions (Dis-Y106 and Dis-Y107) were obtained in each case by carrying out the same procedures as in Yellow Pigment Dispersion Production Example 1, but making compounds (A-1) and (B-1) as shown in Table 3-2 and changing the C. I. Pigment Yellow 155 to the C. I. Pigment Yellow 180 given by the following formula (Pig-B) and to the C. I. Pigment Yellow 185 given by the following formula (Pig-C), respectively.

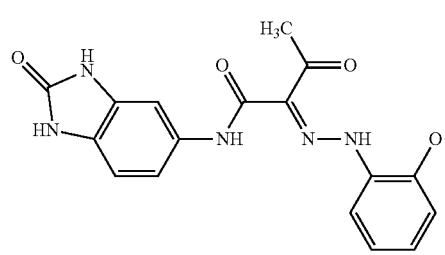

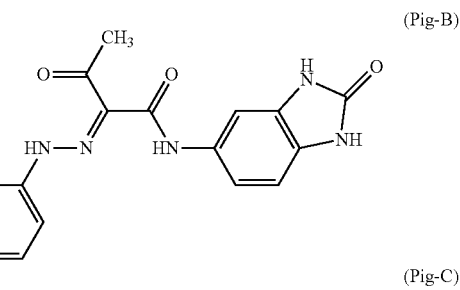

(Pig-B)

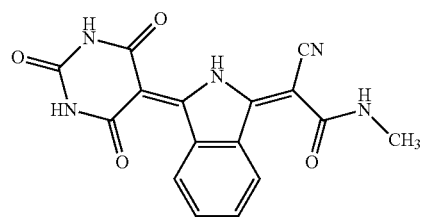

(Pig-C)

Comparative Example 3-1

Reference yellow pigment dispersions for providing reference values in the evaluations and comparative yellow pigment dispersions were prepared by the following methods.

Reference Yellow Pigment Dispersion Production Example 1

A reference yellow pigment dispersion (Dis-Y108) was obtained by carrying out the same procedures as in Yellow Pigment Dispersion Production Example 1, but omitting the addition of compound (A-1) and compound (B-1).

Reference Yellow Pigment Dispersion Production Example 2

Reference yellow pigment dispersions (Dis-Y109) and (Dis-Y110) were obtained in each case by carrying out the same procedures as in Yellow Pigment Dispersion Production Example 7, but omitting the addition of compound (A-52) and compound (B-1).

Comparative Yellow Pigment Dispersion Production Example 1

A comparative yellow pigment dispersion (Dis-Y111) was obtained by carrying out the same procedures as in Yellow Pigment Dispersion Production Example 1, but making the azo skeleton structure-containing compound as shown in Table 3-2 and omitting the addition of the acidic group structure-containing compound.

Comparative Yellow Pigment Dispersion Production Example 2

A comparative yellow pigment dispersion (Dis-Y112) was obtained by carrying out the same procedures as in Yellow Pigment Dispersion Production Example 1, but omitting the addition of compound (A-1).

Comparative Yellow Pigment Dispersion Production Example 3

A comparative yellow pigment dispersion (Dis-Y113) was obtained by carrying out the same procedures as in Comparative Yellow Pigment Dispersion Production Example 2, but changing compound (B-1) to 1.8 parts.

Comparative Yellow Pigment Dispersion Production Example 4

Yellow pigment dispersions (Dis-Y114 to Dis-Y116) and (Dis-Y117 to Dis-Y119) were obtained in each case by carrying out the same procedures as in Comparative Yellow Pigment Dispersion Production Examples 1 to 3, respectively, but changing the C. I. Pigment Yellow 155 to C. I. Pigment Yellow 180 and 185.

Comparative Yellow Pigment Dispersion Production Example 5

Comparative yellow pigment dispersions (Dis-Y120 to Dis-Y122) were obtained in each case by carrying out the same procedures as in Yellow Pigment Dispersion Production Example 1, but changing compounds (A-1) and (B-1) to 0.9 parts of the Disparlon DA-703-50 [Kusumoto Chemicals, Ltd., acid value: 15 mg KOH/g, amine value: 40 mg KOH/g] (comparative compound 1) described in Japanese Patent Application Laid-open No. 2006-030760, 0.9 parts of the methyl methacrylate/sodium styrenesulfonate copolymer (comparative compound 2) described in Japanese Patent Application Laid-open No. H03-113462, and 0.9 parts of the styrene/butyl acrylate [copolymerization ratio (mass ratio) =95/5] block copolymer (Mw=9,718) (comparative compound 3) described in Japanese Patent Application Laid-open No. H06-148927.

Example 3-2

Magenta pigment dispersions were prepared by the following methods.

Magenta Pigment Dispersion Production Example 1

A magenta pigment dispersion (Dis-M1) was obtained by mixing 18.0 parts of C. I. Pigment Red 122 given by the following formula (Pig-D) as a magenta pigment, 0.9 parts of the azo skeleton structure-containing compound (A-1), 0.9 parts of the acidic group structure-containing compound (B-1), 180 parts of styrene as a non-water-soluble solvent, and 130 parts of glass beads (diameter=1 mm), dispersing for 3 hours with an attritor (Nippon Coke & Engineering Co., Ltd.), and filtration across a mesh.

(Pig-D)

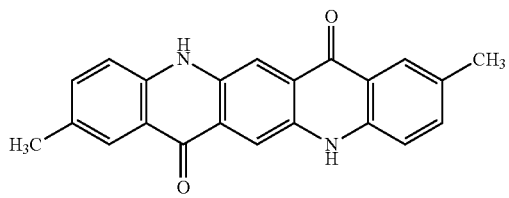

(Pig-E)

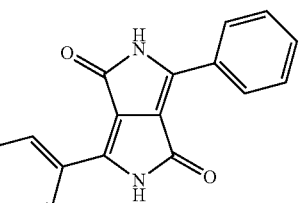

(Pig-F)

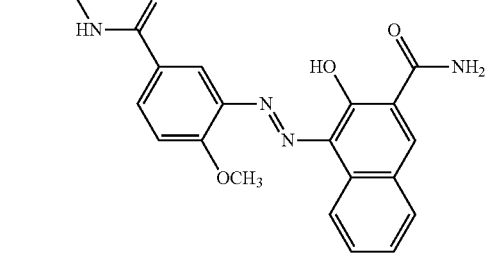

Magenta Pigment Dispersion Production Example 2

Magenta pigment dispersions (Dis-M2 to Dis-M98) were obtained in each case by carrying out the same procedures as in Magenta Pigment Dispersion Production Example 1, but changing compound (A-1) and compound (B-1) as shown in Tables 3-1 and 3-2.

Magenta Pigment Dispersion Production Example 3

A magenta pigment dispersion (Dis-M99) was obtained by carrying out the same procedures as in Magenta Pigment Dispersion Production Example 1, but changing compound (A-1) to 0.36 parts of (A-52) and using 0.9 parts of compound (B-1).

Magenta Pigment Dispersion Production Example 4

Magenta pigment dispersions (Dis-M100 and Dis-M101) were obtained in each case by carrying out the same procedures as in Magenta Pigment Dispersion Production Example 3, but changing compound (A-52) to 0.09 parts and 1.8 parts, respectively.

Magenta Pigment Dispersion Production Example 5

A magenta pigment dispersion (Dis-M102) was obtained by carrying out the same procedures as in Magenta Pigment Dispersion Production Example 1, but making compounds (A-1) and (B-1) as shown in Table 3-2 and changing compound (B-1) to 0.09 parts.

Magenta Pigment Dispersion Production Example 6

Magenta pigment dispersions (Dis-M103 to Dis-M105) were obtained in each case by carrying out the same procedures as in Magenta Pigment Dispersion Production Example 5, but changing compound (B-1) to 0.18 parts, 1.8 parts, and 2.7 parts, respectively.

Magenta Pigment Dispersion Production Example 7

Magenta pigment dispersions (Dis-M106 and Dis-M107) were obtained in each case by carrying out the same procedures as in Magenta Pigment Dispersion Production Example 1, but making compounds (A-1) and (B-1) as shown in Table 3-2 and changing the C. I. Pigment Red 122 to the C. I. Pigment Red 255 given by the following formula (Pig-E) and to the C. I. Pigment Red 150 given by the following formula (Pig-F), respectively.

Comparative Example 3-2

Reference magenta pigment dispersions for providing reference values in the evaluations and comparative magenta pigment dispersions were prepared by the following methods.

Reference Magenta Pigment Dispersion Production Example 1

A reference magenta pigment dispersion (Dis-M108) was obtained by carrying out the same procedures as in Magenta Pigment Dispersion Production Example 1, but omitting the addition of compound (A-1) and compound (B-1).

Reference Magenta Pigment Dispersion Production Example 2

Reference magenta pigment dispersions (Dis-M109 and Dis-M110) were obtained in each case by carrying out the same procedures as in Magenta Pigment Dispersion Production Example 7, but omitting the addition of compound (A-52) and compound (B-1).

Comparative Magenta Pigment Dispersion Production Example 1

A comparative magenta pigment dispersion (Dis-M111) was obtained by carrying out the same procedures as in Magenta Pigment Dispersion Production Example 1, but making the azo skeleton structure-containing compound as shown in Table 3-2 and omitting the addition of the acidic group structure-containing compound.

Comparative Magenta Pigment Dispersion Production Example 2

A comparative magenta pigment dispersion (Dis-M112) was obtained by carrying out the same procedures as in Magenta Pigment Dispersion Production Example 1, but omitting the addition of compound (A-1).

Comparative Magenta Pigment Dispersion Production Example 3

A comparative magenta pigment dispersion (Dis-M113) was obtained by carrying out the same procedures as in Comparative Magenta Pigment Dispersion Production Example 2, but changing compound (B-1) to 1.8 parts.

Comparative Magenta Pigment Dispersion Production Example 4

Magenta pigment dispersions (Dis-M114 to Dis-M116) and (Dis-M117 to Dis-M119) were obtained in each case by carrying out the same procedures as in Comparative Magenta Pigment Dispersion Production Examples 1 to 3, respectively, but changing the C. I. Pigment Red 122 to C. I. Pigment Red 255 or 150.

Comparative Magenta Pigment Dispersion Production Example 5

Comparative magenta pigment dispersions (Dis-M120) to (Dis-M122) were obtained in each case by carrying out the same procedures as in Magenta Pigment Dispersion Production Example 1, but changing compounds (A-1) and (B-1) to 0.9 parts of the Disparlon DA-703-50 [Kusumoto Chemicals, Ltd., acid value: 15 mg KOH/g, amine value: 40 mg KOH/g] (comparative compound 1) described in Japanese Patent Application Laid-open No. 2006-030760, 0.9 parts of the methyl methacrylate/sodium styrenesulfonate copolymer (comparative compound 2) described in Japanese Patent Application Laid-open No. H03-113462, and 0.9 parts of the styrene/butyl acrylate [copolymerization ratio (mass ratio) =95/5] block copolymer (Mw=9,718) (comparative compound 3) described in Japanese Patent Application Laid-open No. H06-148927.

Example 3-3

Cyan pigment dispersions were prepared by the following methods.

Cyan Pigment Dispersion Production Example 1

A cyan pigment dispersion (Dis-C1) was obtained by mixing 18.0 parts of C. I. Pigment Blue 15:3 given by the following formula (Pig-G) as a cyan pigment, 0.9 parts of the azo skeleton structure-containing compound (A-1), 0.9 parts of the acidic group structure-containing compound (B-1), 180 parts of styrene as a non-water-soluble solvent, and 130 parts of glass beads (diameter=1 mm), dispersing for 3 hours with an attritor (Nippon Coke & Engineering Co., Ltd.), and filtration across a mesh.

Cyan Pigment Dispersion Production Example 2

Cyan pigment dispersions (Dis-C2 to Dis-C98) were obtained in each case by carrying out the same procedures as in Cyan Pigment Dispersion Production Example 1, but changing compound (A-1) and compound (B-1) as shown in Tables 3-1 and 3-2.

Cyan Pigment Dispersion Production Example 3

A cyan pigment dispersion (Dis-C99) was obtained by carrying out the same procedures as in Cyan Pigment Dispersion Production Example 1, but changing compound (A-1) to 0.36 parts of (A-52) and using 0.9 parts of compound (B-1).

Cyan Pigment Dispersion Production Example 4

Cyan pigment dispersions (Dis-C100 and Dis-C101) were obtained in each case by carrying out the same procedures as in Cyan Pigment Dispersion Production Example 3, but changing compound (A-52) to 0.09 parts and 1.8 parts, respectively.

Cyan Pigment Dispersion Production Example 5

A cyan pigment dispersion (Dis-C102) was obtained in each case by carrying out the same procedures as in Cyan Pigment Dispersion Production Example 1, but making compounds (A-1) and (B-1) as shown in Table 3-2 and changing compound (B-1) to 0.09 parts.

Cyan Pigment Dispersion Production Example 6

Cyan pigment dispersions (Dis-C103 to Dis-C105) were obtained in each case by carrying out the same procedures as in Cyan Pigment Dispersion Production Example 5, but changing compound (B-1) to 0.18 parts, 1.8 parts, and 2.7 parts, respectively.

Cyan Pigment Dispersion Production Example 7

Cyan pigment dispersions (Dis-C106 and Dis-C107) were obtained in each case by carrying out the same procedures as in Cyan Pigment Dispersion Production Example 1, but making compounds (A-1) and (B-1) as shown in Table 3-2 and changing the C. I. Pigment Blue 15:3 to the C. I. Pigment Blue 16 given by the following formula (Pig-H) and to the C. I. Pigment Blue 17:1 given by the following formula (Pig-I), respectively.

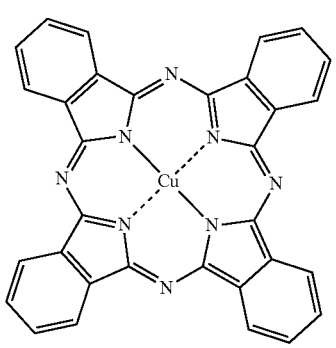

(Pig-G)

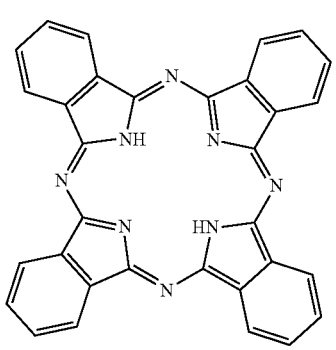

(Pig-H)

-continued

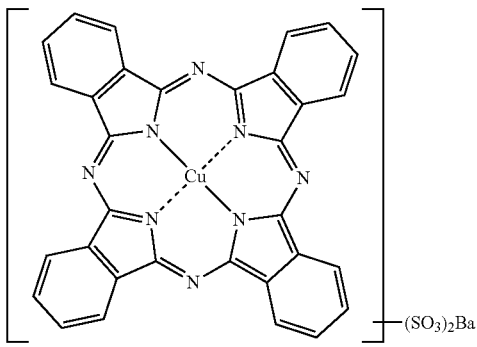

(Pig-I)

Comparative Example 3-3

Reference cyan pigment dispersions for providing reference values in the evaluations and comparative cyan pigment dispersions were prepared by the following methods.

Reference Cyan Pigment Dispersion Production Example 1

A reference cyan pigment dispersion (Dis-C108) was obtained by carrying out the same procedures as in Cyan Pigment Dispersion Production Example 1, but omitting the addition of compound (A-1) and compound (B-1).

Reference Cyan Pigment Dispersion Production Example 2

Reference cyan pigment dispersions (Dis-C109 and Dis-C110) were obtained in each case by carrying out the same procedures as in Cyan Pigment Dispersion Production Example 7, but omitting the addition of compound (A-52) and compound (B-1).

Comparative Cyan Pigment Dispersion Production Example 1

A comparative cyan pigment dispersion (Dis-C111) was obtained by carrying out the same procedures as in Cyan Pigment Dispersion Production Example 1, but making the azo skeleton structure-containing compound as shown in Table 3-2 and omitting the addition of the acidic group structure-containing compound.

Comparative Cyan Pigment Dispersion Production Example 2

A comparative cyan pigment dispersion (Dis-C112) was obtained by carrying out the same procedures as in Cyan Pigment Dispersion Production Example 1, but omitting the addition of compound (A-1).

Comparative Cyan Pigment Dispersion Production Example 3

A comparative cyan pigment dispersion (Dis-C113) was obtained by carrying out the same procedures as in Comparative Cyan Pigment Dispersion Production Example 2, but changing compound (B-1) to 1.8 parts.

Comparative Cyan Pigment Dispersion Production Example 4

Cyan pigment dispersions (Dis-C114 to Dis-C116) and (Dis-C117 to Dis-C119) were obtained in each case by carrying out the same procedures as in Comparative Cyan Pigment Dispersion Production Examples 1 to 3, respectively, but changing the C. I. Pigment Blue 15:3 to C. I. Pigment Blue 16 or 17:1.

Comparative Cyan Pigment Dispersion Production Example 5

Comparative cyan pigment dispersions (Dis-C120 to Dis-C122) were obtained in each case by carrying out the same procedures as in Cyan Pigment Dispersion Production Example 1, but changing compounds (A-1) and (B-1) to 0.9 parts of the Disparlon DA-703-50 [Kusumoto Chemicals, Ltd., acid value: 15 mg KOH/g, amine value: 40 mg KOH/g] (comparative compound 1) described in Japanese Patent Application Laid-open No. 2006-030760, 0.9 parts of the methyl methacrylate/sodium styrenesulfonate copolymer (comparative compound 2) described in Japanese Patent Application Laid-open No. H03-113462, and 0.9 parts of the styrene/butyl acrylate [copolymerization ratio (mass ratio) =95/5] block copolymer (Mw=9,718) (comparative compound 3) described in Japanese Patent Application Laid-open No. H06-148927.

Example 3-4

Black pigment dispersions were prepared by the following methods.

Black Pigment Dispersion Production Example 1

A black pigment dispersion (Dis-Bk1) was obtained by mixing 30.0 parts of a carbon black (specific surface area=65 $m^2/g$, average particle diameter=30 nm, pH=9.0) as a black pigment, 1.5 parts of the azo skeleton structure-containing compound (A-1), 1.5 parts of the acidic group structure-containing compound (B-1), 150 parts of styrene as a non-water-soluble solvent, and 130 parts of glass beads (diameter=1 mm), dispersing for 3 hours with an attritor (Nippon Coke & Engineering Co., Ltd.), and filtration across a mesh.

Black Pigment Dispersion Production Example 2

Black pigment dispersions (Dis-Bk2 to Dis-Bk98) were obtained in each case by carrying out the same procedures as in Black Pigment Dispersion Production Example 1, but changing compound (A-1) and compound (B-1) as shown in Tables 3-1 and 3-2.

Black Pigment Dispersion Production Example 3

A black pigment dispersion (Dis-Bk99) was obtained by carrying out the same procedures as in Black Pigment Dispersion Production Example 1, but changing compound (A-1) to 0.6 parts of (A-52) and using 1.5 parts of compound (B-1).

Black Pigment Dispersion Production Example 4

Black pigment dispersions (Dis-Bk100 and Dis-Bk101) were obtained in each case by carrying out the same procedures as in Black Pigment Dispersion Production Example 3, but changing compound (A-52) to 0.15 parts and 3.0 parts, respectively.

Black Pigment Dispersion Production Example 5

A black pigment dispersion (Dis-Bk102) was obtained by carrying out the same procedures as in Black Pigment Dispersion Production Example 1, but making compounds (A-1) and (B-1) as shown in Table 3-2 and changing compound (B-1) to 0.15 parts.

Black Pigment Dispersion Production Example 6

Black pigment dispersions (Dis-Bk103 to Dis-Bk105) were obtained in each case by carrying out the same procedures as in Black Pigment Dispersion Production Example 5, but changing compound (B-1) to 0.3 parts, 3.0 parts, and 4.5 parts, respectively.

Black Pigment Dispersion Production Example 7

Black pigment dispersions (Dis-Bk106 and Dis-Bk107) were obtained in each case by carrying out the same procedures as in Black Pigment Dispersion Production Example 1, but making compounds (A-1) and (B-1) as shown in Table 3-2 and changing the carbon black (specific surface area=65 $m^2/g$, average particle diameter=30 nm, pH=9.0) to a carbon black (specific surface area=77 $m^2/g$, average particle diameter=28 nm, pH=7.5) or to a carbon black (specific surface area=370 $m^2/g$, average particle diameter=13 nm, pH=3.0), respectively.

Comparative Example 3-4

Reference black pigment dispersions for providing reference values in the evaluations and comparative black pigment dispersions were prepared by the following methods.

Reference Black Pigment Dispersion Production Example 1

A reference black pigment dispersion (Dis-Bk108) was obtained by carrying out the same procedures as in Black Pigment Dispersion Production Example 1, but omitting the addition of compound (A-1) and compound (B-1).

Reference Black Pigment Dispersion Production Example 2

Reference black pigment dispersions (Dis-Bk109 and Dis-Bk110) were obtained in each case by carrying out the same procedures as in Black Pigment Dispersion Production Example 7, but omitting the addition of compound (A-52) and compound (B-1).

Comparative Black Pigment Dispersion Production Example 1

A comparative black pigment dispersion (Dis-Bk111) was obtained by carrying out the same procedures as in Black Pigment Dispersion Production Example 1, but making the azo skeleton structure-containing compound as shown in Table 3-2 and omitting the addition of the acidic group structure-containing compound.

Comparative Black Pigment Dispersion Production Example 2

A comparative black pigment dispersion (Dis-Bk112) was obtained by carrying out the same procedures as in Black Pigment Dispersion Production Example 1, but omitting the addition of compound (A-1).

Comparative Black Pigment Dispersion Production Example 3

A comparative black pigment dispersion (Dis-Bk113) was obtained by carrying out the same procedures as in Comparative Black Pigment Dispersion Production Example 2, but changing compound (B-1) to 1.8 parts.

Comparative Black Pigment Dispersion Production Example 4

Black pigment dispersions (Dis-Bk114 to Dis-Bk116) and (Dis-Bk117 to Dis-Bk119) were obtained in each case by carrying out the same procedures as in Comparative Black Pigment Dispersion Production Examples 1 to 3, respectively, but changing the carbon black (specific surface area=65 $m^2/g$, average particle diameter=30 nm, pH=9.0) to a carbon black (specific surface area=77 $m^2/g$, average particle diameter=28 nm, pH=7.5) or to a carbon black (specific surface area=370 $m^2/g$, average particle diameter=13 nm, pH=3.0).

Comparative Black Pigment Dispersion Production Example 5

Comparative black pigment dispersions (Dis-Bk120 to Dis-Bk122) were obtained in each case by carrying out the same procedures as in Black Pigment Dispersion Production Example 1, but changing compounds (A-1) and (B-1) to 1.5 parts of the Disparlon DA-703-50 [Kusumoto Chemicals, Ltd., acid value: 15 mg KOH/g, amine value: 40 mg KOH/g] (comparative compound 1) described in Japanese Patent Application Laid-open No. 2006-030760, 1.5 parts of the methyl methacrylate/sodium styrenesulfonate copolymer (comparative compound 2) described in Japanese Patent Application Laid-open No. H03-113462, and 1.5 parts of the styrene/butyl acrylate [copolymerization ratio (mass ratio) =95/5] block copolymer (Mw=9,718) (comparative compound 3) described in Japanese Patent Application Laid-open No. H06-148927.

Example 4-1

These pigment dispersions in the individual colors were evaluated by the following method.

<Evaluation of the Pigment Dispersibility>

The pigment dispersibility was evaluated using the pigment dispersions (Dis-Y1 to Y107), (Dis-M1 to M107), (Dis-C1 to C107), and (Dis-Bk1 to Bk107) by performing a gloss test on the coated film. The specific evaluation method is as follows.

The pigment dispersion was scooped up with a dropper and applied on a straight line at the top of super art paper (SA Kanefuji, 180 kg, 80×160, Oji Paper Co., Ltd.) and was uniformly coated on the art paper using a wire bar (#10). After drying, the gloss (angle of reflection: 75°) was measured using a Gloss Meter VG2000 gloss meter (Nippon Denshoku Industries Co., Ltd.) and was evaluated using the criteria given below. A finer dispersion for the pigment provides an enhanced smoothness for the coated film and an increase in the gloss value.

For (Dis-Y1 to Y105, M1 to M105, and C1 to C105), the percentage increase in the gloss value was calculated using the gloss value for the respective reference pigment dispersion (Dis-Y108, M108, and C108) as the reference value. For (Dis-Y106, M106, and C106), the percentage increase in the gloss value was calculated using the gloss value for the respective reference pigment dispersion (Dis-Y109, M109, and C109) as the reference value. For (Dis-Y107, M107, and C107), the percentage increase in the gloss value was calculated using the gloss value for the respective reference pigment dispersion (Dis-Y110, M110, and C110) as the reference value.

The evaluation criteria for the pigment dispersions in each color are given below.

Evaluation criteria for the yellow pigment dispersions
A: the percentage increase in the gloss value was at least 15%
B: the percentage increase in the gloss value was at least 10% and less than 15%
C: the percentage increase in the gloss value was at least 5% and less than 10%
D: the percentage increase in the gloss value was less than 5%

The pigment dispersibility was rated as excellent when the percentage increase in the gloss value was greater than or equal to 10%.

Evaluation criteria for the magenta pigment dispersions
A: the percentage increase in the gloss value was at least 35%
B: the percentage increase in the gloss value was at least 20% and less than 35%
C: the percentage increase in the gloss value was at least 5% and less than 20%
D: the percentage increase in the gloss value was less than 5%

The pigment dispersibility was rated as excellent when the percentage increase in the gloss value was greater than or equal to 20%.

Evaluation criteria for the cyan pigment dispersions
A: the percentage increase in the gloss value was at least 25%
B: the percentage increase in the gloss value was at least 15% and less than 25%
C: the percentage increase in the gloss value was at least 5% and less than 15%
D: the percentage increase in the gloss value was less than 5%

The pigment dispersibility was rated as excellent when the percentage increase in the gloss value was greater than or equal to 15%.

Evaluation criteria for the black pigment dispersions
A: the gloss value was at least 80
B: the gloss value was at least 50 and less than 80
C: the gloss value was at least 20 and less than 50
D: the gloss value was less than 20

The pigment dispersibility was rated as excellent when the gloss value was greater than or equal to 50.

Comparative Example 4-2

The gloss of the comparative pigment dispersions (Dis-Y111 to Y122), (Dis-M111 to M122), (Dis-C111 to C122), and (Dis-Bk111 to Bk122) was evaluated by the same method as in Example 4-1.

The percentage increase in the gloss value of the comparative pigment dispersions (Dis-Y111 to Y113, Y120 to Y122), (Dis-M111 to M113, M120-M122), and (Dis-C111 to C113, C120 to C122) was calculated using the gloss value for the respective reference pigment dispersion (Dis-Y108, M108, and C108) as the reference value; the percentage increase in the gloss value for the comparative pigment dispersions (Dis-Y114 to Y116), (Dis-M114 to M116), and (Dis-C114 to C116) was calculated using the gloss value for the respective reference pigment dispersion (Dis-Y109, M109, and C109) as the reference value; and the percentage increase in the gloss value of the comparative pigment dispersions (Dis-Y117 to Y119), (Dis-M117 to M119), and (Dis-C117 to C119) was calculated using the gloss value for the respective reference pigment dispersion (Dis-Y110, M110, and C110) as the reference value.

The results of the evaluations are given in Table 3. The dispersing agents A and B in the table indicate, respectively, the azo skeleton structure-containing compounds A and the acidic group structure-containing compounds B used in the individual pigment dispersions.

TABLE 3-1

Results of the evaluation of the pigment dispersions

| dispersing agent | | yellow | | magenta | | cyan | | black | |
|---|---|---|---|---|---|---|---|---|---|
| A | B | dispersion | gloss (gloss value) | dispersion | gloss (gloss value) | dispersion | gloss (gloss value) | dispersion | gloss (gloss value) |
| A-1 | B-1 | Dis-Y1 | A(66) | Dis-M1 | A(65) | Dis-C1 | A(58) | Dis-Bk1 | A(87) |
| A-2 | B-1 | Dis-Y2 | A(67) | Dis-M2 | A(66) | Dis-C2 | A(60) | Dis-Bk2 | A(85) |
| A-3 | B-1 | Dis-Y3 | A(68) | Dis-M3 | A(64) | Dis-C3 | A(59) | Dis-Bk3 | A(88) |
| A-4 | B-1 | Dis-Y4 | A(69) | Dis-M4 | A(65) | Dis-C4 | A(59) | Dis-Bk4 | A(89) |
| A-5 | B-1 | Dis-Y5 | A(66) | Dis-M5 | A(65) | Dis-C5 | A(61) | Dis-Bk5 | A(85) |
| A-6 | B-1 | Dis-Y6 | A(67) | Dis-M6 | A(68) | Dis-C6 | A(63) | Dis-Bk6 | A(86) |
| A-7 | B-1 | Dis-Y7 | A(67) | Dis-M7 | A(69) | Dis-C7 | A(59) | Dis-Bk7 | A(86) |
| A-8 | B-1 | Dis-Y8 | A(70) | Dis-M8 | A(69) | Dis-C8 | A(60) | Dis-Bk8 | A(89) |
| A-9 | B-1 | Dis-Y9 | A(67) | Dis-M9 | A(66) | Dis-C9 | A(60) | Dis-Bk9 | A(90) |
| A-10 | B-1 | Dis-Y10 | A(70) | Dis-M10 | A(76) | Dis-C10 | A(61) | Dis-Bk10 | A(105) |
| A-11 | B-1 | Dis-Y11 | A(71) | Dis-M11 | A(71) | Dis-C11 | A(61) | Dis-Bk11 | A(90) |
| A-12 | B-1 | Dis-Y12 | A(67) | Dis-M12 | A(73) | Dis-C12 | A(59) | Dis-Bk12 | A(92) |
| A-13 | B-1 | Dis-Y13 | A(69) | Dis-M13 | A(76) | Dis-C13 | A(60) | Dis-Bk13 | A(97) |
| A-14 | B-1 | Dis-Y14 | A(70) | Dis-M14 | A(75) | Dis-C14 | A(62) | Dis-Bk14 | A(106) |
| A-15 | B-1 | Dis-Y15 | A(72) | Dis-M15 | A(74) | Dis-C15 | A(61) | Dis-Bk15 | A(110) |
| A-16 | B-1 | Dis-Y16 | A(71) | Dis-M16 | A(72) | Dis-C16 | A(61) | Dis-Bk16 | A(112) |

TABLE 3-1-continued

Results of the evaluation of the pigment dispersions

| dispersing agent | | yellow | | magenta | | cyan | | black | |
| --- | --- | --- | --- | --- | --- | --- | --- | --- | --- |
| A | B | dispersion | gloss (gloss value) | dispersion | gloss (gloss value) | dispersion | gloss (gloss value) | dispersion | gloss (gloss value) |
| A-17 | B-1 | Dis-Y17 | A(69) | Dis-M17 | A(71) | Dis-C17 | A(59) | Dis-Bk17 | A(102) |
| A-18 | B-1 | Dis-Y18 | A(67) | Dis-M18 | A(75) | Dis-C18 | A(62) | Dis-Bk18 | A(107) |
| A-19 | B-1 | Dis-Y19 | A(70) | Dis-M19 | A(74) | Dis-C19 | A(60) | Dis-Bk19 | A(111) |
| A-20 | B-1 | Dis-Y20 | A(68) | Dis-M20 | A(72) | Dis-C20 | A(59) | Dis-Bk20 | A(99) |
| A-21 | B-1 | Dis-Y21 | A(70) | Dis-M21 | A(76) | Dis-C21 | A(60) | Dis-Bk21 | A(107) |
| A-22 | B-1 | Dis-Y22 | A(71) | Dis-M22 | A(77) | Dis-C22 | A(61) | Dis-Bk22 | A(109) |
| A-23 | B-1 | Dis-Y23 | A(69) | Dis-M23 | A(74) | Dis-C23 | A(60) | Dis-Bk23 | A(103) |
| A-24 | B-1 | Dis-Y24 | A(67) | Dis-M24 | A(73) | Dis-C24 | A(58) | Dis-Bk24 | A(102) |
| A-25 | B-1 | Dis-Y25 | A(68) | Dis-M25 | A(70) | Dis-C25 | A(58) | Dis-Bk25 | A(98) |
| A-26 | B-1 | Dis-Y26 | A(66) | Dis-M26 | A(73) | Dis-C26 | A(59) | Dis-Bk26 | A(97) |
| A-27 | B-1 | Dis-Y27 | A(69) | Dis-M27 | A(76) | Dis-C27 | A(58) | Dis-Bk27 | A(100) |
| A-28 | B-1 | Dis-Y28 | A(67) | Dis-M28 | A(70) | Dis-C28 | A(58) | Dis-Bk28 | A(96) |
| A-29 | B-1 | Dis-Y29 | A(68) | Dis-M29 | A(72) | Dis-C29 | A(59) | Dis-Bk29 | A(94) |
| A-30 | B-1 | Dis-Y30 | A(70) | Dis-M30 | A(73) | Dis-C30 | A(60) | Dis-Bk30 | A(105) |
| A-31 | B-1 | Dis-Y31 | A(71) | Dis-M31 | A(74) | Dis-C31 | A(62) | Dis-Bk31 | A(108) |
| A-32 | B-1 | Dis-Y32 | A(70) | Dis-M32 | A(72) | Dis-C32 | A(61) | Dis-Bk32 | A(106) |
| A-33 | B-1 | Dis-Y33 | A(67) | Dis-M33 | A(72) | Dis-C33 | A(58) | Dis-Bk33 | A(97) |
| A-34 | B-1 | Dis-Y34 | A(69) | Dis-M34 | A(73) | Dis-C34 | A(59) | Dis-Bk34 | A(100) |
| A-35 | B-1 | Dis-Y35 | A(69) | Dis-M35 | A(71) | Dis-C35 | A(59) | Dis-Bk35 | A(99) |
| A-36 | B-1 | Dis-Y36 | A(70) | Dis-M36 | A(76) | Dis-C36 | A(60) | Dis-Bk36 | A(106) |
| A-37 | B-1 | Dis-Y37 | A(67) | Dis-M37 | A(75) | Dis-C37 | A(58) | Dis-Bk37 | A(100) |
| A-38 | B-1 | Dis-Y38 | A(67) | Dis-M38 | A(73) | Dis-C38 | A(59) | Dis-Bk38 | A(97) |
| A-39 | B-1 | Dis-Y39 | A(67) | Dis-M39 | A(73) | Dis-C39 | A(58) | Dis-Bk39 | A(97) |
| A-40 | B-1 | Dis-Y40 | A(69) | Dis-M40 | A(78) | Dis-C40 | A(58) | Dis-Bk40 | A(103) |
| A-41 | B-1 | Dis-Y41 | A(68) | Dis-M41 | A(76) | Dis-C41 | A(58) | Dis-Bk41 | A(102) |
| A-42 | B-1 | Dis-Y42 | A(69) | Dis-M42 | A(74) | Dis-C42 | A(60) | Dis-Bk42 | A(85) |
| A-43 | B-1 | Dis-Y43 | A(70) | Dis-M43 | A(79) | Dis-C43 | A(61) | Dis-Bk43 | A(89) |
| A-44 | B-1 | Dis-Y44 | A(67) | Dis-M44 | A(68) | Dis-C44 | A(60) | Dis-Bk44 | A(100) |
| A-45 | B-1 | Dis-Y45 | A(69) | Dis-M45 | A(68) | Dis-C45 | A(59) | Dis-Bk45 | A(97) |
| A-46 | B-1 | Dis-Y46 | A(67) | Dis-M46 | A(68) | Dis-C46 | A(59) | Dis-Bk46 | A(97) |
| A-47 | B-1 | Dis-Y47 | A(68) | Dis-M47 | A(75) | Dis-C47 | A(58) | Dis-Bk47 | A(106) |
| A-48 | B-1 | Dis-Y48 | A(68) | Dis-M48 | A(69) | Dis-C48 | A(58) | Dis-Bk48 | A(84) |
| A-49 | B-1 | Dis-Y49 | A(70) | Dis-M49 | A(70) | Dis-C49 | A(60) | Dis-Bk49 | A(110) |
| A-50 | B-1 | Dis-Y50 | A(71) | Dis-M50 | A(76) | Dis-C50 | A(60) | Dis-Bk50 | A(112) |
| A-51 | B-1 | Dis-Y51 | A(70) | Dis-M51 | A(75) | Dis-C51 | A(61) | Dis-Bk51 | A(114) |
| A-52 | B-1 | Dis-Y52 | A(72) | Dis-M52 | A(75) | Dis-C52 | A(61) | Dis-Bk52 | A(112) |
| A-53 | B-1 | Dis-Y53 | A(70) | Dis-M53 | A(78) | Dis-C53 | A(59) | Dis-Bk53 | A(106) |
| A-54 | B-1 | Dis-Y54 | A(68) | Dis-M54 | A(77) | Dis-C54 | A(58) | Dis-Bk54 | A(102) |
| A-55 | B-1 | Dis-Y55 | A(70) | Dis-M55 | A(76) | Dis-C55 | A(60) | Dis-Bk55 | A(108) |
| A-56 | B-1 | Dis-Y56 | A(72) | Dis-M56 | A(74) | Dis-C56 | A(61) | Dis-Bk56 | A(110) |
| A-57 | B-1 | Dis-Y57 | A(71) | Dis-M57 | A(76) | Dis-C57 | A(61) | Dis-Bk57 | A(111) |
| A-58 | B-1 | Dis-Y58 | A(72) | Dis-M58 | A(80) | Dis-C58 | A(61) | Dis-Bk58 | A(109) |
| A-59 | B-1 | Dis-Y59 | A(69) | Dis-M59 | A(78) | Dis-C59 | A(60) | Dis-Bk59 | A(105) |
| A-60 | B-1 | Dis-Y60 | A(69) | Dis-M60 | A(79) | Dis-C60 | A(60) | Dis-Bk60 | A(113) |

TABLE 3-2

Results of the evaluation of the pigment dispersions

| dispersing agent | | yellow | | magenta | | cyan | | black | |
| --- | --- | --- | --- | --- | --- | --- | --- | --- | --- |
| A | B | dispersion | gloss (gloss value) | dispersion | gloss (gloss value) | dispersion | gloss (gloss value) | dispersion | gloss (gloss value) |
| A-61 | B-1 | Dis-Y61 | A(71) | Dis-M61 | A(78) | Dis-C61 | A(61) | Dis-Bk61 | A(100) |
| A-62 | B-1 | Dis-Y62 | A(70) | Dis-M62 | A(74) | Dis-C62 | A(60) | Dis-Bk62 | A(118) |
| A-63 | B-1 | Dis-Y63 | A(70) | Dis-M63 | A(79) | Dis-C63 | A(60) | Dis-Bk63 | A(115) |
| A-64 | B-1 | Dis-Y64 | A(72) | Dis-M64 | A(82) | Dis-C64 | A(62) | Dis-Bk64 | A(114) |
| A-65 | B-1 | Dis-Y65 | A(70) | Dis-M65 | A(67) | Dis-C65 | A(60) | Dis-Bk65 | A(111) |
| A-66 | B-1 | Dis-Y66 | A(71) | Dis-M66 | A(68) | Dis-C66 | A(63) | Dis-Bk66 | A(113) |
| A-67 | B-1 | Dis-Y67 | A(71) | Dis-M67 | A(69) | Dis-C67 | A(60) | Dis-Bk67 | A(112) |
| A-68 | B-1 | Dis-Y68 | A(70) | Dis-M68 | A(69) | Dis-C68 | A(61) | Dis-Bk68 | A(110) |
| A-69 | B-1 | Dis-Y69 | A(72) | Dis-M69 | A(79) | Dis-C69 | A(62) | Dis-Bk69 | A(108) |
| A-70 | B-1 | Dis-Y70 | A(70) | Dis-M70 | A(78) | Dis-C70 | A(60) | Dis-Bk70 | A(111) |
| A-71 | B-1 | Dis-Y71 | A(71) | Dis-M71 | A(78) | Dis-C71 | A(61) | Dis-Bk71 | A(113) |
| A-72 | B-1 | Dis-Y72 | A(71) | Dis-M72 | A(79) | Dis-C72 | A(61) | Dis-Bk72 | A(110) |
| A-73 | B-1 | Dis-Y73 | A(69) | Dis-M73 | A(74) | Dis-C73 | A(59) | Dis-Bk73 | A(106) |
| A-74 | B-1 | Dis-Y74 | A(70) | Dis-M74 | A(72) | Dis-C74 | A(60) | Dis-Bk74 | A(108) |

TABLE 3-2-continued

Results of the evaluation of the pigment dispersions

| dispersing agent | | yellow | | magenta | | cyan | | black | |
| --- | --- | --- | --- | --- | --- | --- | --- | --- | --- |
| A | B | dispersion | gloss (gloss value) | dispersion | gloss (gloss value) | dispersion | gloss (gloss value) | dispersion | gloss (gloss value) |
| A-52 | B-2 | Dis-Y75 | A(68) | Dis-M75 | A(81) | Dis-C75 | A(58) | Dis-Bk75 | A(109) |
| A-52 | B-3 | Dis-Y76 | A(69) | Dis-M76 | A(78) | Dis-C76 | A(59) | Dis-Bk76 | A(102) |
| A-52 | B-4 | Dis-Y77 | A(69) | Dis-M77 | A(79) | Dis-C77 | A(58) | Dis-Bk77 | A(92) |
| A-52 | B-5 | Dis-Y78 | A(67) | Dis-M78 | A(77) | Dis-C78 | A(60) | Dis-Bk78 | A(89) |
| A-52 | B-6 | Dis-Y79 | A(68) | Dis-M79 | A(78) | Dis-C79 | A(59) | Dis-Bk79 | A(90) |
| A-52 | B-7 | Dis-Y80 | A(69) | Dis-M80 | A(77) | Dis-C80 | A(59) | Dis-Bk80 | A(91) |
| A-52 | B-8 | Dis-Y81 | A(67) | Dis-M81 | A(76) | Dis-C81 | A(58) | Dis-Bk81 | A(96) |
| A-52 | B-9 | Dis-Y82 | A(68) | Dis-M82 | A(79) | Dis-C82 | A(59) | Dis-Bk82 | A(100) |
| A-52 | B-10 | Dis-Y83 | A(70) | Dis-M83 | A(79) | Dis-C83 | A(60) | Dis-Bk83 | A(106) |
| A-52 | B-11 | Dis-Y84 | A(70) | Dis-M84 | A(78) | Dis-C84 | A(60) | Dis-Bk84 | A(107) |
| A-52 | B-12 | Dis-Y85 | A(69) | Dis-M85 | A(72) | Dis-C85 | A(59) | Dis-Bk85 | A(110) |
| A-52 | B-13 | Dis-Y86 | A(68) | Dis-M86 | A(76) | Dis-C86 | A(58) | Dis-Bk86 | A(105) |
| A-52 | B-14 | Dis-Y87 | A(68) | Dis-M87 | A(78) | Dis-C87 | A(58) | Dis-Bk87 | A(102) |
| A-52 | B-15 | Dis-Y88 | A(67) | Dis-M88 | A(75) | Dis-C88 | A(59) | Dis-Bk88 | A(101) |
| A-52 | B-16 | Dis-Y89 | A(69) | Dis-M89 | A(79) | Dis-C89 | A(60) | Dis-Bk89 | A(98) |
| A-52 | B-17 | Dis-Y90 | A(73) | Dis-M90 | A(76) | Dis-C90 | A(62) | Dis-Bk90 | A(113) |
| A-52 | B-18 | Dis-Y91 | A(71) | Dis-M91 | A(77) | Dis-C91 | A(62) | Dis-Bk91 | A(112) |
| A-52 | B-19 | Dis-Y92 | A(68) | Dis-M92 | A(78) | Dis-C92 | A(58) | Dis-Bk92 | A(105) |
| A-52 | B-20 | Dis-Y93 | A(69) | Dis-M93 | A(79) | Dis-C93 | A(60) | Dis-Bk93 | A(103) |
| A-52 | B-21 | Dis-Y94 | A(72) | Dis-M94 | A(80) | Dis-C94 | A(61) | Dis-Bk94 | A(115) |
| A-52 | B-22 | Dis-Y95 | A(69) | Dis-M95 | A(79) | Dis-C95 | A(61) | Dis-Bk95 | A(107) |
| A-64 | B-17 | Dis-Y96 | A(76) | Dis-M96 | A(82) | Dis-C96 | A(68) | Dis-Bk96 | A(119) |
| A-64 | B-18 | Dis-Y97 | A(74) | Dis-M97 | A(80) | Dis-C97 | A(65) | Dis-Bk97 | A(117) |
| A-64 | B-21 | Dis-Y98 | A(73) | Dis-M98 | A(81) | Dis-C98 | A(64) | Dis-Bk98 | A(116) |
| A-52 | B-1 | Dis-Y99 | A(69) | Dis-M99 | A(78) | Dis-C99 | A(60) | Dis-Bk99 | A(101) |
| A-52 | B-1 | Dis-Y100 | A(66) | Dis-M100 | A(76) | Dis-C100 | A(60) | Dis-Bk100 | A(96) |
| A-52 | B-1 | Dis-Y101 | A(76) | Dis-M101 | A(82) | Dis-C101 | A(62) | Dis-Bk101 | A(114) |
| A-52 | B-1 | Dis-Y102 | A(67) | Dis-M102 | A(77) | Dis-C102 | A(61) | Dis-Bk102 | A(113) |
| A-52 | B-1 | Dis-Y103 | A(69) | Dis-M103 | A(78) | Dis-C103 | A(60) | Dis-Bk103 | A(104) |
| A-52 | B-1 | Dis-Y104 | A(75) | Dis-M104 | A(82) | Dis-C104 | A(63) | Dis-Bk104 | A(115) |
| A-52 | B-1 | Dis-Y105 | A(77) | Dis-M105 | A(80) | Dis-C105 | A(64) | Dis-Bk105 | A(113) |
| A-52 | B-1 | Dis-Y106 | A(72) | Dis-M106 | A(81) | Dis-C106 | A(64) | Dis-Bk106 | A(112) |
| A-52 | B-1 | Dis-Y107 | A(65) | Dis-M107 | A(75) | Dis-C107 | A(60) | Dis-Bk107 | A(97) |
| — | — | Dis-Y108 | (57) | Dis-M108 | (47) | Dis-C108 | (46) | Dis-Bk108 | (7) |
| — | — | Dis-Y109 | (60) | Dis-M109 | (30) | Dis-C109 | (63) | Dis-Bk109 | (12) |
| — | — | Dis-Y110 | (53) | Dis-M110 | (56) | Dis-C110 | (63) | Dis-Bk110 | (2) |
| A-52 | — | Dis-Y111 | C(60) | Dis-M111 | C(54) | Dis-C111 | C(60) | Dis-Bk111 | D(15) |
| — | B-1 | Dis-Y112 | D(58) | Dis-M112 | D(49) | Dis-C112 | D(58) | Dis-Bk112 | D(12) |
| — | B-1 | Dis-Y113 | D(59) | Dis-M113 | C(52) | Dis-C113 | D(59) | Dis-Bk113 | D(18) |
| A-52 | — | Dis-Y114 | C(63) | Dis-M114 | C(35) | Dis-C114 | C(63) | Dis-Bk114 | C(23) |
| — | B-1 | Dis-Y115 | D(61) | Dis-M115 | D(31) | Dis-C115 | D(61) | Dis-Bk115 | D(16) |
| — | B-1 | Dis-Y116 | D(62) | Dis-M116 | C(34) | Dis-C116 | D(62) | Dis-Bk116 | D(19) |
| A-52 | — | Dis-Y117 | D(55) | Dis-M117 | D(57) | Dis-C117 | D(55) | Dis-Bk117 | D(18) |
| — | B-1 | Dis-Y118 | D(54) | Dis-M118 | D(57) | Dis-C118 | D(54) | Dis-Bk118 | D(8) |
| — | B-1 | Dis-Y119 | D(54) | Dis-M119 | C(59) | Dis-C119 | D(54) | Dis-Bk119 | D(14) |
| comparative compound 1 | | Dis-Y120 | C(59) | Dis-M120 | C(56) | Dis-C120 | C(59) | Dis-Bk120 | D(17) |
| comparative compound 2 | | Dis-Y121 | C(59) | Dis-M121 | C(50) | Dis-C121 | C(59) | Dis-Bk121 | D(10) |
| comparative compound 3 | | Dis-Y122 | C(58) | Dis-M122 | D(49) | Dis-C122 | C(58) | Dis-Bk122 | D(13) |

Example 5-1

Yellow toners were produced by the suspension polymerization method using the procedure described in the following.

Yellow Toner Production Example 1

Preparation of the Aqueous Medium 710 parts of deionized water and 450 parts of a 0.1 mol/L aqueous Na$_3$PO$_4$ solution were added to a four-neck flask fitted with a T. K. Homomixer high-speed stirrer (PRIMIX Corporation). The rotation rate was brought to 12,000 rpm and heating to 60° C. was carried out. To this was gradually added 68 parts of a 1.0 mol/L aqueous CaCl$_2$ solution to prepare an aqueous medium that contained the microfine, sparingly water-soluble dispersion stabilizer Ca$_3$(PO$_4$)$_2$.

(Suspension Polymerization Step)

The composition indicated below was then heated to 60° C. and was dissolved and dispersed to uniformity at 5,000 rpm using a T. K. Homomixer high-speed stirrer.
yellow pigment dispersion (Dis-Y1): 132 parts
styrene monomer: 46 parts
n-butyl acrylate monomer: 34 parts
polar resin [saturated polyester resin (terephthalic acid-propylene oxide-modified bisphenol A, acid value=15, peak molecular weight=6,000)]: 10 parts
ester wax (maximum endothermic peak in DSC measurement=70° C., Mn=704): 25 parts
aluminum salicylate compound (Orient Chemical Industries Co., Ltd., product name: BONTRON E-108): 2 parts
divinylbenzene monomer: 0.1 parts
To this was added 10 parts of the polymerization initiator 2, 2'-azobis(2, 4-dimethylvaleronitrile) followed by introduction into the aqueous medium and granulation for 15 minutes while maintaining the rotation rate at 12,000 rpm. Subsequent to this, the stirrer was changed from the high-speed stirrer to a propeller stirring blade; the polymerization was continued for 5 hours at a liquid temperature of 60° C.; and the liquid temperature was then raised to 80° C. and the polymerization was continued for 8 hours. After the completion of the polymerization reaction, the residual monomer was distilled out under reduced pressure followed by cooling to 30° C. to obtain a finely divided polymer particle dispersion.

(The Washing•Dewatering Step)

The obtained finely divided polymer particle dispersion was transferred to a washing container; dilute hydrochloric acid was added while stirring; stirring was carried out for 2 hours at a pH of 1.5 to dissolve the compounds of calcium and phosphoric acid including the $Ca_3(PO_4)_2$; and solid/liquid separation was subsequently carried out on a filter to obtain finely divided polymer particles. These were introduced into water and stirred to reproduce a dispersion followed by solid/liquid separation on a filter. This redispersion of the finely divided polymer particles in water and solid/liquid separation were repeated until the compounds of calcium and phosphoric acid including the $Ca_3(PO_4)_2$ had been thoroughly eliminated. The finely divided polymer particles provided by the final solid/liquid separation were then thoroughly dried with a dryer to obtain a toner particle.

A yellow toner (Tnr-Y1) was obtained by dry mixing the following for 5 minutes with 100 parts of the obtained toner particle using a Henschel mixer (Nippon Coke & Engineering Co., Ltd.): 1.0 parts of a finely divided hydrophobic silica powder (number-average particle diameter of the primary particles=7 nm) that had been surface-treated with hexamethyldisilazane, 0.15 parts of a finely divided rutile titanium oxide powder (number-average particle diameter of the primary particles=45 nm), and 0.5 parts of a finely divided rutile titanium oxide powder (number-average particle diameter of the primary particles=200 nm).

Yellow Toner Production Example 2

Yellow toners of the present invention (Tnr-Y2 to Y107) were obtained in each case by carrying out the same procedures as in Yellow Toner Production Example 1, but changing the yellow pigment dispersion (Dis-Y1) to yellow pigment dispersions (Dis-Y2 to Y107).

Comparative Example 5-1

Reference yellow toners for providing the reference values in the evaluations and comparative yellow toners were produced by the following methods.

Reference Yellow Toner Production Example 1

Reference yellow toners (Tnr-Y108 to Y110) were obtained by carrying out the same procedures as in Yellow Toner Production Example 1, but changing (Dis-Y1) to (Dis-Y108 to Y110).

Comparative Yellow Toner Production Example 1

Comparative yellow toners (Tnr-Y111 to Y122) were obtained in each case by carrying out the same procedures as in Yellow Toner Production Example 1, but changing (Dis-Y1) to yellow pigment dispersions (Dis-Y111 to Y122).

Example 5-2

Magenta toners were produced by the suspension polymerization method using the procedure described in the following.

Magenta Toner Production Example 1

Magenta toners (Tnr-M1 to M107) were obtained in each case by carrying out the same procedures as in Yellow Toner Production Example 1, but changing the yellow pigment dispersion (Dis-Y1) to magenta pigment dispersions (Dis-M1 to M107).

Comparative Example 5-2

Reference magenta toners for providing reference values in the evaluations and comparative magenta toners were produced by the following methods.

Reference Magenta Toner Production Example 1

Reference magenta toners (Tnr-M108 to M110) were obtained in each case by carrying out the same procedures as in Magenta Toner Production Example 1, but changing the magenta pigment dispersion to magenta pigment dispersions (Dis-M108 to M110).

Comparative Magenta Toner Production Example 1

Comparative magenta toners (Tnr-M111 to M122) were obtained in each case by carrying out the same procedures as in Magenta Toner Production Example 1, but changing the magenta pigment dispersion to magenta pigment dispersions (Dis-M111 to M122).

Example 5-3

Cyan toners were produced by the suspension polymerization method using the procedure described in the following.

Cyan Toner Production Example 1

Cyan toners (Tnr-C1 to C107) were obtained in each case by carrying out the same procedures as in Yellow Toner Production Example 1, but changing the yellow pigment dispersion (Dis-Y1) to cyan pigment dispersions (Dis-C1 to C107).

Comparative Example 5-3

Reference cyan toners for providing reference values in the evaluations and comparative cyan toners were produced by the following methods.

Reference Cyan Toner Production Example 1

Reference cyan toners (Tnr-C108 to C110) were obtained in each case by carrying out the same procedures as in Cyan Toner Production Example 1, but changing the cyan pigment dispersion to cyan pigment dispersions (Dis-C108 to C110).

Comparative Cyan Toner Production Example 1

Comparative cyan toners (Tnr-C111 to C122) were obtained in each case by carrying out the same procedures as in Cyan Toner Production Example 1, but changing the cyan pigment dispersion to cyan pigment dispersions (Dis-C111 to C122).

Example 5-4

Black toners were produced by the suspension polymerization method using the procedure described in the following.

Black Toner Production Example 1

Black toners (Tnr-Bk1 to Bk107) were obtained in each case by carrying out the same procedures as in Yellow Toner Production Example 1, but changing the yellow pigment dispersion (Dis-Y1) to black pigment dispersions (Dis-Bk1 to Bk107).

Comparative Example 5-4

Reference black toners for providing reference values in the evaluations and comparative black toners were produced by the following methods.

Reference Black Toner Production Example 1

Reference black toners (Tnr-Bk108 to Bk110) were obtained in each case by carrying out the same procedures as in Black Toner Production Example 1, but changing the black pigment dispersion to black pigment dispersions (Dis-Bk108 to Bk110).

Comparative Black Toner Production Example 1

Comparative black toners (Tnr-Bk111 to Bk122) were obtained in each case by carrying out the same procedures as in Black Toner Production Example 1, but changing the black pigment dispersion to black pigment dispersions (Dis-Bk111 to Bk122).

Example 6-1

A yellow toner was produced by the suspension granulation method using the procedures described in the following.

Yellow Toner Production Example 3

Preparation of the Yellow Pigment Dispersion 180 parts of ethyl acetate, 12 parts of C. I. Pigment Yellow 155, 0.6 parts of azo skeleton structure-containing compound (A-1), 0.6 parts of acidic group structure-containing compound (B-1), and 130 parts of glass beads (diameter=1 mm) were mixed, dispersed for 3 hours with an attritor (Nippon Coke & Engineering Co., Ltd.), and filtered across a mesh to produce a yellow pigment dispersion.
(Mixing Step)
The following composition was dispersed for 24 hours using a ball mill to obtain 200 parts of a toner composition mixture.
  the aforementioned yellow pigment dispersion: 96.0 parts
  polar resin [saturated polyester resin (polycondensate of phthalic acid and propylene oxide-modified bisphenol A, $T_g$=75.9° C., $M_w$=11,000, $M_n$=4200, acid value=11)]: 85.0 parts
  hydrocarbon wax (Fischer-Tropsch wax, maximum endothermic peak by DSC measurement=80° C., $M_w$=750): 9.0 parts
  aluminum salicylate compound (product name: BONTRON E-108): 2 parts
  ethyl acetate (solvent): 10.0 parts (Dispersion and suspension step)

An aqueous medium was obtained by dispersing the following composition for 24 hours with a ball mill and dissolving the carboxymethyl cellulose.
  calcium carbonate (coated with an acrylic acid-type copolymer): 20.0 parts
  carboxymethyl cellulose (Cellogen BS-H, Dai-ichi Kogyo Seiyaku Co., Ltd.): 0.5 parts
  deionized water: 99.5 parts 1200 parts of this aqueous medium was introduced into a T. K. Homomixer high-speed stirrer; 1,000 parts of the aforementioned toner composition mixture was introduced while stirring with the rotating impeller at a peripheral velocity of 20 m/sec; and stirring was carried out for 1 minute while maintaining a constant 25° C. to obtain a suspension.
(Solvent Removal Step)
While stirring 2200 parts of this suspension at a peripheral velocity of 45 m/min with a full zone impeller (Kobelco Eco-Solutions Co., Ltd.) and holding the liquid temperature constant at 40° C., solvent removal was started by forced suction using a blower of the gas phase above the surface of the suspension. At 15 minutes after the start of solvent removal, 75 parts of aqueous ammonia diluted to 1% was added as an ionic substance. 25 parts of this aqueous ammonia was then added at 1 hour after the start of solvent removal. 25 parts of this aqueous ammonia was subsequently added at 2 hours after the start of solvent removal. A final addition of 25 parts of this aqueous ammonia was made at 3 hours after the start of solvent removal, for a total addition of 150 parts. Additional holding to 17 hours after the start of solvent removal while continuing to maintain the liquid temperature at 40° C. provided a toner dispersion in which the solvent (ethyl acetate) had been removed from the suspended particles.
(Washing•Dewatering Step)
80 parts 10 mol/L hydrochloric acid was added to 300 parts of the toner dispersion obtained in the solvent removal step; neutralization was additionally carried out using a 0.1 mol/L aqueous sodium hydroxide solution; and washing with deionized water was performed 4 times by suction filtration to obtain a toner cake. The obtained toner cake was dried in a vacuum dryer and sieved across a sieve with an aperture of 45 μm to obtain a toner particle. The same procedure as in Yellow Toner Production Example 1 was carried out for the procedure subsequent to this to obtain a yellow toner (Tnr-Y123) of the present invention.

Comparative Example 6-1

A reference yellow toner for providing reference values in the evaluations was prepared by the following methods.

Reference Yellow Toner Production Example 2

A reference yellow toner (Tnr-Y223) was obtained by carrying out the same procedures as in Yellow Toner Production Example 3, but omitting the addition of compounds (A-1) and (B-1).

Example 6-2

A magenta toner was produced by the suspension granulation method using the procedures described in the following.

Magenta Toner Production Example 2

A magenta toner (Tnr-M123) of the present invention was obtained by carrying out the same procedures as in Yellow Toner Production Example 3, but changing the C. I. Pigment Yellow 155 (yellow pigment a) to the C. I. Pigment Red 122 given by formula (Pig-D).

Comparative Example 6-2

A reference magenta toner for providing reference values in the evaluations was prepared by the following methods.

Reference Magenta Toner Production Example 2

A reference magenta toner (Tnr-M223) was obtained by carrying out the same procedures as in Magenta Toner Production Example 2, but omitting the addition of compounds (A-1) and (B-1).

Example 6-3

A cyan toner was produced by the suspension granulation method using the procedures described in the following.

Cyan Toner Production Example 2

A cyan toner (Tnr-C123) of the present invention was obtained by carrying out the same procedures as in Yellow Toner Production Example 3, but changing the C. I. Pigment Yellow 155 (yellow pigment a) to C. I. Pigment Blue 15:3.

Comparative Example 6-3

A reference cyan toner for providing reference values in the evaluations was prepared by the following methods.

Reference Cyan Toner Production Example 2

A reference cyan toner (Tnr-C223) was obtained by carrying out the same procedures as in Cyan Toner Production Example 2, but omitting the addition of compounds (A-1) and (B-1).

Example 6-4

A black toner was produced by the suspension granulation method using the procedures described in the following.

Black Toner Production Example 2

A black toner (Tnr-Bk123) of the present invention was obtained by carrying out the same procedures as in Yellow Toner Production Example 3, but changing the 12 parts of C. I. Pigment Yellow 155, 0.6 parts of azo skeleton structure-containing compound (A-1), and 0.6 parts of acidic group structure-containing compound (B-1) to 30 parts of a carbon black (specific surface area=65 m$^2$/g, average particle diameter=30 nm, pH=9.0), 1.5 parts of the azo skeleton structure-containing compound (A-1), and 1.5 parts of the acidic group structure-containing compound (B-1).

Comparative Example 6-4

A reference black toner for providing reference values in the evaluations was prepared by the following methods.

Reference Black Toner Production Example 2

A reference black toner (Tnr-Bk223) was obtained by carrying out the same procedures as in Black Toner Production Example 2, but omitting the addition of compounds (A-1) and (B-1).

Example 7

The yellow toners, magenta toners, cyan toners, and black toners obtained in Examples 5-1 to 5-4 and 6-1 to 6-4 were evaluated using the following method.

<Evaluation of the Toner Tinting Strength>

Image samples were output using the obtained toners and the characteristics of the images were compared and evaluated. For the comparison of the image characteristics, a modified LBP-5300 (Canon, Inc.) (also referred to below as LBP) was used as the image-forming apparatus. The modification comprised changing the developing blade within the process cartridge (also referred to below as CRG) to an SUS blade with a thickness of 8 µm. In addition to this, it was arranged that a blade bias of −200 (V) could be applied with respect to the developing bias applied to the developing roller, which was the toner-carrying member.

A solid image was formed at a toner laid-on level of 0.5 mg/cm$^2$ on the transfer paper (75 g/m$^2$) while operating in a normal-temperature, normal-humidity environment [N/N (23.5° C., 60% RH)]. The density of this solid image was measured using a Spectrolino reflection densitometer (GretagMacBeth). The tinting strength of the toner was evaluated as the percentage increase in the density of the solid image.

The percentage increase in the solid image density for toners (Tnr-Y1 to Y105, M1 to M105, C1 to C105, and Bk1 to Bk105) was calculated using the solid image density for the respective reference toner (Tnr-Y108, M108, C108, and Bk108) as the reference value. The percentage increase for the solid image density for toners (Tnr-Y106, M106, C106, and Bk106) was calculated using the solid image density for the respective reference toner (Tnr-Y109, M109, C109, and Bk109) as the reference value. The percentage increase in the solid image density for toners (Tnr-Y107, M107, C107, and Bk107) was calculated using the solid image density for the respective reference toner (Tnr-Y110, M110, C110, and Bk110) as the reference value. The percentage increase in the solid image density for toners (Tnr-Y123, M123, C123, and Bk123) was calculated using the solid image density for the corresponding reference toner (Tnr-Y223, M223, C223, and Bk223) as the reference value.

The criteria for each color for evaluating the percentage increase in the solid image density are given below.

Criteria for evaluating the percentage increase in the solid image density for the yellow toners A: the percentage increase in the solid image density was at least 5%

B: the percentage increase in the solid image density was at least 1% and less than 5%

C: the percentage increase in the solid image density was equal to or greater than 0% and less than 1%

D: the solid image density declined

The tinting strength was rated as excellent when the percentage increase in the solid image density was greater than or equal to 1%.

Criteria for evaluating the percentage increase in the solid image density for the magenta toners A: the percentage increase in the solid image density was at least 20%
B: the percentage increase in the solid image density was at least 10% and less than 20%
C: the percentage increase in the solid image density was at least 5% and less than 10%
D: the percentage increase in the solid image density was less than 5%

The tinting strength was rated as excellent when the percentage increase in the solid image density was greater than or equal to 10%.

Criteria for evaluating the percentage increase in the solid image density for the cyan toners A: the percentage increase in the solid image density was at least 30%
B: the percentage increase in the solid image density was at least 20% and less than 30%
C: the percentage increase in the solid image density was at least 10% and less than 20%
D: the percentage increase in the solid image density was less than 10%

The tinting strength was rated as excellent when the percentage increase in the solid image density was greater than or equal to 20%.

Criteria for evaluating the percentage increase in the solid image density for the black toners A: the percentage increase in the solid image density was at least 60%
B: the percentage increase in the solid image density was at least 40% and less than 60%
C: the percentage increase in the solid image density was at least 20% and less than 40%
D: the percentage increase in the solid image density was less than 20%

The tinting strength was rated as excellent when the percentage increase in the solid image density was greater than or equal to 40%.

Comparative Example 7

The tinting strength of the comparative toners was evaluated by the same method as in Example 7.

The percentage increase in the solid image density for comparative toners (Tnr-Y111 to Y113 and Y120 to Y122), (Tnr-M111 to M113 and M120 to M122), (Tnr-C111 to C113 and C120 to C122), and (Tnr-Bk111 to Bk113 and Bk120 to Bk122) was calculated using the solid image density for the respective reference toner (Tnr-Y108, M108, C108, and Bk108) as the reference value.

The percentage increase in the solid image density for comparative toners (Tnr-Y114 to Y116, M114 to M116, C114 to C116, and Bk114 to Bk116) was calculated using the solid image density for the respective reference toner (Tnr-Y109, M109, C109, and Bk109) as the reference value.

The percentage increase in the solid image density for comparative toners (Tnr-Y117 to Y119, M117 to M119, C117 to C119, and Bk117 to Bk119) was calculated using the solid image density for the respective reference toner (Tnr-Y110, M110, C110, and Bk110) as the reference value.

The results of the evaluation of the toner tinting strength for the individual colors are shown in Tables 4-1 and 4-2. The dispersing agents A and B in the table indicate, respectively, the azo skeleton structure-containing compounds A and the acidic group structure-containing compounds B used in the individual toners.

TABLE 4-1

Evaluation results for suspension polymerization toners

| dispersing agent | | yellow | | magenta | | cyan | | black | |
|---|---|---|---|---|---|---|---|---|---|
| A | B | toner | tinting strength | toner | tinting strength | toner | tinting strength | toner | tinting strength |
| A-1 | B-1 | Tnr-Y1 | A | Tnr-M1 | A | Tnr-C1 | A | Tnr-Bk1 | A |
| A-2 | B-1 | Tnr-Y2 | A | Tnr-M2 | A | Tnr-C2 | A | Tnr-Bk2 | A |
| A-3 | B-1 | Tnr-Y3 | A | Tnr-M3 | A | Tnr-C3 | A | Tnr-Bk3 | A |
| A-4 | B-1 | Tnr-Y4 | A | Tnr-M4 | A | Tnr-C4 | A | Tnr-Bk4 | A |
| A-5 | B-1 | Tnr-Y5 | A | Tnr-M5 | A | Tnr-C5 | A | Tnr-Bk5 | A |
| A-6 | B-1 | Tnr-Y6 | A | Tnr-M6 | A | Tnr-C6 | A | Tnr-Bk6 | A |
| A-7 | B-1 | Tnr-Y7 | A | Tnr-M7 | A | Tnr-C7 | A | Tnr-Bk7 | A |
| A-8 | B-1 | Tnr-Y8 | A | Tnr-M8 | A | Tnr-C8 | A | Tnr-Bk8 | A |
| A-9 | B-1 | Tnr-Y9 | A | Tnr-M9 | A | Tnr-C9 | A | Tnr-Bk9 | A |
| A-10 | B-1 | Tnr-Y10 | A | Tnr-M10 | A | Tnr-C10 | A | Tnr-Bk10 | A |
| A-11 | B-1 | Tnr-Y11 | A | Tnr-M11 | A | Tnr-C11 | A | Tnr-Bk11 | A |
| A-12 | B-1 | Tnr-Y12 | A | Tnr-M12 | A | Tnr-C12 | A | Tnr-Bk12 | A |
| A-13 | B-1 | Tnr-Y13 | A | Tnr-M13 | A | Tnr-C13 | A | Tnr-Bk13 | A |
| A-14 | B-1 | Tnr-Y14 | A | Tnr-M14 | A | Tnr-C14 | A | Tnr-Bk14 | A |
| A-15 | B-1 | Tnr-Y15 | A | Tnr-M15 | A | Tnr-C15 | A | Tnr-Bk15 | A |
| A-16 | B-1 | Tnr-Y16 | A | Tnr-M16 | A | Tnr-C16 | A | Tnr-Bk16 | A |
| A-17 | B-1 | Tnr-Y17 | A | Tnr-M17 | A | Tnr-C17 | A | Tnr-Bk17 | A |
| A-18 | B-1 | Tnr-Y18 | A | Tnr-M18 | A | Tnr-C18 | A | Tnr-Bk18 | A |
| A-19 | B-1 | Tnr-Y19 | A | Tnr-M19 | A | Tnr-C19 | A | Tnr-Bk19 | A |
| A-20 | B-1 | Tnr-Y20 | A | Tnr-M20 | A | Tnr-C20 | A | Tnr-Bk20 | A |
| A-21 | B-1 | Tnr-Y21 | A | Tnr-M21 | A | Tnr-C21 | A | Tnr-Bk21 | A |
| A-22 | B-1 | Tnr-Y22 | A | Tnr-M22 | A | Tnr-C22 | A | Tnr-Bk22 | A |
| A-23 | B-1 | Tnr-Y23 | A | Tnr-M23 | A | Tnr-C23 | A | Tnr-Bk23 | A |
| A-24 | B-1 | Tnr-Y24 | A | Tnr-M24 | A | Tnr-C24 | A | Tnr-Bk24 | A |
| A-25 | B-1 | Tnr-Y25 | A | Tnr-M25 | A | Tnr-C25 | A | Tnr-Bk25 | A |
| A-26 | B-1 | Tnr-Y26 | A | Tnr-M26 | A | Tnr-C26 | A | Tnr-Bk26 | A |
| A-27 | B-1 | Tnr-Y27 | A | Tnr-M27 | A | Tnr-C27 | A | Tnr-Bk27 | A |

TABLE 4-1-continued

Evaluation results for suspension polymerization toners

| dispersing agent | | yellow | | magenta | | cyan | | black | |
| --- | --- | --- | --- | --- | --- | --- | --- | --- | --- |
| A | B | toner | tinting strength | toner | tinting strength | toner | tinting strength | toner | tinting strength |
| A-28 | B-1 | Tnr-Y28 | A | Tnr-M28 | A | Tnr-C28 | A | Tnr-Bk28 | A |
| A-29 | B-1 | Tnr-Y29 | A | Tnr-M29 | A | Tnr-C29 | A | Tnr-Bk29 | A |
| A-30 | B-1 | Tnr-Y30 | A | Tnr-M30 | A | Tnr-C30 | A | Tnr-Bk30 | A |
| A-31 | B-1 | Tnr-Y31 | A | Tnr-M31 | A | Tnr-C31 | A | Tnr-Bk31 | A |
| A-32 | B-1 | Tnr-Y32 | A | Tnr-M32 | A | Tnr-C32 | A | Tnr-Bk32 | A |
| A-33 | B-1 | Tnr-Y33 | A | Tnr-M33 | A | Tnr-C33 | A | Tnr-Bk33 | A |
| A-34 | B-1 | Tnr-Y34 | A | Tnr-M34 | A | Tnr-C34 | A | Tnr-Bk34 | A |
| A-35 | B-1 | Tnr-Y35 | A | Tnr-M35 | A | Tnr-C35 | A | Tnr-Bk35 | A |
| A-36 | B-1 | Tnr-Y36 | A | Tnr-M36 | A | Tnr-C36 | A | Tnr-Bk36 | A |
| A-37 | B-1 | Tnr-Y37 | A | Tnr-M37 | A | Tnr-C37 | A | Tnr-Bk37 | A |
| A-38 | B-1 | Tnr-Y38 | A | Tnr-M38 | A | Tnr-C38 | A | Tnr-Bk38 | A |
| A-39 | B-1 | Tnr-Y39 | A | Tnr-M39 | A | Tnr-C39 | A | Tnr-Bk39 | A |
| A-40 | B-1 | Tnr-Y40 | A | Tnr-M40 | A | Tnr-C40 | A | Tnr-Bk40 | A |
| A-41 | B-1 | Tnr-Y41 | A | Tnr-M41 | A | Tnr-C41 | A | Tnr-Bk41 | A |
| A-42 | B-1 | Tnr-Y42 | A | Tnr-M42 | A | Tnr-C42 | A | Tnr-Bk42 | A |
| A-43 | B-1 | Tnr-Y43 | A | Tnr-M43 | A | Tnr-C43 | A | Tnr-Bk43 | A |
| A-44 | B-1 | Tnr-Y44 | A | Tnr-M44 | A | Tnr-C44 | A | Tnr-Bk44 | A |
| A-45 | B-1 | Tnr-Y45 | A | Tnr-M45 | A | Tnr-C45 | A | Tnr-Bk45 | A |
| A-46 | B-1 | Tnr-Y46 | A | Tnr-M46 | A | Tnr-C46 | A | Tnr-Bk46 | A |
| A-47 | B-1 | Tnr-Y47 | A | Tnr-M47 | A | Tnr-C47 | A | Tnr-Bk47 | A |
| A-48 | B-1 | Tnr-Y48 | A | Tnr-M48 | A | Tnr-C48 | A | Tnr-Bk48 | A |
| A-49 | B-1 | Tnr-Y49 | A | Tnr-M49 | A | Tnr-C49 | A | Tnr-Bk49 | A |
| A-50 | B-1 | Tnr-Y50 | A | Tnr-M50 | A | Tnr-C50 | A | Tnr-Bk50 | A |
| A-51 | B-1 | Tnr-Y51 | A | Tnr-M51 | A | Tnr-C51 | A | Tnr-Bk51 | A |
| A-52 | B-1 | Tnr-Y52 | A | Tnr-M52 | A | Tnr-C52 | A | Tnr-Bk52 | A |
| A-53 | B-1 | Tnr-Y53 | A | Tnr-M53 | A | Tnr-C53 | A | Tnr-Bk53 | A |
| A-54 | B-1 | Tnr-Y54 | A | Tnr-M54 | A | Tnr-C54 | A | Tnr-Bk54 | A |
| A-55 | B-1 | Tnr-Y55 | A | Tnr-M55 | A | Tnr-C55 | A | Tnr-Bk55 | A |
| A-56 | B-1 | Tnr-Y56 | A | Tnr-M56 | A | Tnr-C56 | A | Tnr-Bk56 | A |
| A-57 | B-1 | Tnr-Y57 | A | Tnr-M57 | A | Tnr-C57 | A | Tnr-Bk57 | A |
| A-58 | B-1 | Tnr-Y58 | A | Tnr-M58 | A | Tnr-C58 | A | Tnr-Bk58 | A |
| A-59 | B-1 | Tnr-Y59 | A | Tnr-M59 | A | Tnr-C59 | A | Tnr-Bk59 | A |
| A-60 | B-1 | Tnr-Y60 | A | Tnr-M60 | A | Tnr-C60 | A | Tnr-Bk60 | A |

TABLE 4-2

Evaluation results for toners

| dispersing agent | | yellow | | magenta | | cyan | | black | |
| --- | --- | --- | --- | --- | --- | --- | --- | --- | --- |
| A | B | toner | tinting strength | toner | tinting strength | toner | tinting strength | toner | tinting strength |
| A-61 | B-1 | Tnr-Y61 | A | Tnr-M61 | A | Tnr-C61 | A | Tnr-Bk61 | A |
| A-62 | B-1 | Tnr-Y62 | A | Tnr-M62 | A | Tnr-C62 | A | Tnr-Bk62 | A |
| A-63 | B-1 | Tnr-Y63 | A | Tnr-M63 | A | Tnr-C63 | A | Tnr-Bk63 | A |
| A-64 | B-1 | Tnr-Y64 | A | Tnr-M64 | A | Tnr-C64 | A | Tnr-Bk64 | A |
| A-65 | B-1 | Tnr-Y65 | A | Tnr-M65 | A | Tnr-C65 | A | Tnr-Bk65 | A |
| A-66 | B-1 | Tnr-Y66 | A | Tnr-M66 | A | Tnr-C66 | A | Tnr-Bk66 | A |
| A-67 | B-1 | Tnr-Y67 | A | Tnr-M67 | A | Tnr-C67 | A | Tnr-Bk67 | A |
| A-68 | B-1 | Tnr-Y68 | A | Tnr-M68 | A | Tnr-C68 | A | Tnr-Bk68 | A |
| A-69 | B-1 | Tnr-Y69 | A | Tnr-M69 | A | Tnr-C69 | A | Tnr-Bk69 | A |
| A-70 | B-1 | Tnr-Y70 | A | Tnr-M70 | A | Tnr-C70 | A | Tnr-Bk70 | A |
| A-71 | B-1 | Tnr-Y71 | A | Tnr-M71 | A | Tnr-C71 | A | Tnr-Bk71 | A |
| A-72 | B-1 | Tnr-Y72 | A | Tnr-M72 | A | Tnr-C72 | A | Tnr-Bk72 | A |
| A-73 | B-1 | Tnr-Y73 | A | Tnr-M73 | A | Tnr-C73 | A | Tnr-Bk73 | A |
| A-74 | B-1 | Tnr-Y74 | A | Tnr-M74 | A | Tnr-C74 | A | Tnr-Bk74 | A |
| A-52 | B-2 | Tnr-Y75 | A | Tnr-M75 | A | Tnr-C75 | A | Tnr-Bk75 | A |
| A-52 | B-3 | Tnr-Y76 | A | Tnr-M76 | A | Tnr-C76 | A | Tnr-Bk76 | A |
| A-52 | B-4 | Tnr-Y77 | A | Tnr-M77 | A | Tnr-C77 | A | Tnr-Bk77 | A |
| A-52 | B-5 | Tnr-Y78 | A | Tnr-M78 | A | Tnr-C78 | A | Tnr-Bk78 | A |
| A-52 | B-6 | Tnr-Y79 | A | Tnr-M79 | A | Tnr-C79 | A | Tnr-Bk79 | A |
| A-52 | B-7 | Tnr-Y80 | A | Tnr-M80 | A | Tnr-C80 | A | Tnr-Bk80 | A |
| A-52 | B-8 | Tnr-Y81 | A | Tnr-M81 | A | Tnr-C81 | A | Tnr-Bk81 | A |
| A-52 | B-9 | Tnr-Y82 | A | Tnr-M82 | A | Tnr-C82 | A | Tnr-Bk82 | A |
| A-52 | B-10 | Tnr-Y83 | A | Tnr-M83 | A | Tnr-C83 | A | Tnr-Bk83 | A |
| A-52 | B-11 | Tnr-Y84 | A | Tnr-M84 | A | Tnr-C84 | A | Tnr-Bk84 | A |
| A-52 | B-12 | Tnr-Y85 | A | Tnr-M85 | A | Tnr-C85 | A | Tnr-Bk85 | A |

TABLE 4-2-continued

Evaluation results for toners

| dispersing agent | | yellow | | magenta | | cyan | | black | |
| --- | --- | --- | --- | --- | --- | --- | --- | --- | --- |
| A | B | toner | tinting strength | toner | tinting strength | toner | tinting strength | toner | tinting strength |
| A-52 | B-13 | Tnr-Y86 | A | Tnr-M86 | A | Tnr-C86 | A | Tnr-Bk86 | A |
| A-52 | B-14 | Tnr-Y87 | A | Tnr-M87 | A | Tnr-C87 | A | Tnr-Bk87 | A |
| A-52 | B-15 | Tnr-Y88 | A | Tnr-M88 | A | Tnr-C88 | A | Tnr-Bk88 | A |
| A-52 | B-16 | Tnr-Y89 | A | Tnr-M89 | A | Tnr-C89 | A | Tnr-Bk89 | A |
| A-52 | B-17 | Tnr-Y90 | A | Tnr-M90 | A | Tnr-C90 | A | Tnr-Bk90 | A |
| A-52 | B-18 | Tnr-Y91 | A | Tnr-M91 | A | Tnr-C91 | A | Tnr-Bk91 | A |
| A-52 | B-19 | Tnr-Y92 | A | Tnr-M92 | A | Tnr-C92 | A | Tnr-Bk92 | A |
| A-52 | B-20 | Tnr-Y93 | A | Tnr-M93 | A | Tnr-C93 | A | Tnr-Bk93 | A |
| A-52 | B-21 | Tnr-Y94 | A | Tnr-M94 | A | Tnr-C94 | A | Tnr-Bk94 | A |
| A-52 | B-22 | Tnr-Y95 | A | Tnr-M95 | A | Tnr-C95 | A | Tnr-Bk95 | A |
| A-64 | B-17 | Tnr-Y96 | A | Tnr-M96 | A | Tnr-C96 | A | Tnr-Bk96 | A |
| A-64 | B-18 | Tnr-Y97 | A | Tnr-M97 | A | Tnr-C97 | A | Tnr-Bk97 | A |
| A-64 | B-21 | Tnr-Y98 | A | Tnr-M98 | A | Tnr-C98 | A | Tnr-Bk98 | A |
| A-52 | B-1 | Tnr-Y99 | A | Tnr-M99 | A | Tnr-C99 | A | Tnr-Bk99 | A |
| A-52 | B-1 | Tnr-Y100 | A | Tnr-M100 | A | Tnr-C100 | A | Tnr-Bk100 | A |
| A-52 | B-1 | Tnr-Y101 | A | Tnr-M101 | A | Tnr-C101 | A | Tnr-Bk101 | A |
| A-52 | B-1 | Tnr-Y102 | A | Tnr-M102 | A | Tnr-C102 | A | Tnr-Bk102 | A |
| A-52 | B-1 | Tnr-Y103 | A | Tnr-M103 | A | Tnr-C103 | A | Tnr-Bk103 | A |
| A-52 | B-1 | Tnr-Y104 | A | Tnr-M104 | A | Tnr-C104 | A | Tnr-Bk104 | A |
| A-52 | B-1 | Tnr-Y105 | A | Tnr-M105 | A | Tnr-C105 | A | Tnr-Bk105 | A |
| A-52 | B-1 | Tnr-Y106 | A | Tnr-M106 | A | Tnr-C106 | A | Tnr-Bk106 | A |
| A-52 | B-1 | Tnr-Y107 | A | Tnr-M107 | A | Tnr-C107 | A | Tnr-Bk107 | A |
| — | — | Tnr-Y108 | — | Tnr-M108 | — | Tnr-C108 | — | Tnr-Bk108 | — |
| — | — | Tnr-Y109 | — | Tnr-M109 | — | Tnr-C109 | — | Tnr-Bk109 | — |
| — | — | Tnr-Y110 | — | Tnr-M110 | — | Tnr-C110 | — | Tnr-Bk110 | — |
| A-52 | — | Tnr-Y111 | C | Tnr-M111 | C | Tnr-C111 | D | Tnr-Bk111 | B |
| — | B-1 | Tnr-Y112 | D | Tnr-M112 | D | Tnr-C112 | D | Tnr-Bk112 | D |
| — | B-1 | Tnr-Y113 | C | Tnr-M113 | D | Tnr-C113 | C | Tnr-Bk113 | D |
| A-52 | — | Tnr-Y114 | C | Tnr-M114 | C | Tnr-C114 | D | Tnr-Bk114 | C |
| — | B-1 | Tnr-Y115 | D | Tnr-M115 | D | Tnr-C115 | D | Tnr-Bk115 | D |
| — | B-1 | Tnr-Y116 | C | Tnr-M116 | D | Tnr-C116 | C | Tnr-Bk116 | D |
| A-52 | — | Tnr-Y117 | C | Tnr-M117 | C | Tnr-C117 | D | Tnr-Bk117 | C |
| — | B-1 | Tnr-Y118 | D | Tnr-M118 | D | Tnr-C118 | D | Tnr-Bk118 | D |
| — | B-1 | Tnr-Y119 | C | Tnr-M119 | D | Tnr-C119 | C | Tnr-Bk119 | D |
| comparative compound 1 | | Tnr-Y120 | D | Tnr-M120 | C | Tnr-C120 | D | Tnr-Bk120 | D |
| comparative compound 2 | | Tnr-Y121 | D | Tnr-M121 | D | Tnr-C121 | D | Tnr-Bk121 | D |
| comparative compound 3 | | Tnr-Y122 | D | Tnr-M122 | D | Tnr-C122 | D | Tnr-Bk122 | D |
| A-1 | B-1 | Tnr-Y123 | A | Tnr-M123 | A | Tnr-C123 | A | Tnr-Bk123 | A |
| — | — | Tnr-Y223 | — | Tnr-M223 | — | Tnr-C223 | — | Tnr-Bk223 | — |

The pigment dispersion of the present invention has an excellent tinting strength and is thus useful for offset inks, gravure inks, paints and coatings, inkjet inks, inks for color filters, and so forth. In addition, the toner of the present invention can be used not only for electrophotography, but also for the toner displays used in electronic paper and as toner for forming circuit patterns via digital printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-031590, filed Feb. 20, 2015, which is hereby incorporated by reference herein in its entirety.

What is claimed is:

1. A pigment dispersion comprising:
a pigment;
a non-water-soluble solvent;
a compound having:
a partial structure represented by formula (1) and
a polymer having a monomer unit represented by formula (2); and
a polymer compound having a monomer unit comprising at least one structure selected from the group consisting of partial structures represented by formulas (3) and (4)

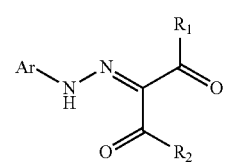

formula (1)

[in formula (1), $R_1$ and $R_2$ each independently represent a substituted or unsubstituted alkyl group, a substituted or unsubstituted phenyl group, an $OR_5$ group, or an $NR_6R_7$ group;

$R_5$ to $R_7$ each independently represent a hydrogen atom, a substituted or unsubstituted alkyl group, a substituted or unsubstituted phenyl group, or an aralkyl group; and Ar represents a substituted or unsubstituted aryl group;

wherein at least one of $R_1$, $R_2$, and Ar has a substituent that has a site bonded to the polymer]

formula (2)

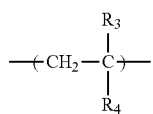

[in formula (2), $R_3$ represents a hydrogen atom or an alkyl group and $R_4$ represents a substituted or unsubstituted phenyl group, a carboxy group, a substituted or unsubstituted alkoxycarbonyl group, or a substituted or unsubstituted carboxamide group]

formula (3)

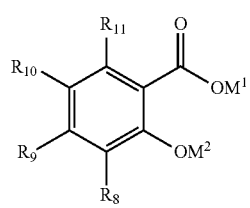

[in formula (3), $R_8$ to $R_{11}$ each independently represent a hydrogen atom, a halogen atom, a hydroxyl group, a carboxy group, a sulfo group, a $C_{1-18}$ alkyl group, a $C_{1-18}$ alkoxy group, or an organic group as required to form a ring with an adjacent position, wherein at least one of $R_8$ to $R_{11}$ has a substituent that has a site bonded to a main chain or a side chain in the polymer compound, and $M^1$ and $M^2$ each independently represent a hydrogen atom, a metal atom, or $NH_4$]

formula (4)

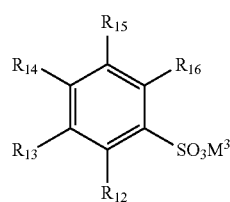

[in formula (4), $R_{12}$ to $R_{16}$ each independently represent a hydrogen atom, a halogen atom, a hydroxyl group, an alkyl group, or an alkoxy group, wherein at least one of $R_{12}$ to $R_{16}$ has a substituent that has a site bonded to a main chain or a side chain in the polymer compound, and $M^3$ represents a hydrogen atom, a metal atom, or $NH_4$].

2. The pigment dispersion according to claim 1, wherein an azo skeleton structure represented by formula (1) is represented by formula (5)

formula (5)

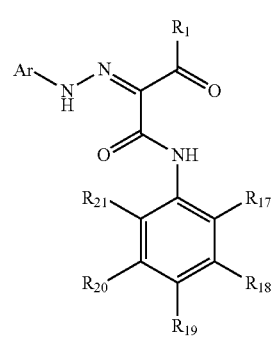

[in formula (5), $R_1$ represents a substituted or unsubstituted alkyl group, a substituted or unsubstituted phenyl group, an $OR_5$ group, or an $NR_6R_7$ group;
Ar represents a substituted or unsubstituted aryl group;
$R_5$ to $R_7$ each independently represent a hydrogen atom, a substituted or unsubstituted alkyl group, a substituted or unsubstituted phenyl group, or an aralkyl group;
$R_{17}$ to $R_{21}$ each independently represent a hydrogen atom, a halogen atom, an alkyl group, an alkoxy group, a hydroxyl group, a carboxy group, a $COOR_{22}$ group, or a $CONR_{23}R_{24}$ group, $SO_2NR_{25}R_{26}$, a group represented by formula (6-1), a group represented by formula (6-2), or a substituent having a site bonded to the polymer having a monomer unit with formula (2); and
$R_{22}$ to $R_{26}$ each independently represent a hydrogen atom, an alkyl group, a phenyl group, or an aralkyl group;
wherein at least one of Ar, $R_1$, and $R_{17}$ to $R_{21}$ has a substituent that has a site bonded to the polymer]

(6-1)

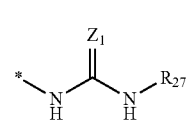

(6-2)

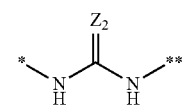

[in formula (6-1), $R_{27}$ represents a hydrogen atom, a substituted or unsubstituted alkyl group, an aralkyl group, a substituted or unsubstituted alkyloxycarbonyl group, or a substituted or unsubstituted aralkyloxycarbonyl group;
$Z_1$ represents an oxygen atom, a sulfur atom, or an $NR_{28}$ group;
$R_{28}$ is a hydrogen atom, a substituted or unsubstituted alkyl group, a substituted or unsubstituted alkyloxycarbonyl group, or a substituted or unsubstituted aralkyloxycarbonyl group; and
"*" represents a site bonded to an $R_{17}$-to-$R_{21}$-bearing aromatic ring of formula (5);
in formula (6-2), the "*" and "**" represent a site bonded to the $R_{17}$-to-$R_{21}$-bearing aromatic ring of formula (5);
the group represented by formula (6-2) forms a 5-membered heterocycle through bonding to the $R_{17}$-to-$R_{21}$-bearing aromatic ring in formula (5); and
$Z_2$ represents an oxygen atom, a sulfur atom, or an $NR_{28}$ group].

3. The pigment dispersion according to claim 2, wherein the azo skeleton structure represented by formula (1) is represented by formula (7)

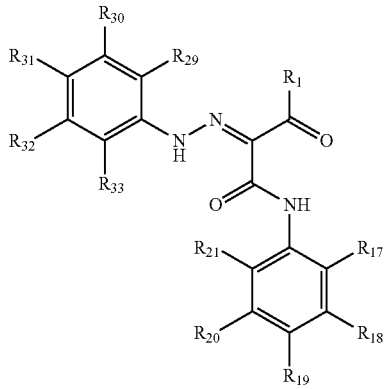

formula (7)

[in formula (7), $R_1$ represents a substituted or unsubstituted alkyl group, a substituted or unsubstituted phenyl group, an $OR_5$ group, or an $NR_6R_7$ group;

$R_5$ to $R_7$ each independently represent a hydrogen atom, a substituted or unsubstituted alkyl group, a substituted or unsubstituted phenyl group, or an aralkyl group;

$R_{17}$ to $R_{21}$ and $R_{29}$ to $R_{33}$ each independently represent a hydrogen atom, a halogen atom, an alkyl group, an alkoxy group, a hydroxyl group, a carboxy group, a $COOR_{22}$ group, or a $CONR_{23}R_{24}$ group, $SO_2NR_{25}R_{26}$, a group represented by formula (6-3), a group represented by formula (6-4), or a substituent having a site bonded to the polymer having a monomer unit with formula (2); and $R_{22}$ to $R_{26}$ each independently represent a hydrogen atom, an alkyl group, a phenyl group, or an aralkyl group;

wherein at least one of $R_{17}$ to $R_{21}$ and $R_{29}$ to $R_{33}$ is a substituent that has a site bonded to the polymer]

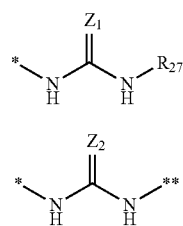

(6-3)

(6-4)

[in formula (6-3), $R_{27}$ represents a hydrogen atom, a substituted or unsubstituted alkyl group, an aralkyl group, a substituted or unsubstituted alkyloxycarbonyl group, or a substituted or unsubstituted aralkyloxycarbonyl group;

$Z_1$ represents an oxygen atom, a sulfur atom, or an $NR_{28}$ group;

$R_{28}$ is a hydrogen atom, a substituted or unsubstituted alkyl group, a substituted or unsubstituted alkyloxycarbonyl group, or a substituted or unsubstituted aralkyloxycarbonyl group; and "*" represents a site bonded to an $R_{17}$-to-$R_{21}$-bearing aromatic ring or the $R_{29}$-to-$R_{33}$-bearing aromatic ring of formula (7);

in formula (6-4), "*" and "**" each represent a site bonded to the $R_{17}$-to-$R_{21}$-bearing aromatic ring or the $R_{29}$-to-$R_{33}$-bearing aromatic ring of formula (7);

the group represented by formula (6-4) forms a 5-membered heterocycle through bonding to the $R_{17}$-to-$R_{21}$-bearing aromatic ring or the $R_{29}$-to-$R_{33}$-bearing aromatic ring in formula (7); and $Z_2$ represents an oxygen atom, a sulfur atom, or an $NR_{28}$ group].

4. The pigment dispersion according to claim 1, wherein an azo skeleton structure represented by formula (1) is bonded to the polymer having a monomer unit represented by formula (2) by a substituent having an alkoxycarbonyl group or a carboxamide group.

5. The pigment dispersion according to claim 1, wherein the polymer compound having a monomer unit comprising a structure selected from the partial structures represented by formulas (3) and (4) further has a monomer unit represented by formula (8) or (9)

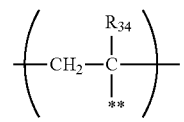

formula (8)

[in formula (8), $R_{34}$ represents a hydrogen atom or an alkyl group and "**" represents a site bonded to the partial structure represented by formula (3) or (4)]

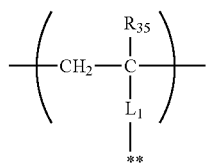

formula (9)

[in formula (9), $R_{35}$ is a hydrogen atom or an alkyl group; $L_1$ is a divalent linking group; and "**" represents a site bonded to the partial structure represented by formula (3) or (4)].

6. The pigment dispersion according to claim 5, wherein the divalent linking group $L_1$ in the monomer unit given by formula (9) is any of following formulas (10) to (15)

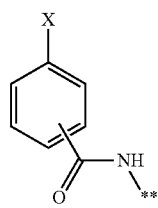

formula (10)

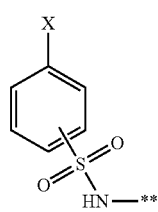

formula (11)

-continued

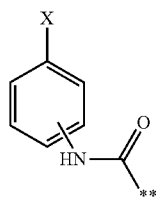
formula (12)

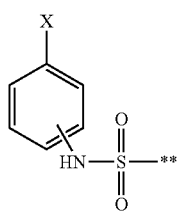
formula (13)

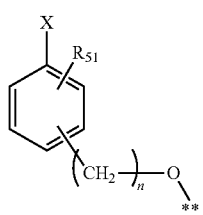
formula (14)

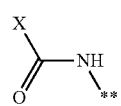
formula (15)

[in formulas (10) to (15), X represents a site bonded to the carbon atom to which $L_1$ is bonded in formula (9); "**" represents a site bonded to formula (3) or (4); n is an integer from 1 to 3; in formula (13), a single bond of phenylene with X may be an amide bond;

and $R_{51}$ represents a hydrogen atom or a $C_{1-4}$ alkyl group].

7. The pigment dispersion according to claim 1, wherein $R_8$ to $R_{11}$ and $R_{12}$ to $R_{16}$ in the partial structures represented by formulas (3) and (4) are each independently a hydrogen atom, a $C_{1-4}$ alkyl group, or a $C_{1-4}$ alkoxy group.

8. The pigment dispersion according to claim 1, wherein the pigment is a carbon black, a phthalocyanine pigment, a quinacridone pigment, or an azo pigment.

9. The pigment dispersion according to claim 1, wherein the non-water-soluble solvent is styrene.

10. A toner having a toner particle containing a binder resin and a colorant, wherein the colorant is a pigment dispersion comprising:

a pigment;

a non-water-soluble solvent;

a compound having:

a partial structure represented by formula (1) and a polymer having a monomer unit represented by formula (2); and a polymer compound having a monomer unit comprising at least one structure selected from the group consisting of partial structures represented by formulas (3) and (4)

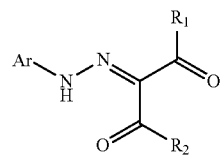
formula (1)

[in formula (1), $R_1$ and $R_2$ each independently represent a substituted or unsubstituted alkyl group, a substituted or unsubstituted phenyl group, an $OR_5$ group, or an $NR_6R_7$ group;

$R_5$ to $R_7$ each independently represent a hydrogen atom, a substituted or unsubstituted alkyl group, a substituted or unsubstituted phenyl group, or an aralkyl group; and Ar represents a substituted or unsubstituted aryl group;

wherein at least one of $R_1$, $R_2$, and Ar has a substituent that has a site bonded to the polymer]

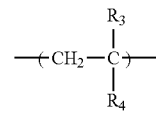
formula (2)

[in formula (2), $R_3$ represents a hydrogen atom or an alkyl group and $R_4$ represents a substituted or unsubstituted phenyl group, a carboxy group, a substituted or unsubstituted alkoxycarbonyl group, or a substituted or unsubstituted carboxamide group]

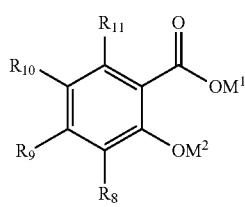
formula (3)

[in formula (3), $R_8$ to $R_{11}$ each independently represent a hydrogen atom, a halogen atom, a hydroxyl group, a carboxy group, a sulfo group, a $C_{1-18}$ alkyl group, a $C_{1-18}$ alkoxy group, or an organic group as required to form a ring with an adjacent position, wherein at least one of $R_8$ to $R_{11}$ has a substituent that has a site bonded to a main chain or a side chain in the polymer compound, and $M^1$ and $M^2$ each independently represent a hydrogen atom, a metal atom, or $NH_4$]

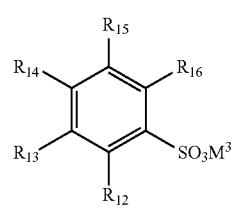
formula (4)

[in formula (4), $R_{12}$ to $R_{16}$ each independently represent a hydrogen atom, a halogen atom, a hydroxyl group, an alkyl group, or an alkoxy group, wherein at least one of $R_{12}$ to $R_{16}$ has a substituent that has a site bonded to a main chain or a side chain in the polymer compound, and $M^3$ represents a hydrogen atom, a metal atom, or $NH_4$].

11. The toner according to claim 10, wherein the toner particle is produced by a suspension polymerization method or a suspension granulation method.

* * * * *